US010541573B2

(12) United States Patent
Semken et al.

(10) Patent No.: US 10,541,573 B2
(45) Date of Patent: Jan. 21, 2020

(54) ELECTRICAL MACHINE

(71) Applicant: Lappeenranta University of Technology, Lappeenranta (FI)

(72) Inventors: Robert Semken, Lappeenranta (FI); Juha Pyrhönen, Lappeenranta (FI); Yulia Alexandrova, Lappeenranta (FI); Maria Polikarpova, Lappeenranta (FI)

(73) Assignee: Lappeenranta University of Technology, Lappennranta (FI)

( * ) Notice: Subject to any disclaimer, the term of this patent is extended or adjusted under 35 U.S.C. 154(b) by 0 days.

(21) Appl. No.: 15/927,247

(22) Filed: Mar. 21, 2018

(65) Prior Publication Data

US 2018/0212481 A1    Jul. 26, 2018

Related U.S. Application Data

(62) Division of application No. 14/425,085, filed as application No. PCT/IB2013/058098 on Aug. 29, 2013, now Pat. No. 9,935,506.

(30) Foreign Application Priority Data

Aug. 31, 2012  (GB) ................................. 1215525.5
Aug. 31, 2012  (GB) ................................. 1215528.9

(Continued)

(51) Int. Cl.
*H02K 1/06*  (2006.01)
*H02K 1/18*  (2006.01)
(Continued)

(52) U.S. Cl.
CPC .............. *H02K 1/18* (2013.01); *F28D 7/005* (2013.01); *H02K 1/148* (2013.01); *H02K 1/16* (2013.01);
(Continued)

(58) Field of Classification Search
CPC ................................. H02K 1/187; H02K 1/18
(Continued)

(56) References Cited

U.S. PATENT DOCUMENTS 1,944,776 A    1/1930  Arnold
3,895,246 A    7/1975  Fidei et al.
(Continued)

FOREIGN PATENT DOCUMENTS

CN    201270452 Y    7/2009
CN    101 557 150 A    10/2009
(Continued)

OTHER PUBLICATIONS

International Search Report and Written Opinion for corresponding Patent Application No. PCT/IB2013/058098 dated Apr. 29, 2015.
(Continued)

*Primary Examiner* — Hanh N Nguyen
(74) *Attorney, Agent, or Firm* — Renner, Otto, Boisselle & Sklar, LLP

(57) ABSTRACT

A segment for supporting electromagnetic coupling elements of a stator or rotor of an electrical machine comprises a plurality of elongate laminations which are stacked in a first direction to form a lamination stack with elongate edges of the laminations defining opposite first and second major faces of the lamination stack. The segment comprises a plurality of elongate compression devices passing internally through the lamination stack in the first direction and arranged to compress together the laminations in the lamination stack.

12 Claims, 57 Drawing Sheets

(30) Foreign Application Priority Data

| Aug. 31, 2012 | (GB) | 1215530.5 |
| --- | --- | --- |
| Aug. 31, 2012 | (GB) | 1215532.1 |
| Aug. 31, 2012 | (GB) | 1215534.7 |
| Aug. 31, 2012 | (GB) | 1215543.8 |

(51) Int. Cl.
*H02K 1/16* (2006.01)
*F28D 7/00* (2006.01)
*H02K 1/14* (2006.01)
*H02K 1/27* (2006.01)
*H02K 1/30* (2006.01)
*H02K 3/50* (2006.01)
*H02K 1/28* (2006.01)
*H02K 3/24* (2006.01)
*H02K 7/18* (2006.01)

(52) U.S. Cl.
CPC .............. *H02K 1/185* (2013.01); *H02K 1/187* (2013.01); *H02K 1/278* (2013.01); *H02K 1/28* (2013.01); *H02K 1/30* (2013.01); *H02K 3/505* (2013.01); *H02K 3/24* (2013.01); *H02K 7/1838* (2013.01); *H02K 7/1869* (2013.01); *H02K 2213/12* (2013.01); *Y10T 29/49874* (2015.01); *Y10T 403/68* (2015.01)

(58) Field of Classification Search
USPC ......... 310/216.001–216.037; 290/54, 55, 53, 290/1 B
See application file for complete search history.

(56) References Cited

U.S. PATENT DOCUMENTS

| 4,360,750 | A | 11/1982 | Pohl |
| --- | --- | --- | --- |
| 4,603,273 | A | 7/1986 | McDonald |
| 4,773,153 | A | 9/1988 | Rossie |
| 5,176,946 | A | 1/1993 | Wieloch |
| 5,705,902 | A | 1/1998 | Merritt et al. |
| 5,717,267 | A | 2/1998 | Paroz |
| 5,886,441 | A | 3/1999 | Uchida et al. |
| 6,429,563 | B1 | 8/2002 | Rothman et al. |
| 7,482,720 | B2 | 1/2009 | Gordon et al. |
| 7,884,521 | B2 | 2/2011 | Buhler |
| 7,919,898 | B2 | 4/2011 | Wang |
| 8,723,402 | B2 * | 5/2014 | Oyague ............... H02K 1/187 310/261.1 |
| 2002/0180304 | A1 | 12/2002 | Knauff |
| 2004/0004407 | A1 | 1/2004 | Laurent et al. |
| 2006/0097582 | A1 | 5/2006 | Engstrom |
| 2008/0048517 | A1 | 2/2008 | Ochiai et al. |
| 2008/0093945 | A1 | 4/2008 | Gruenhagen |
| 2009/0001839 | A1 | 1/2009 | Masayuki et al. |
| 2009/0218900 | A1* | 9/2009 | Dickes ............... H02K 1/148 310/156.12 |
| 2009/0256435 | A1 | 10/2009 | Gottfried |
| 2009/0267438 | A1 | 10/2009 | Murakami |
| 2010/0034653 | A1 | 2/2010 | Frokjaer |
| 2010/0061853 | A1 | 3/2010 | Bagepalli |
| 2010/0164228 | A1 | 7/2010 | Matsuo et al. |
| 2011/0074242 | A1 | 3/2011 | Singhal |
| 2011/0084541 | A1* | 4/2011 | Lew ............... B60B 1/003 301/6.5 |
| 2011/0140451 | A1 | 6/2011 | Sharples et al. |
| 2011/0266909 | A1* | 11/2011 | Lokhandwalla ..... H02K 1/2766 310/156.12 |
| 2012/0007458 | A1 | 1/2012 | Rozinsky et al. |
| 2012/0133145 | A1 | 5/2012 | Longtin et al. |
| 2012/0217831 | A1* | 8/2012 | Jore ............... H02K 1/30 310/90 |

FOREIGN PATENT DOCUMENTS

| CN | 101557150 A | 10/2009 |
| --- | --- | --- |
| CN | 201557033 U | 8/2010 |
| CN | 102146872 A | 8/2011 |
| DE | 129894 | 1/1901 |
| DE | 129 894 C | 4/1902 |
| DE | 102 44 746 A1 | 4/2004 |
| DE | 10 2008 018 460 A1 | 10/2009 |
| EP | 1 864 762 A1 | 12/2007 |
| EP | 2 493 059 A1 | 8/2012 |
| FR | 2753315 A1 | 3/1998 |
| GB | 17659 | 6/1912 |
| GB | 272444 | 10/1927 |
| GB | 334473 A | 9/1930 |
| GB | 784779 | 10/1957 |
| GB | 784779 A | 10/1957 |
| GB | 1004400 A | 9/1965 |
| GB | 1 554 161 | 10/1979 |
| GB | 1554161 A | 10/1979 |
| GB | 2431525 A | 4/2007 |
| GB | 2479407 A | 10/2011 |
| JP | S58-076301 A | 5/1983 |
| JP | 60213236 | 10/1985 |
| JP | 61106049 | 5/1986 |
| JP | H09 19091 A | 1/1997 |
| JP | 2002247798 A | 8/2002 |
| JP | 2004023864 A | 1/2004 |
| JP | 2005354768 A | 12/2005 |
| JP | 2008061365 A | 3/2008 |
| JP | 2011041371 A | 2/2011 |
| SE | 9700351 | 8/1998 |
| SE | 510320 C2 | 5/1999 |
| SU | 764051 | 9/1980 |
| WO | 02/099950 A1 | 12/2002 |
| WO | 03/021752 A1 | 3/2003 |
| WO | 2004/068678 A1 | 8/2004 |

OTHER PUBLICATIONS

Examination Report for corresponding Patent Application No. GB 1215532.1 dated Apr. 22, 2015.
Examination Report for corresponding Patent Application No. GB 1215543.8 dated Apr. 22, 2015.
Examination Report for corresponding Patent Application No. GB 1215534.7 dated Apr. 17, 2015.
Further Examination Report for corresponding Patent Application No. GB 1215534.7 dated Oct. 30, 2014.
Combined Search and Examination Report for corresponding Patent Application No. GB 1215534.7 dated Nov. 26, 2012.
Combined Search and Examination Report for corresponding Patent Application No. GB 1215543.8 dated Nov. 26, 2012.
Combined Search and Examination Report for corresponding Patent Application No. GB 1215532.1 dated Nov. 26, 2012.
Combined Search and Examination Report for corresponding Patent Application No. GB 1215530.5 dated Nov. 26, 2012.
Combined Search and Examination Report for corresponding Patent Application No. GB 1215528.9 dated Nov. 26, 2012.
Combined Search and Examination Report for corresponding Patent Application No. GB 1215525.5 dated Nov. 26, 2012.
Search Report for corresponding Patent Application No. GB 1215534.7 dated Nov. 22, 2012.
Office Action for corresponding Chinese Patent Application No. 201380057178.3 dated Aug. 2, 2017.

* cited by examiner

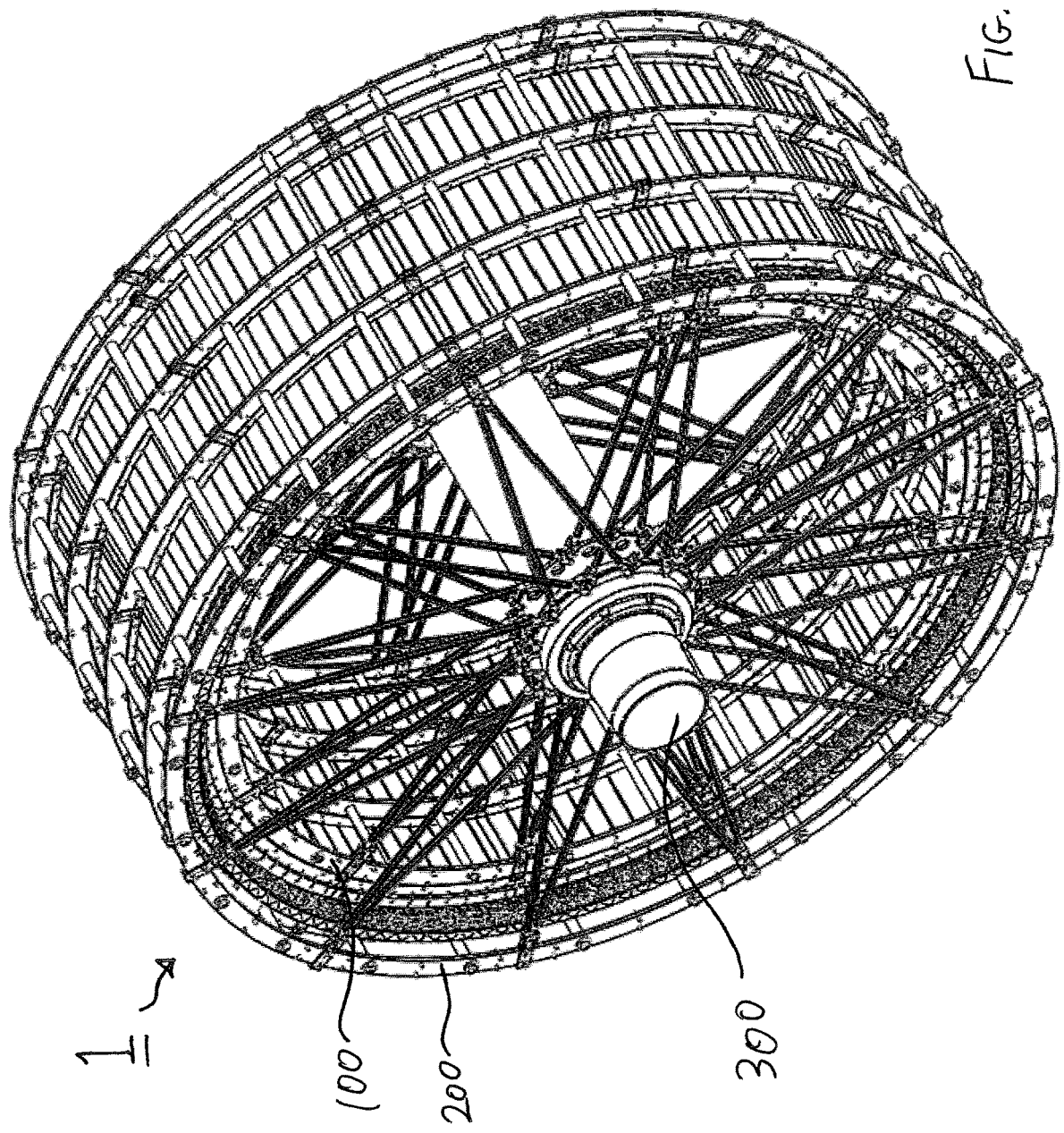

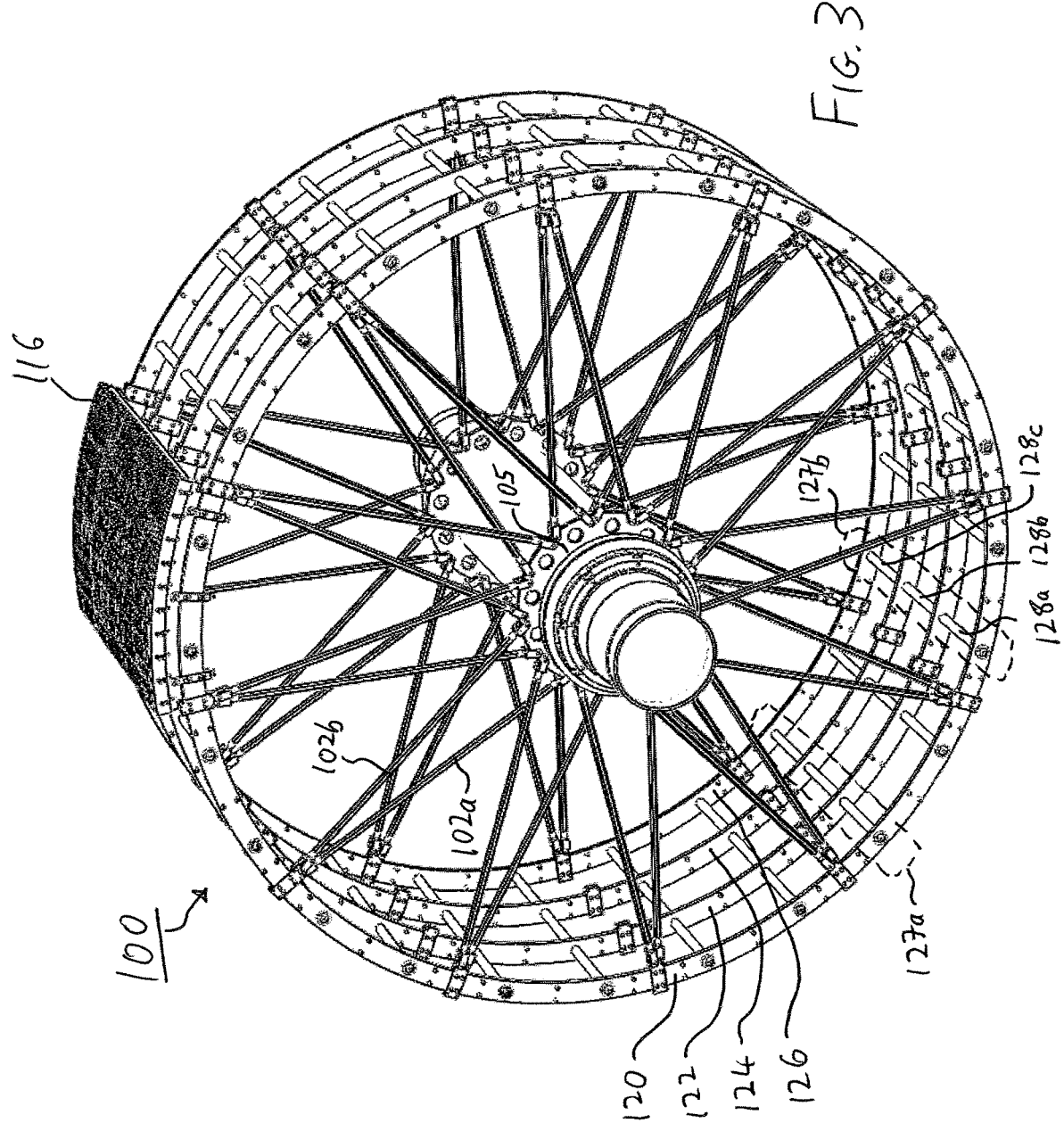

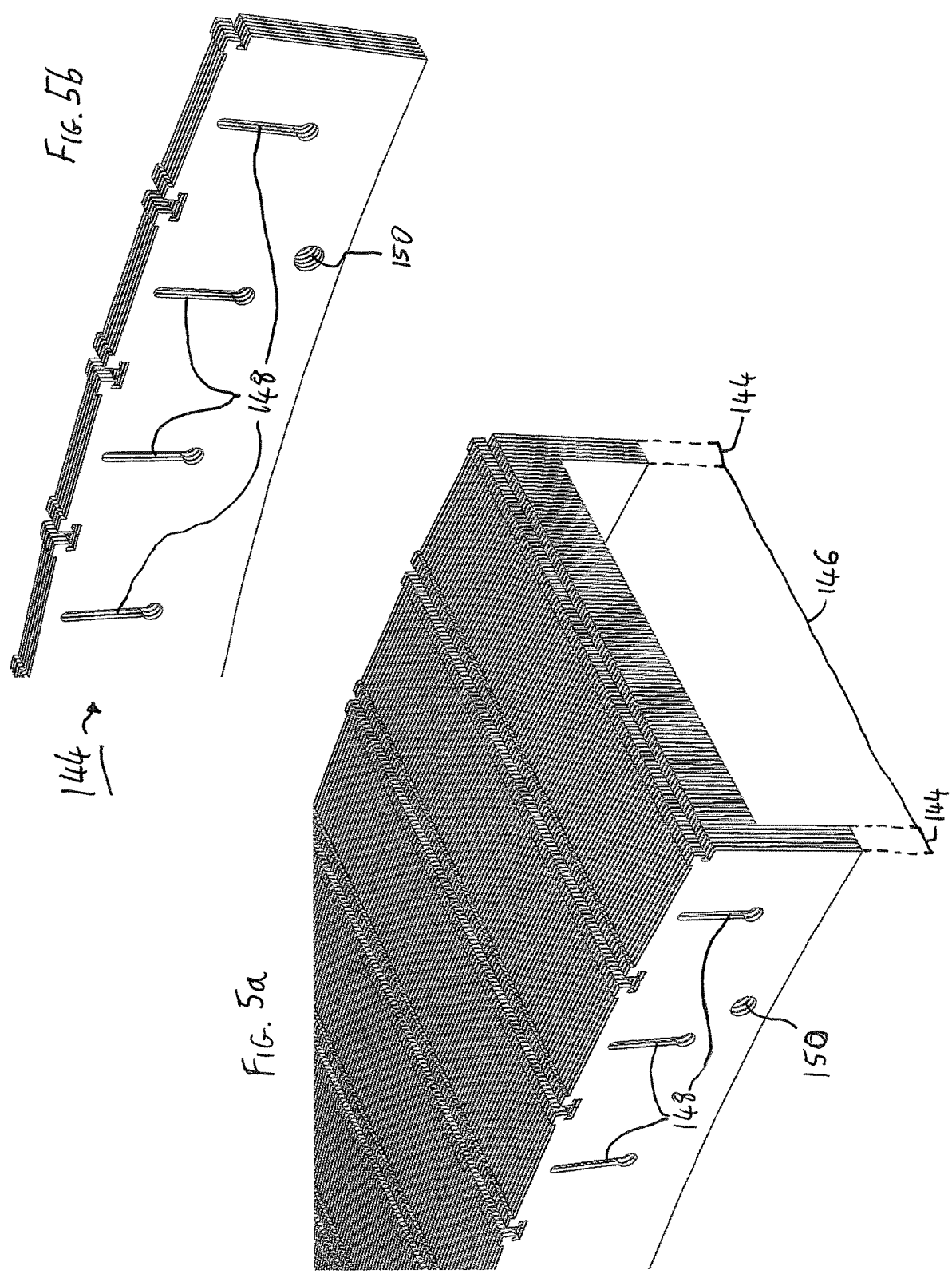

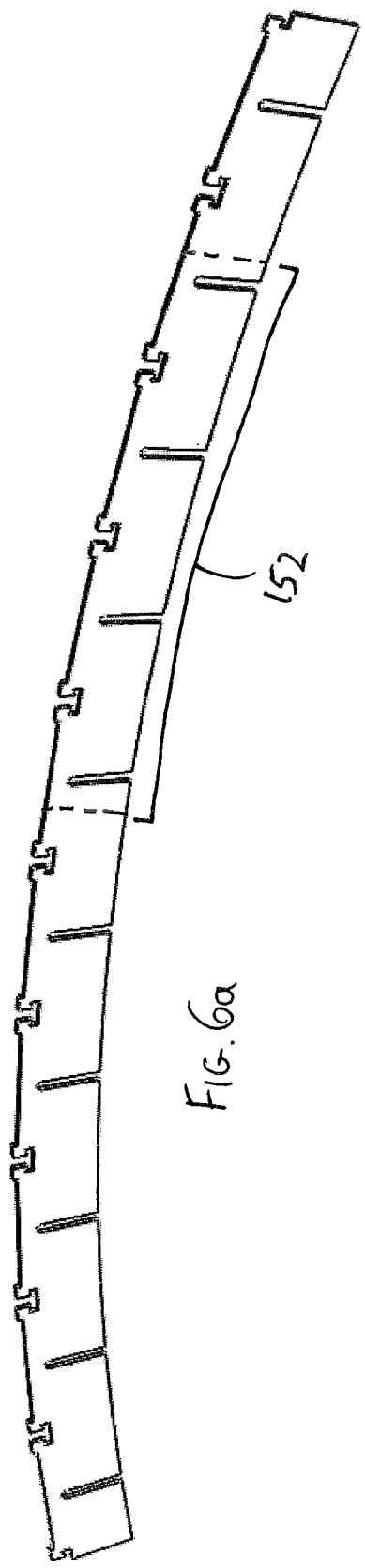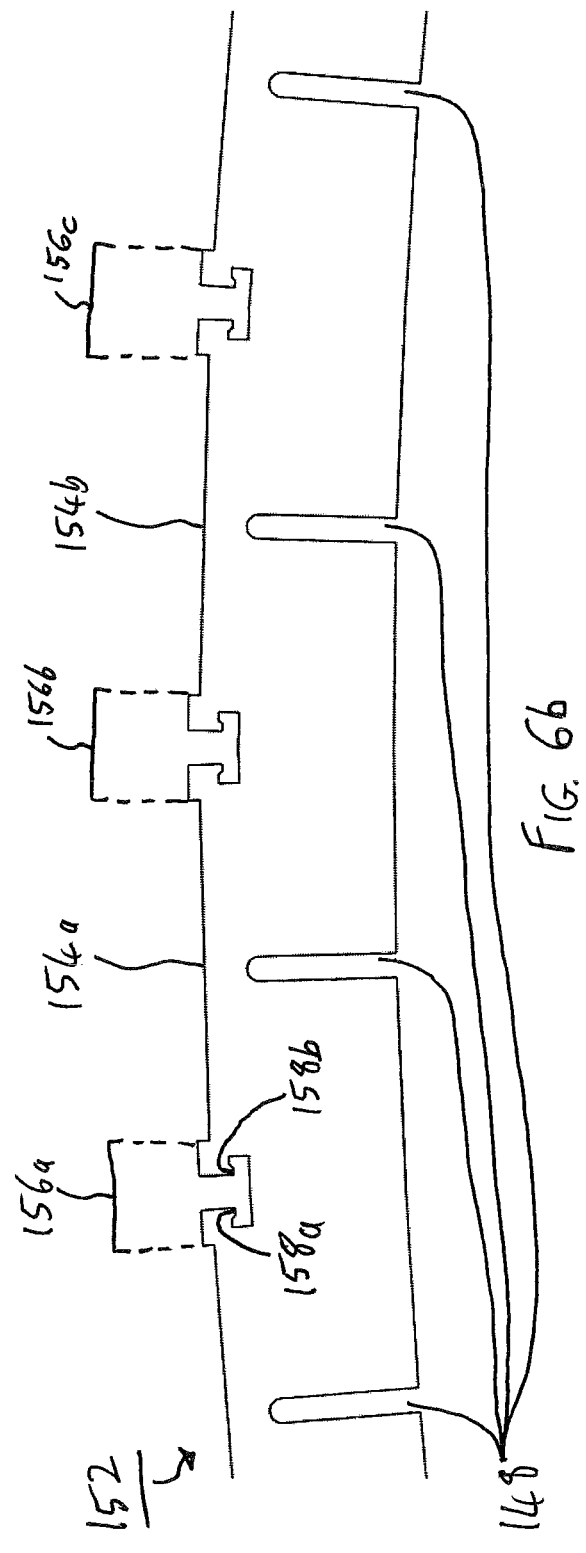

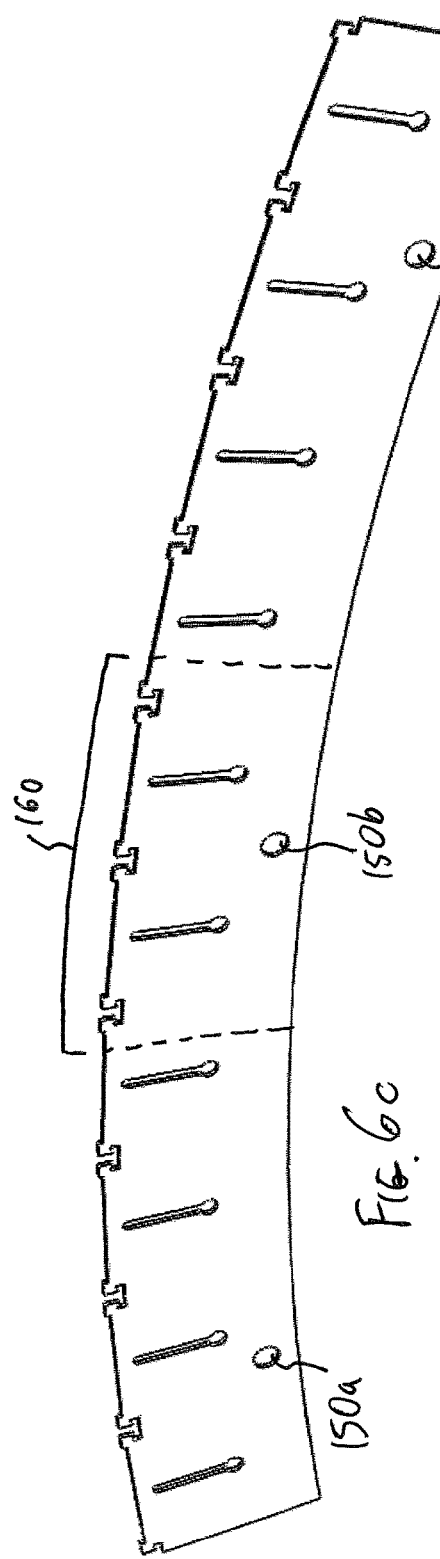
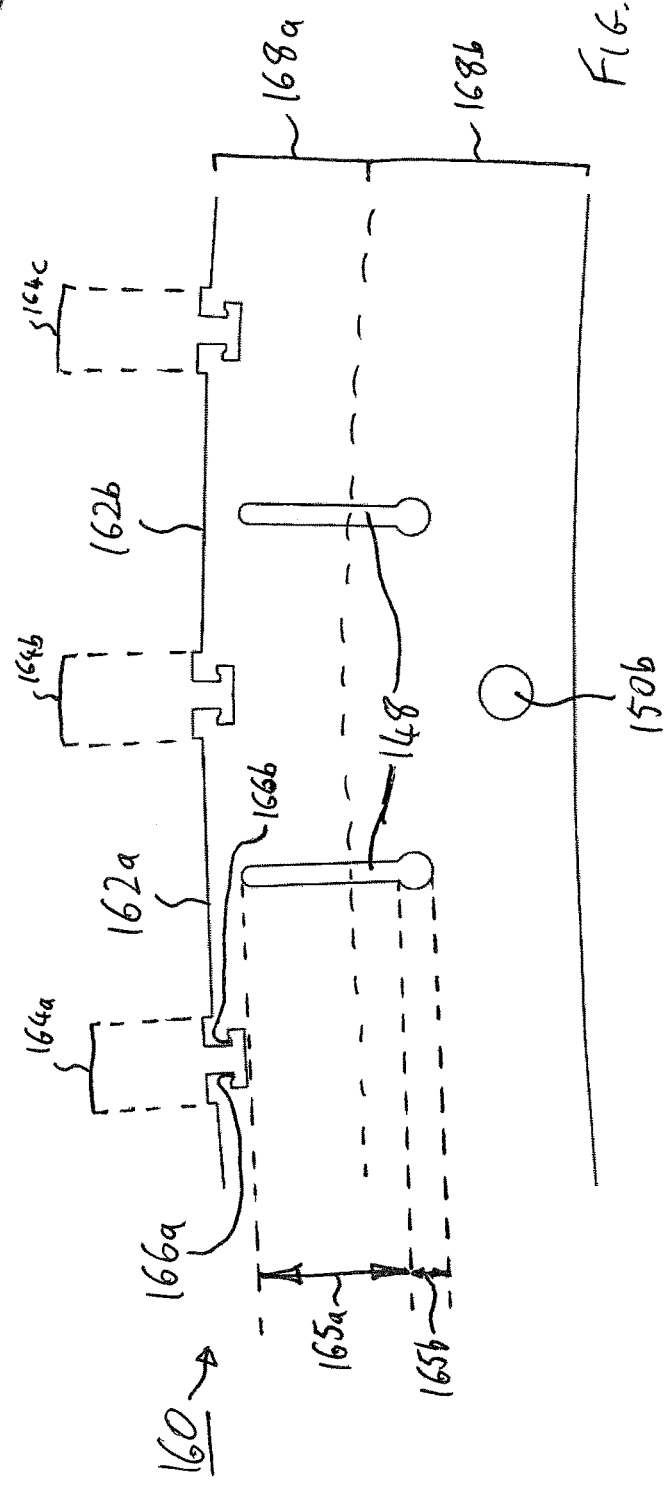

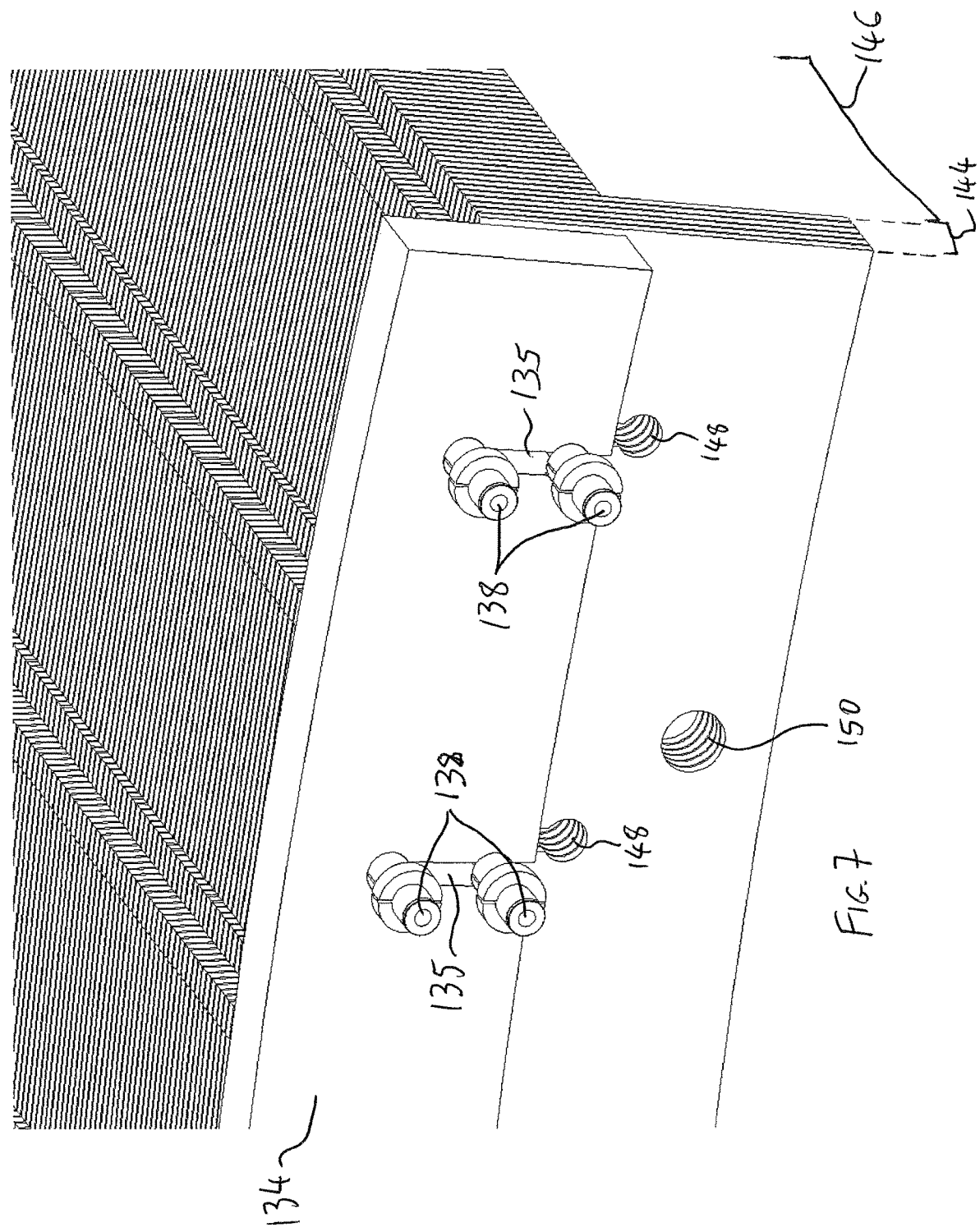

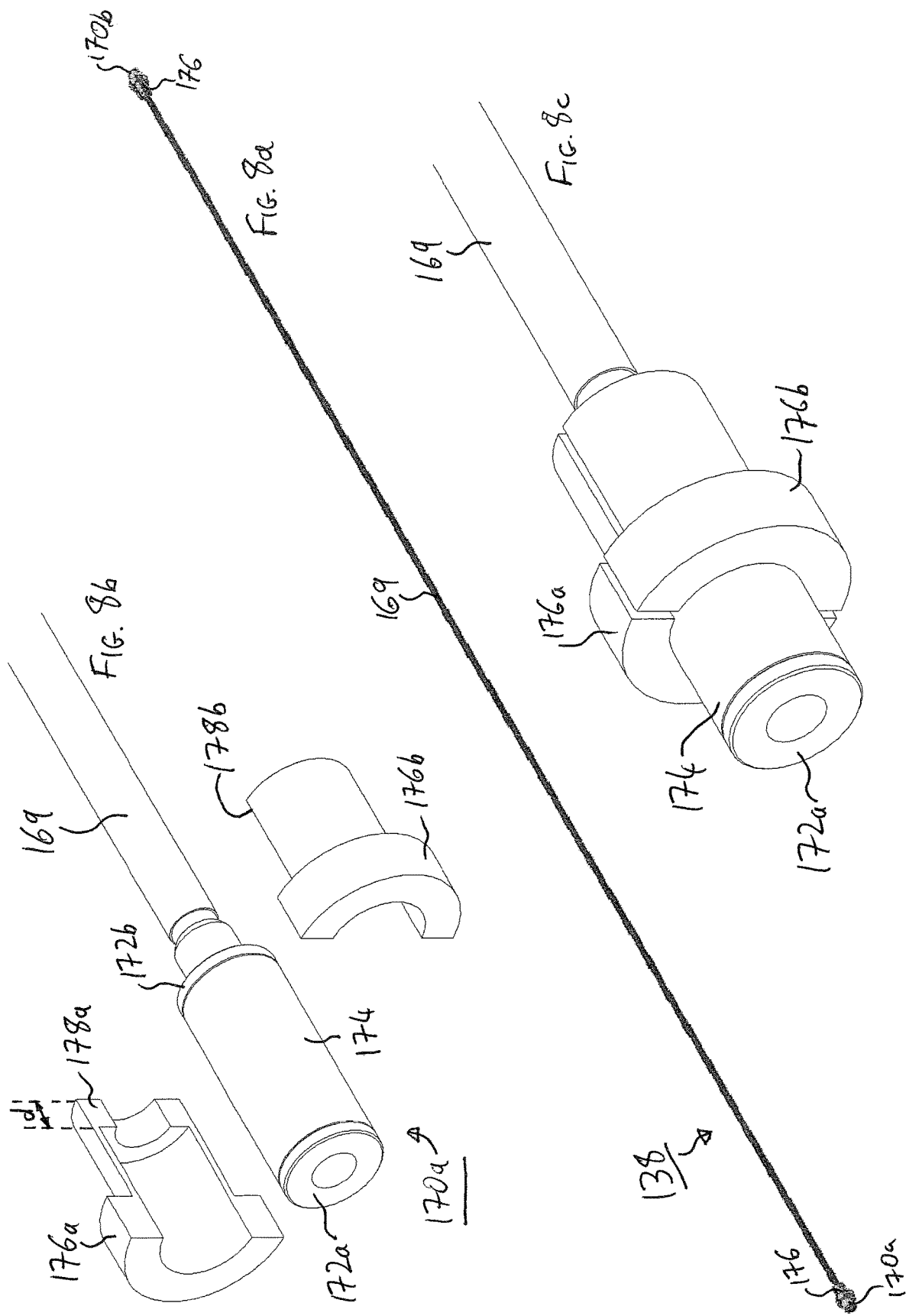

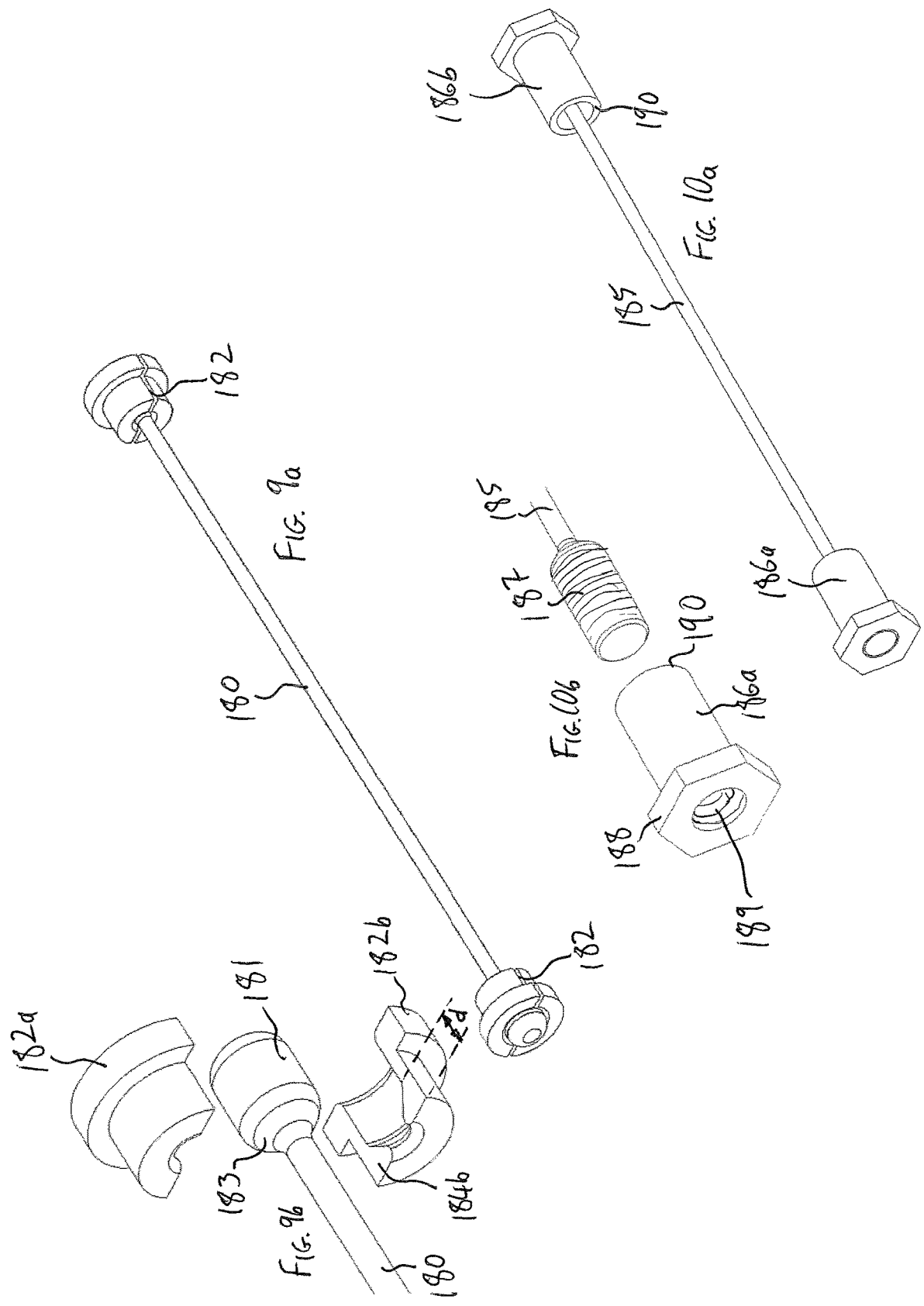

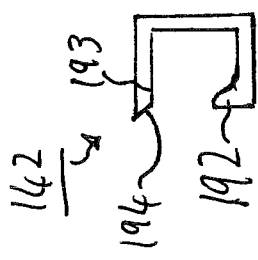
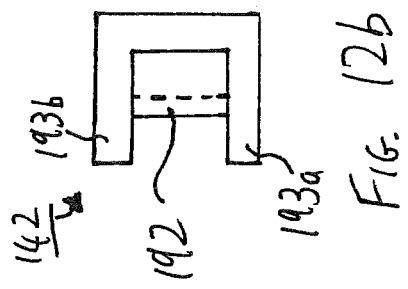
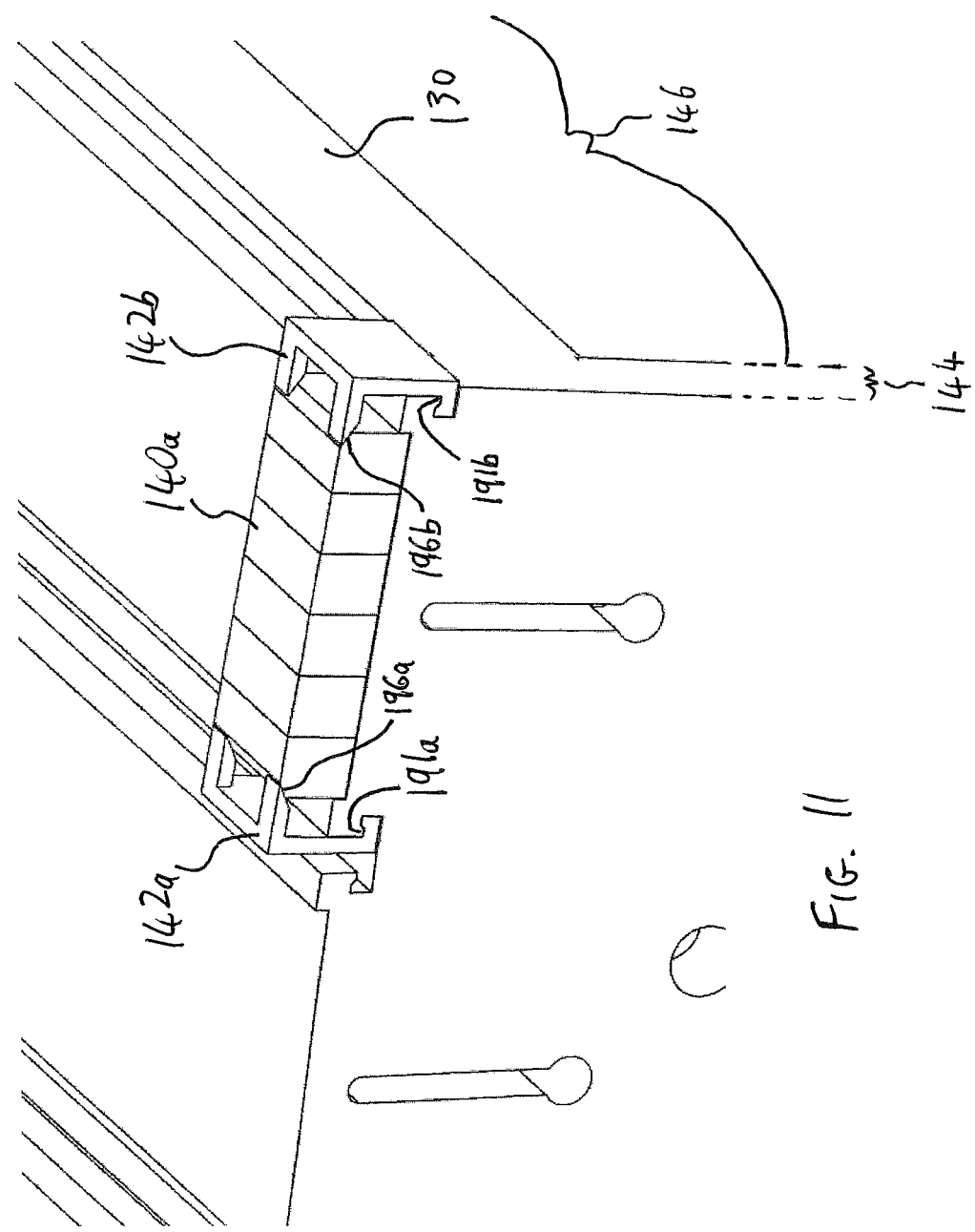

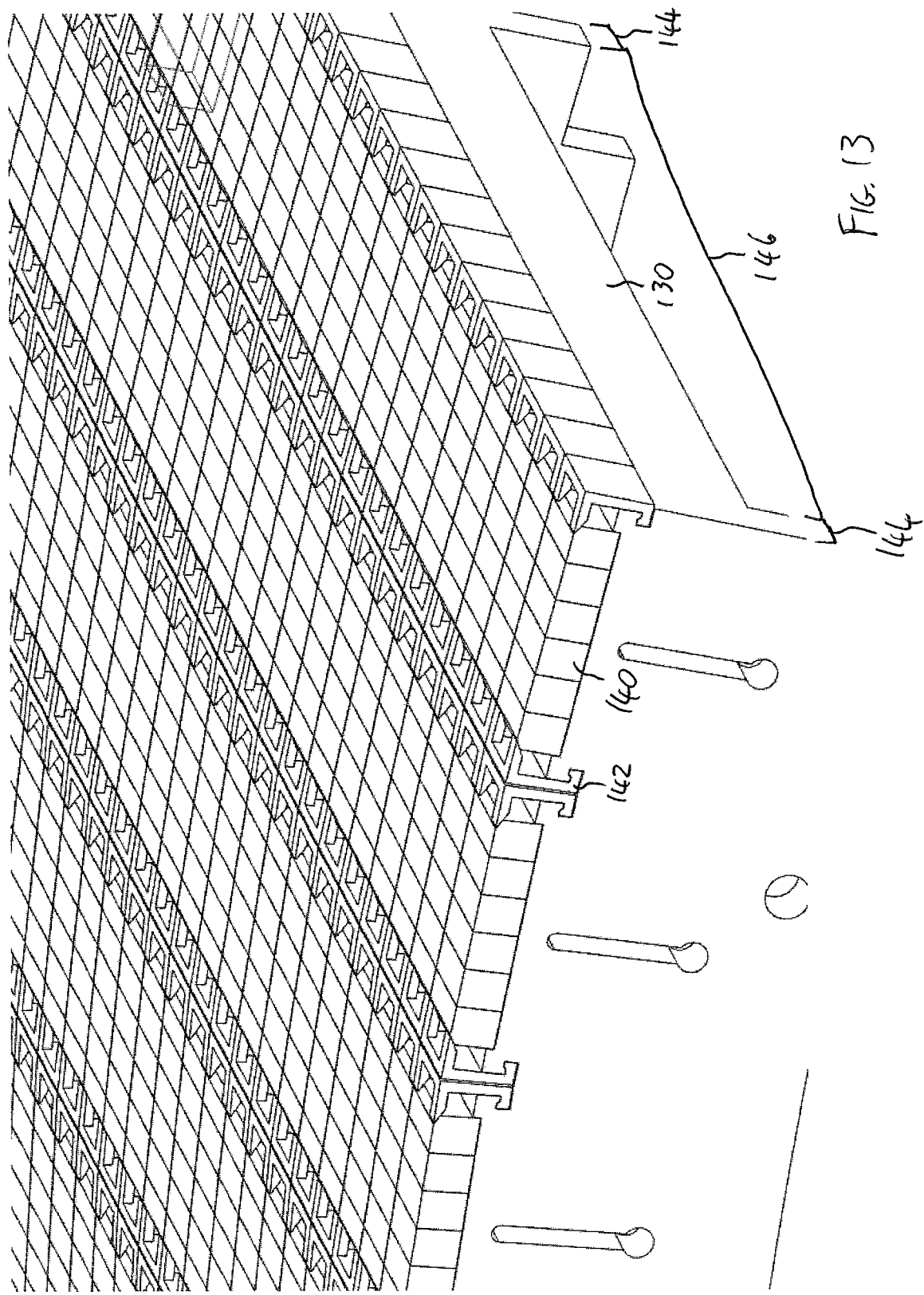

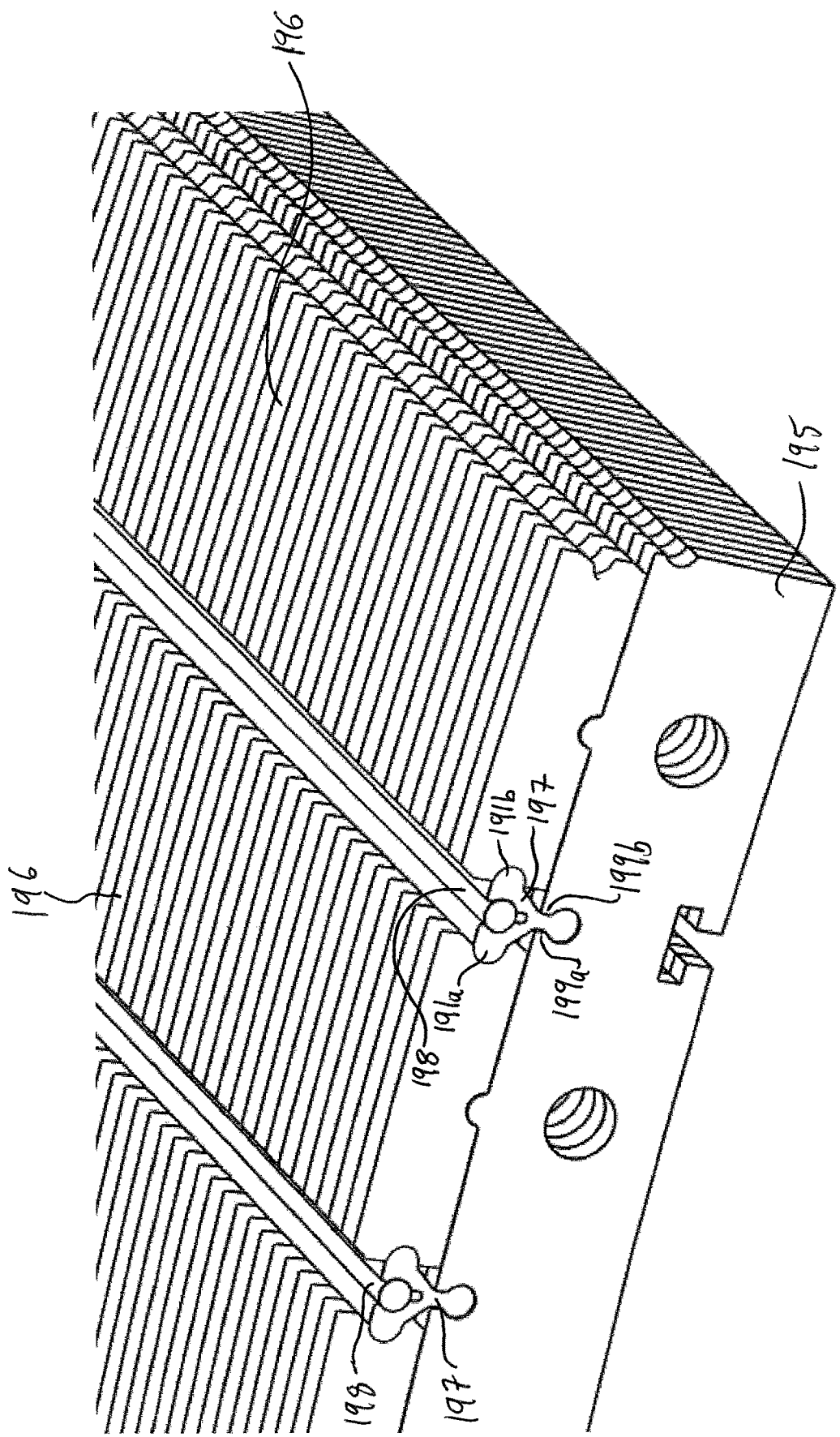

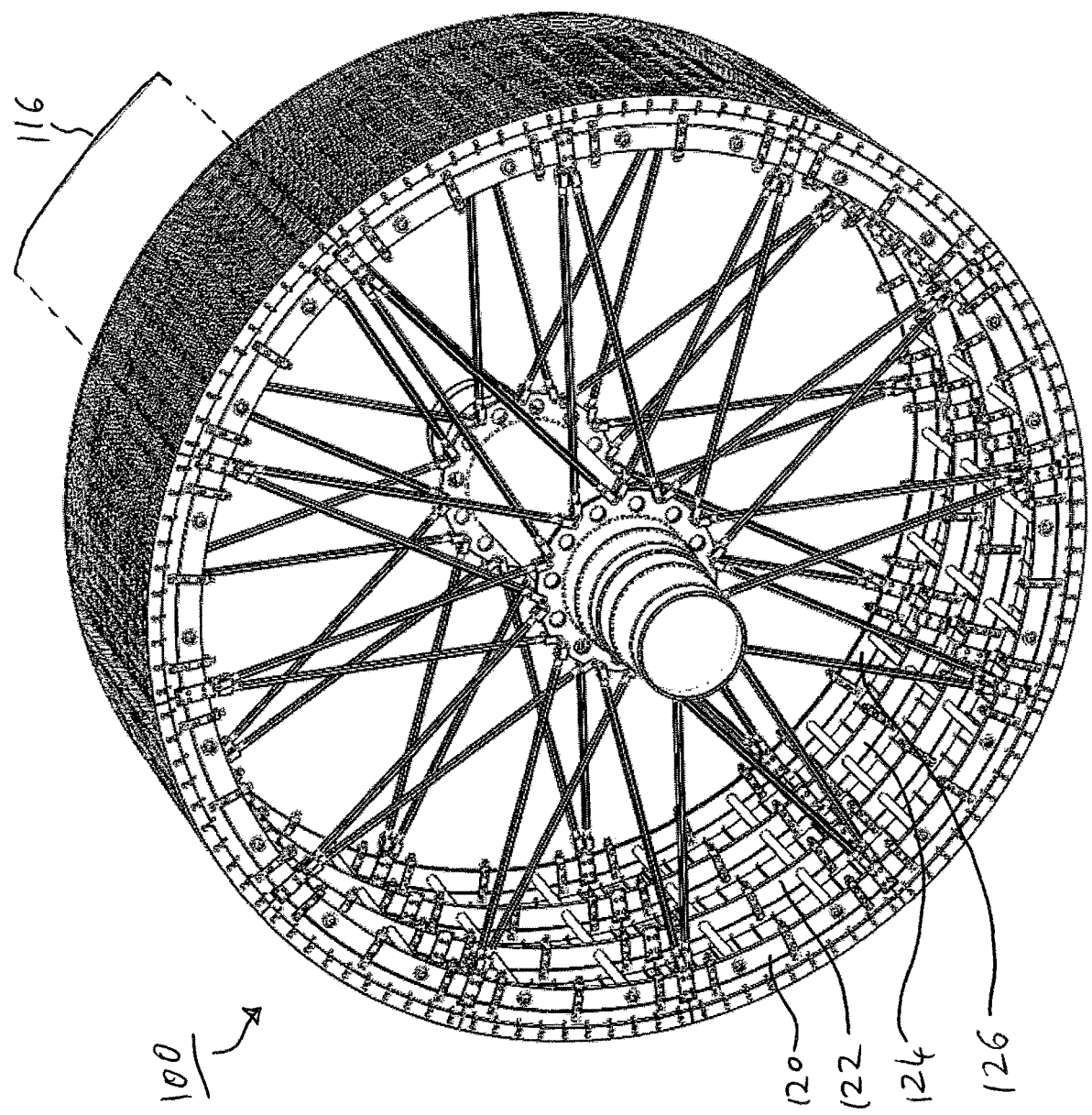

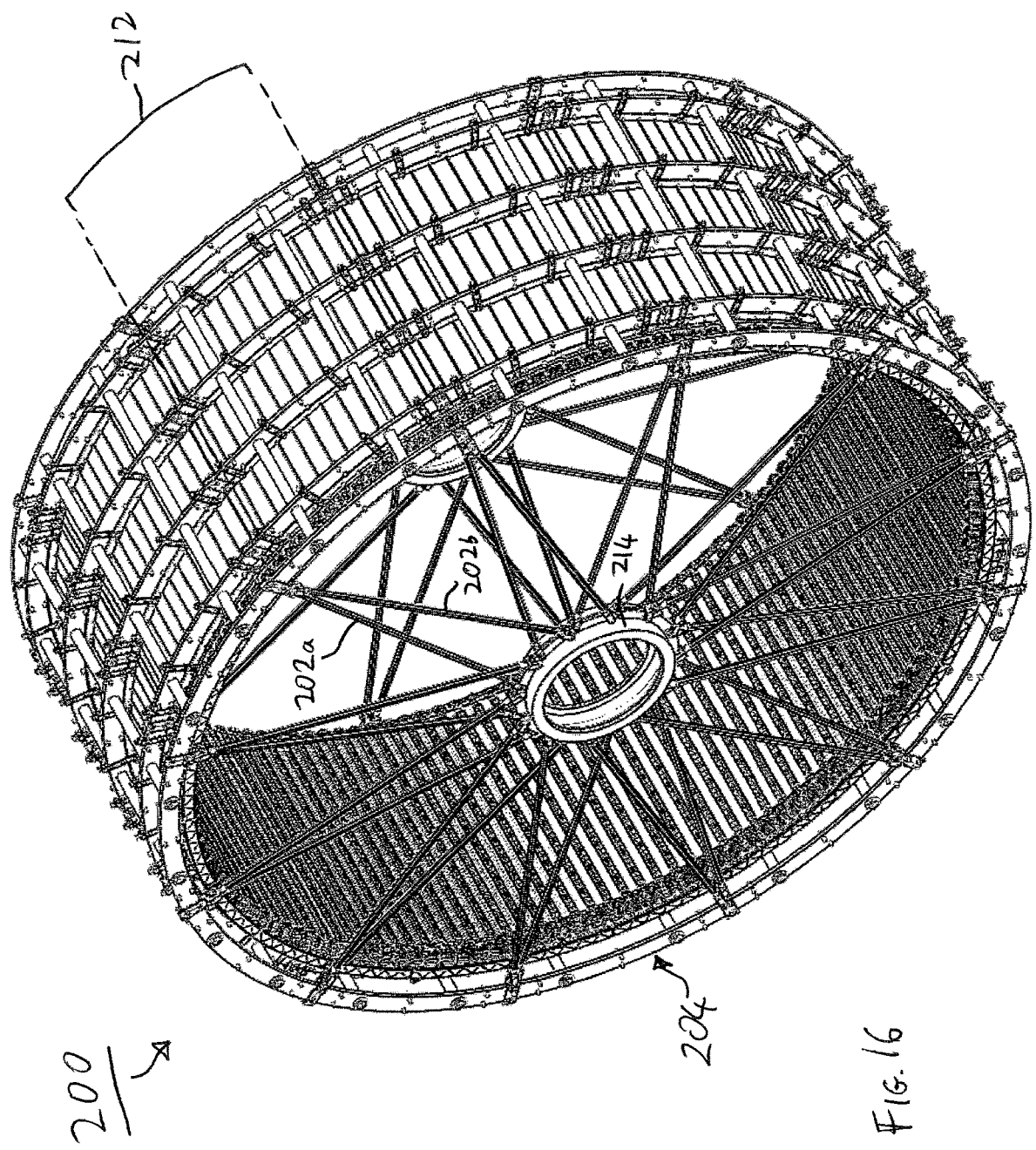

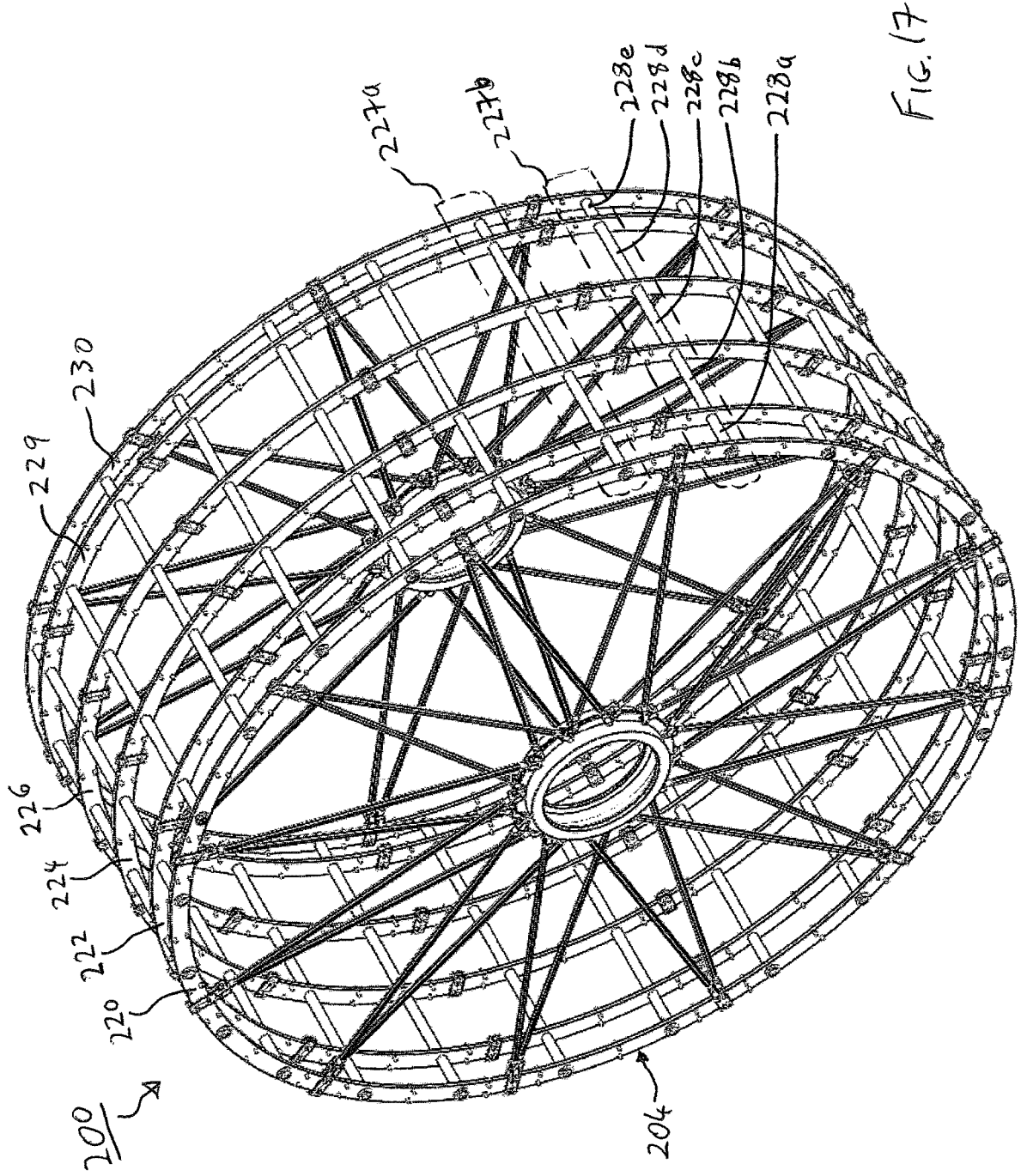

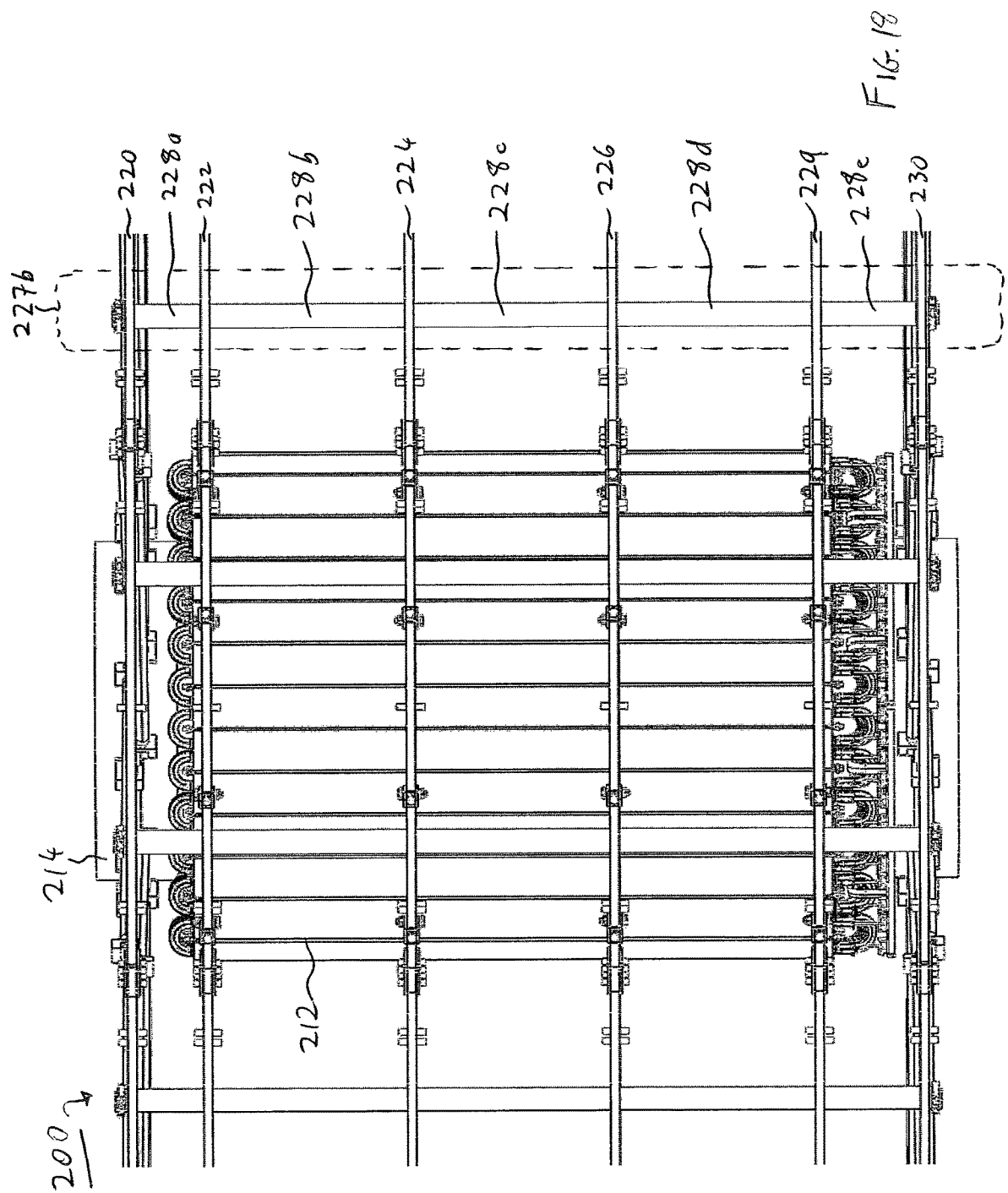

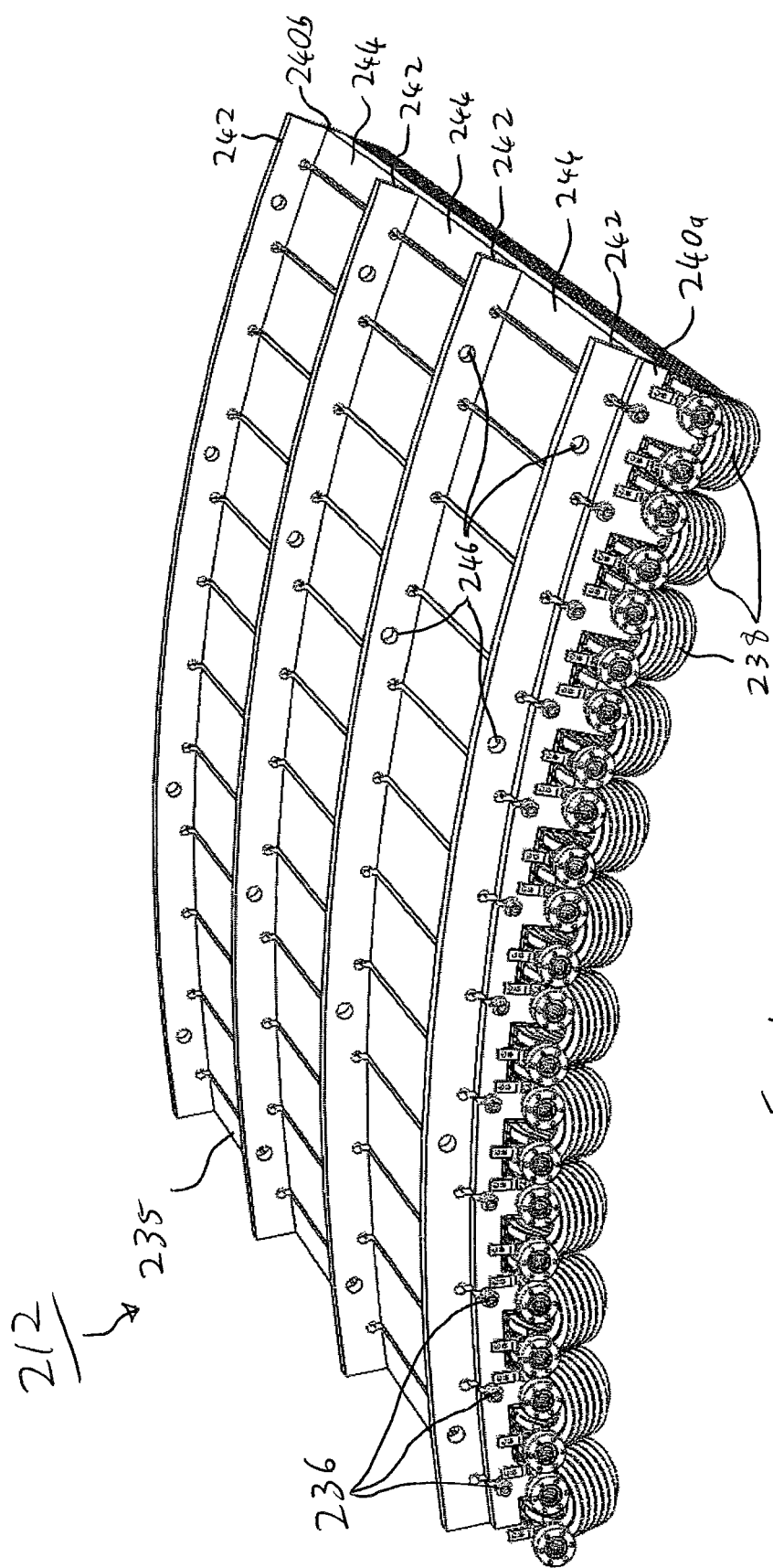

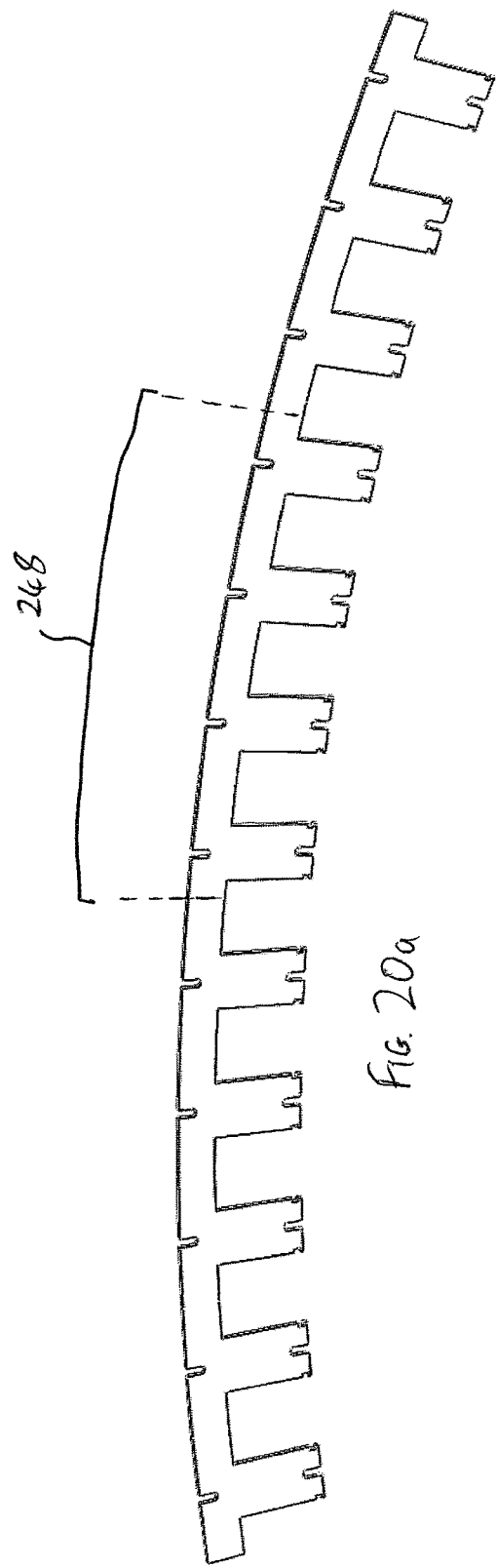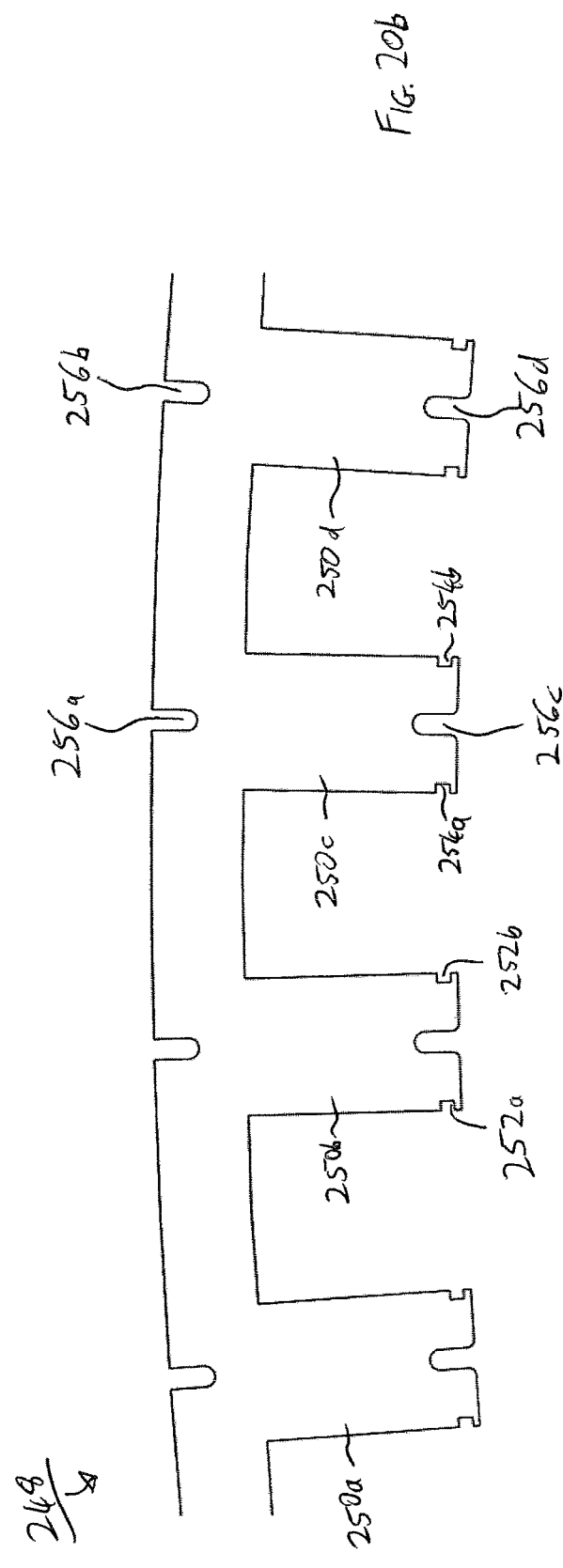

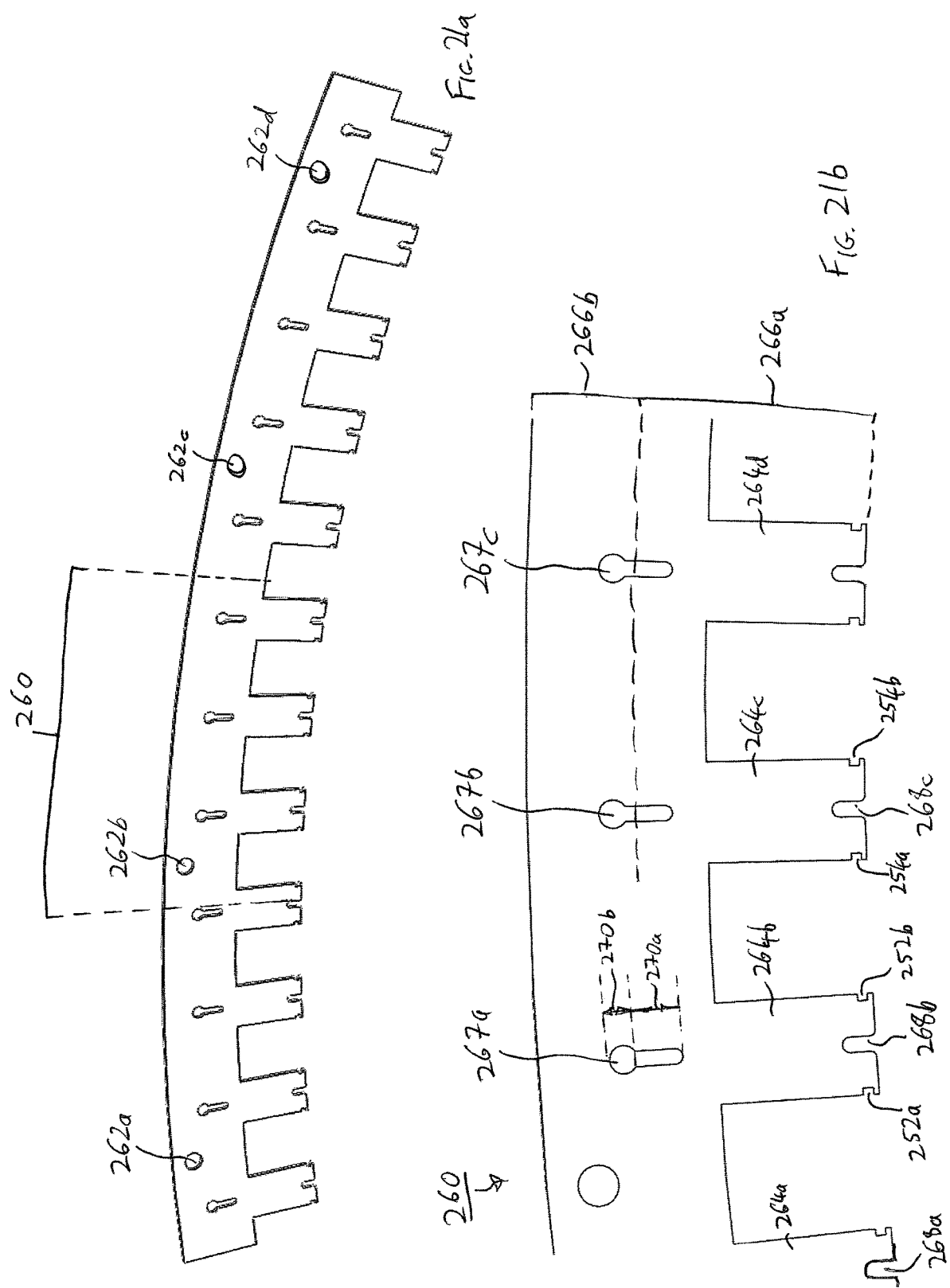

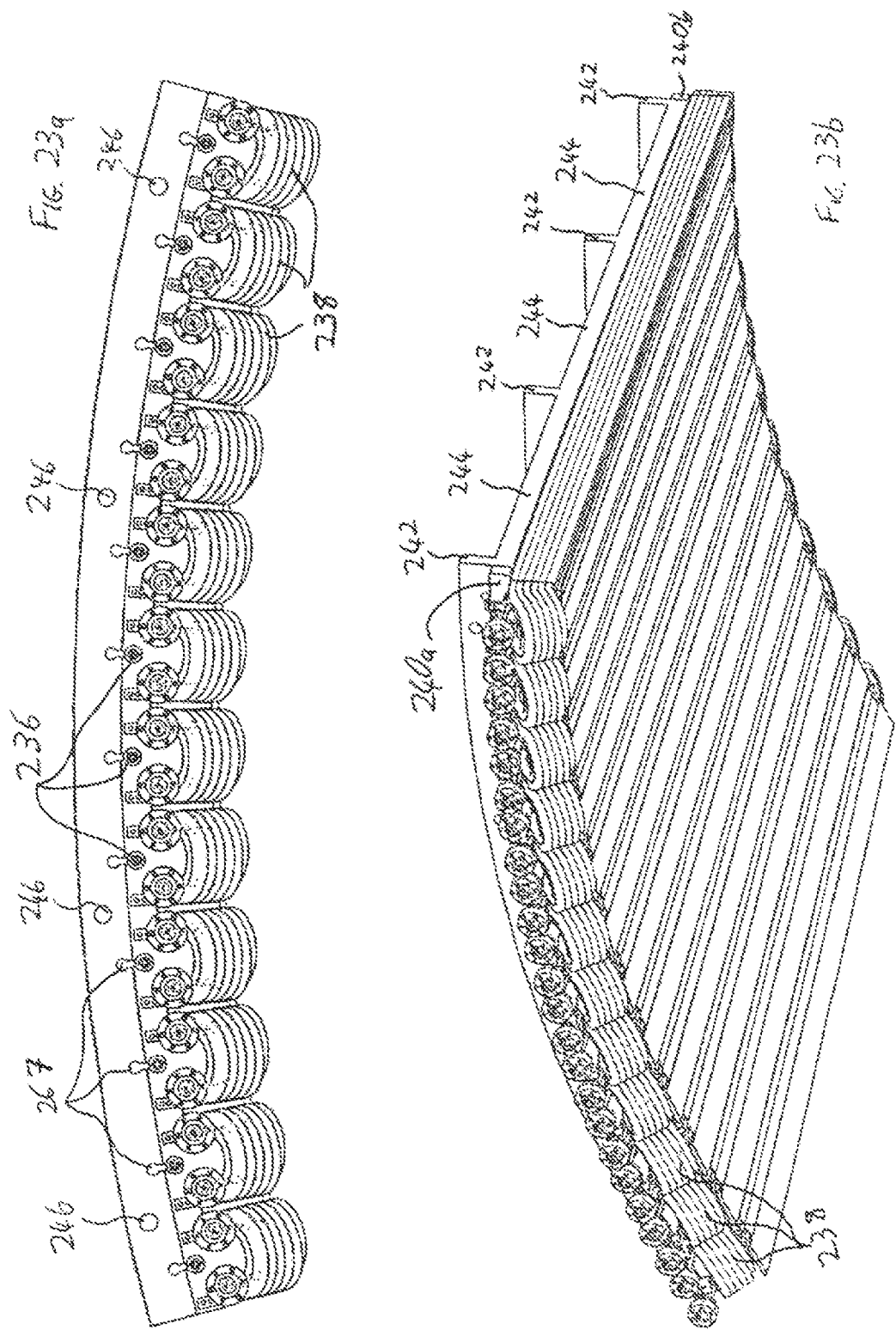

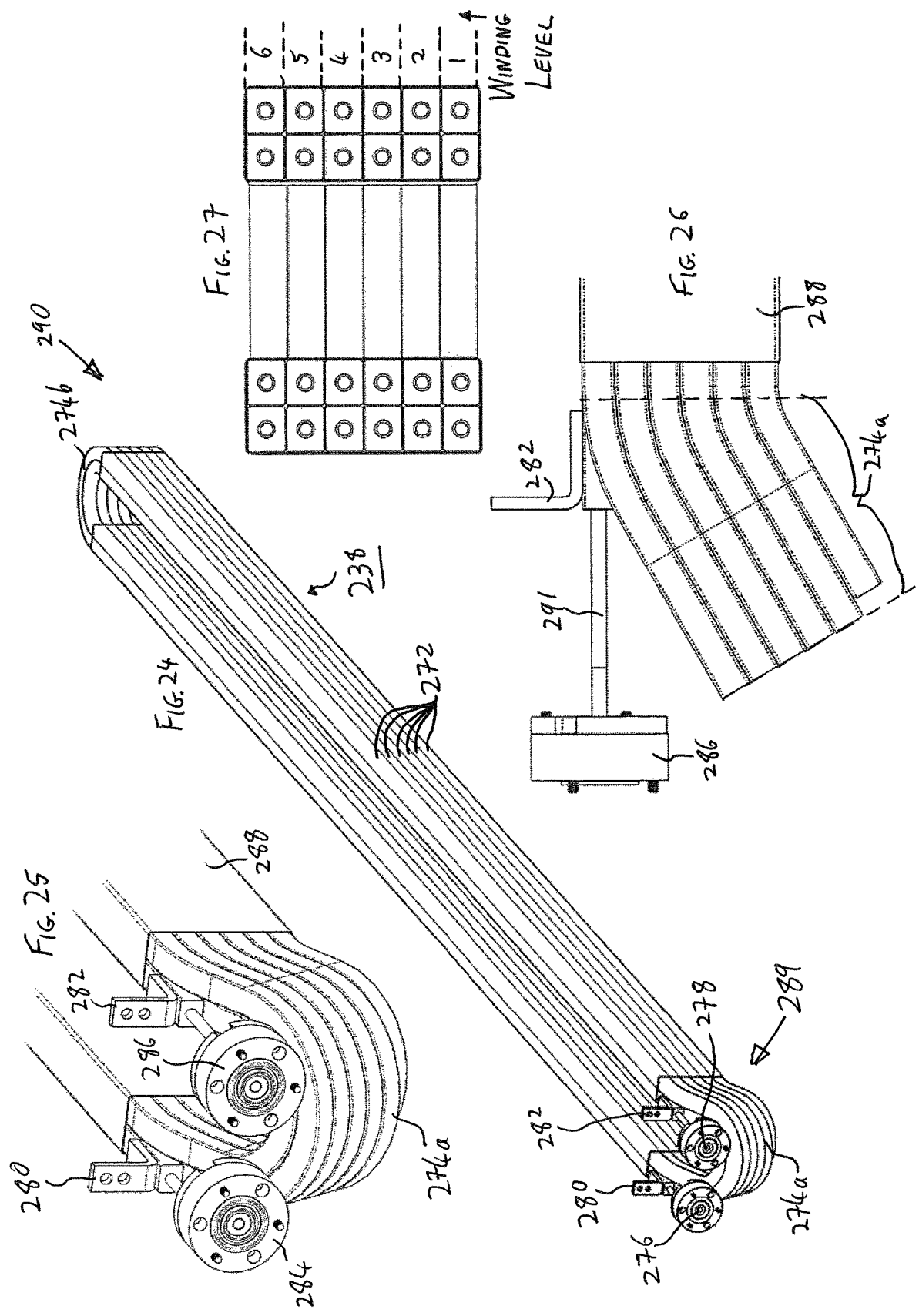

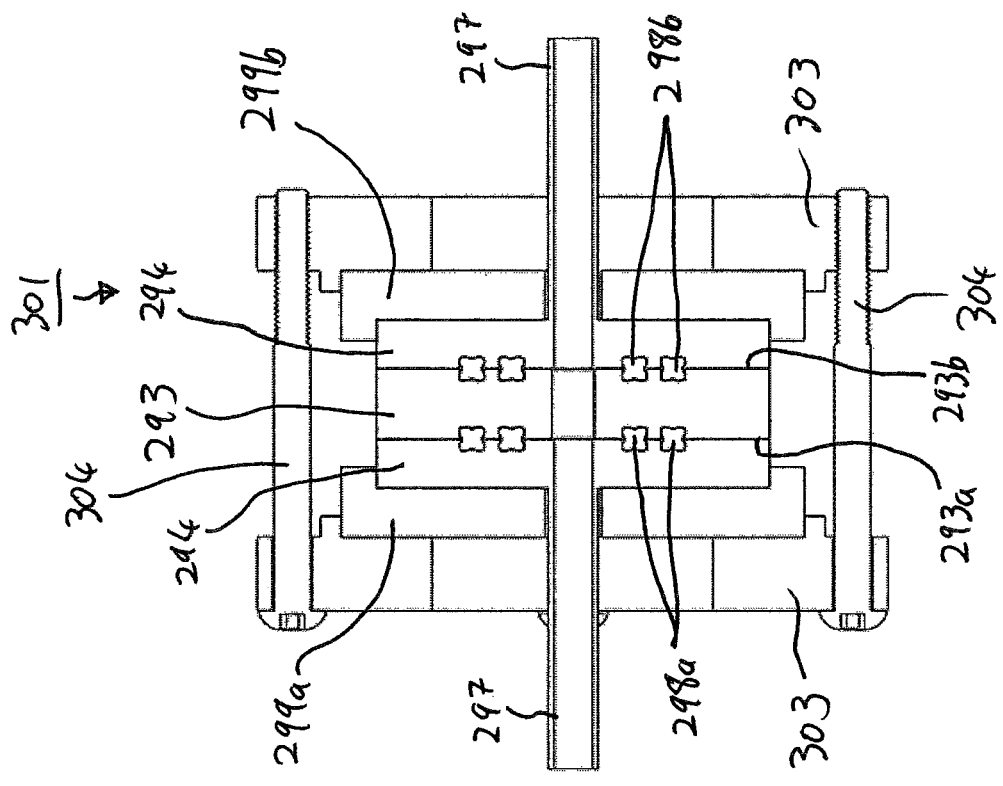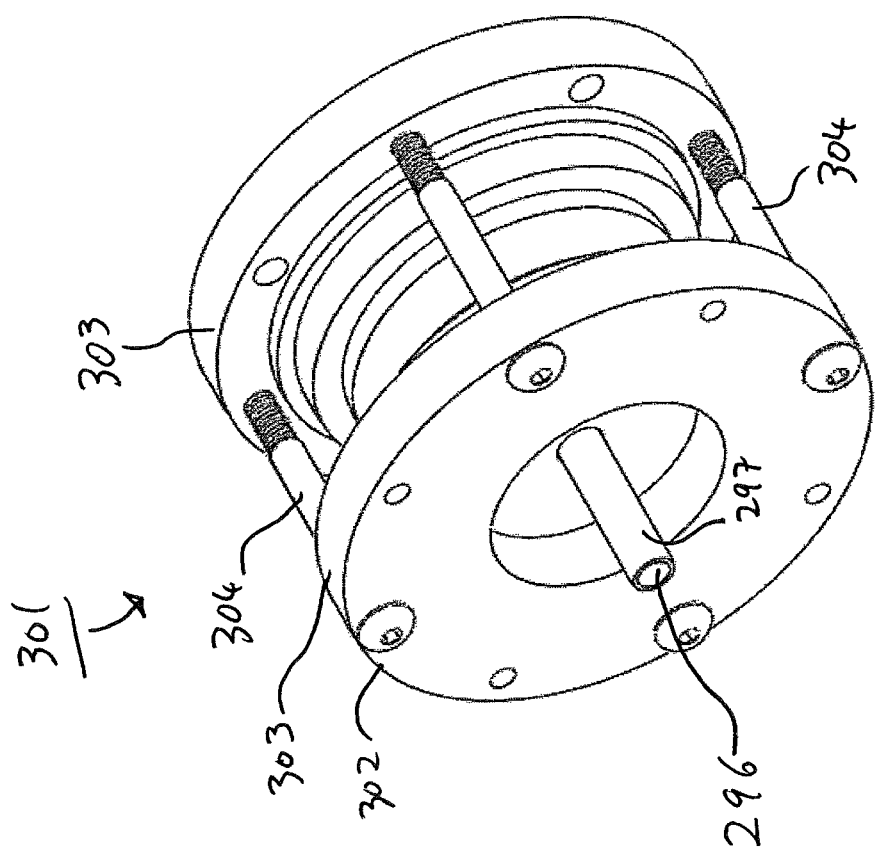
FIG. 31

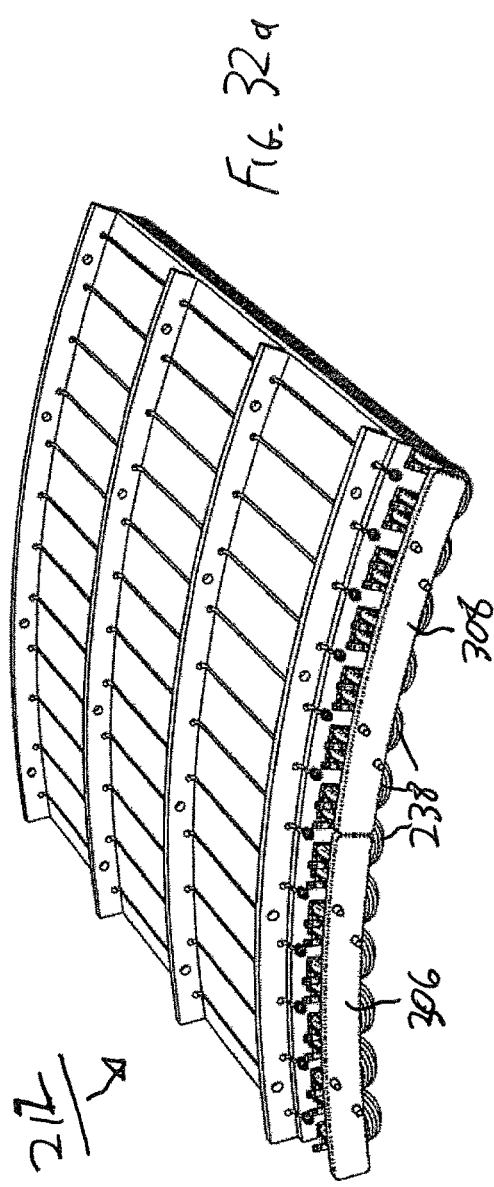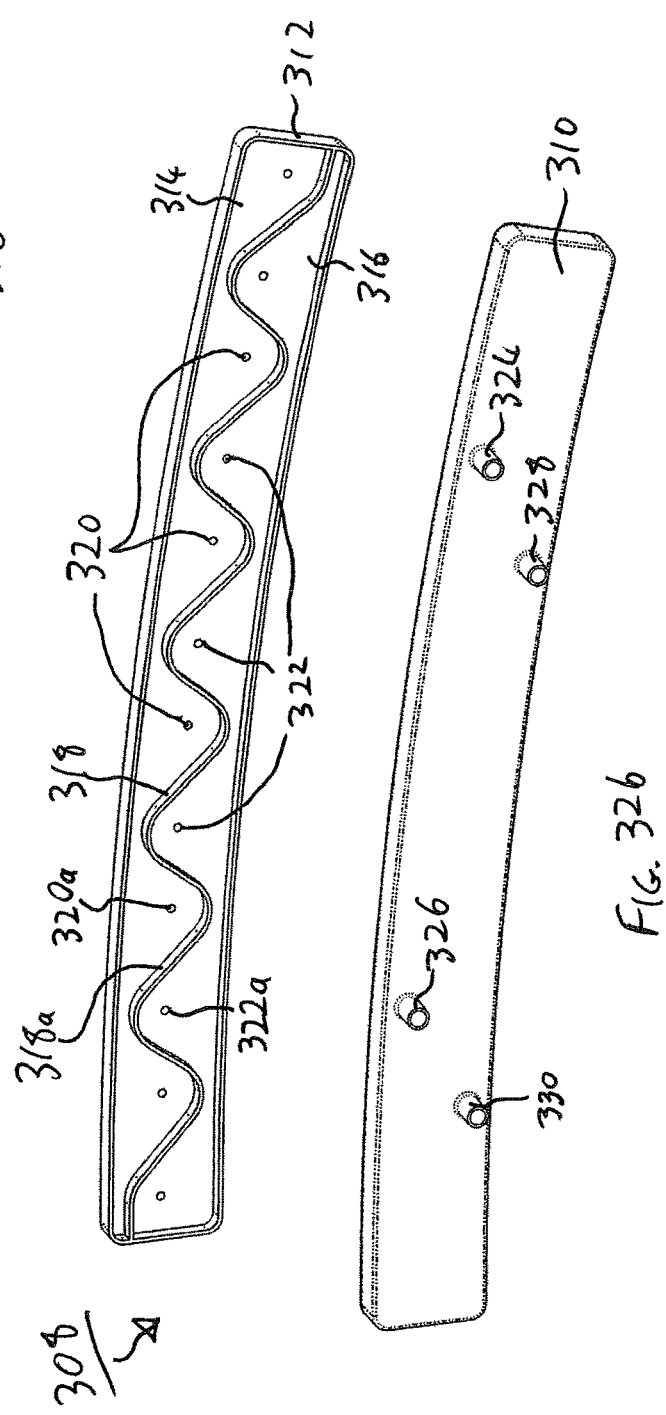

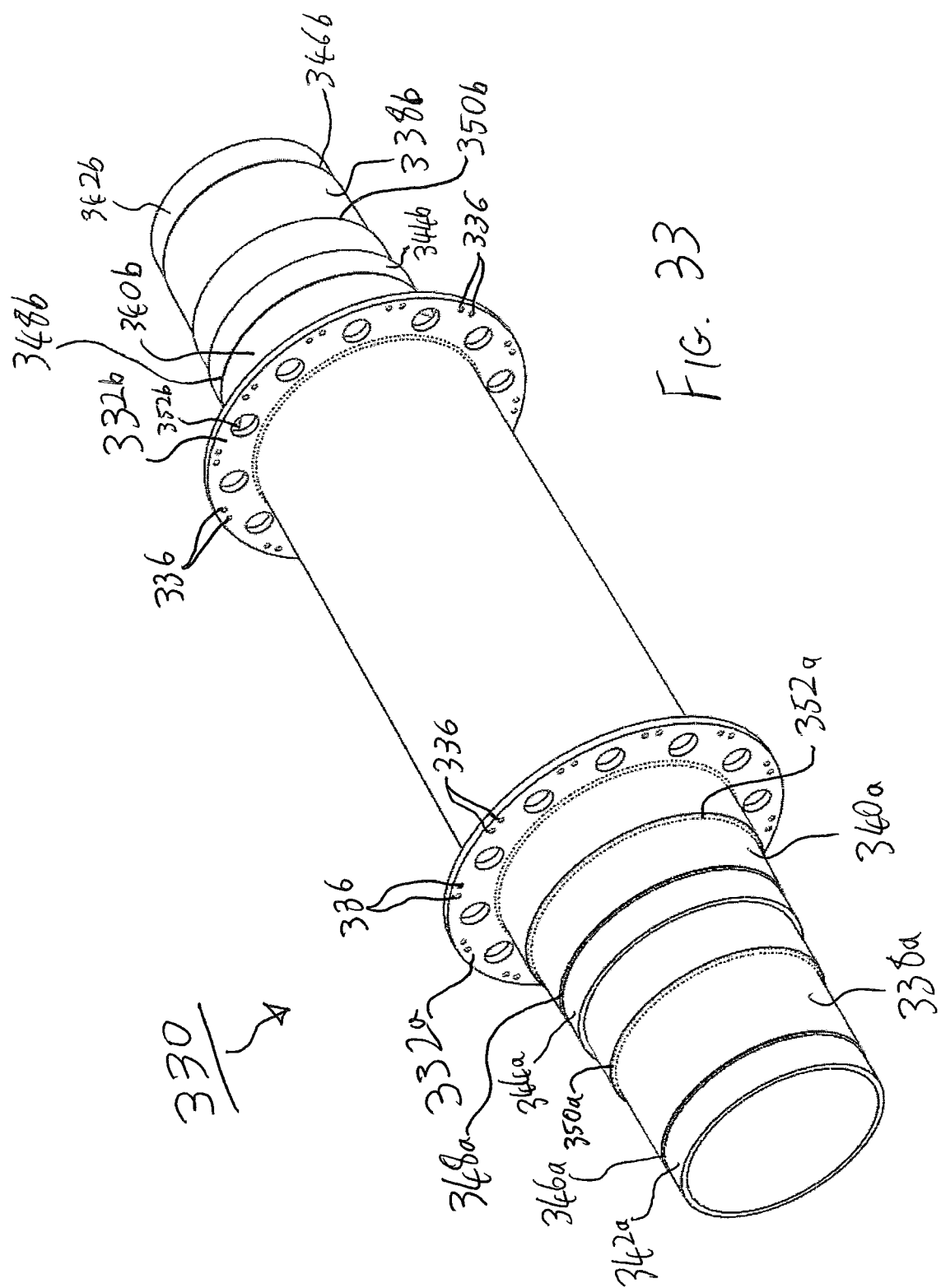

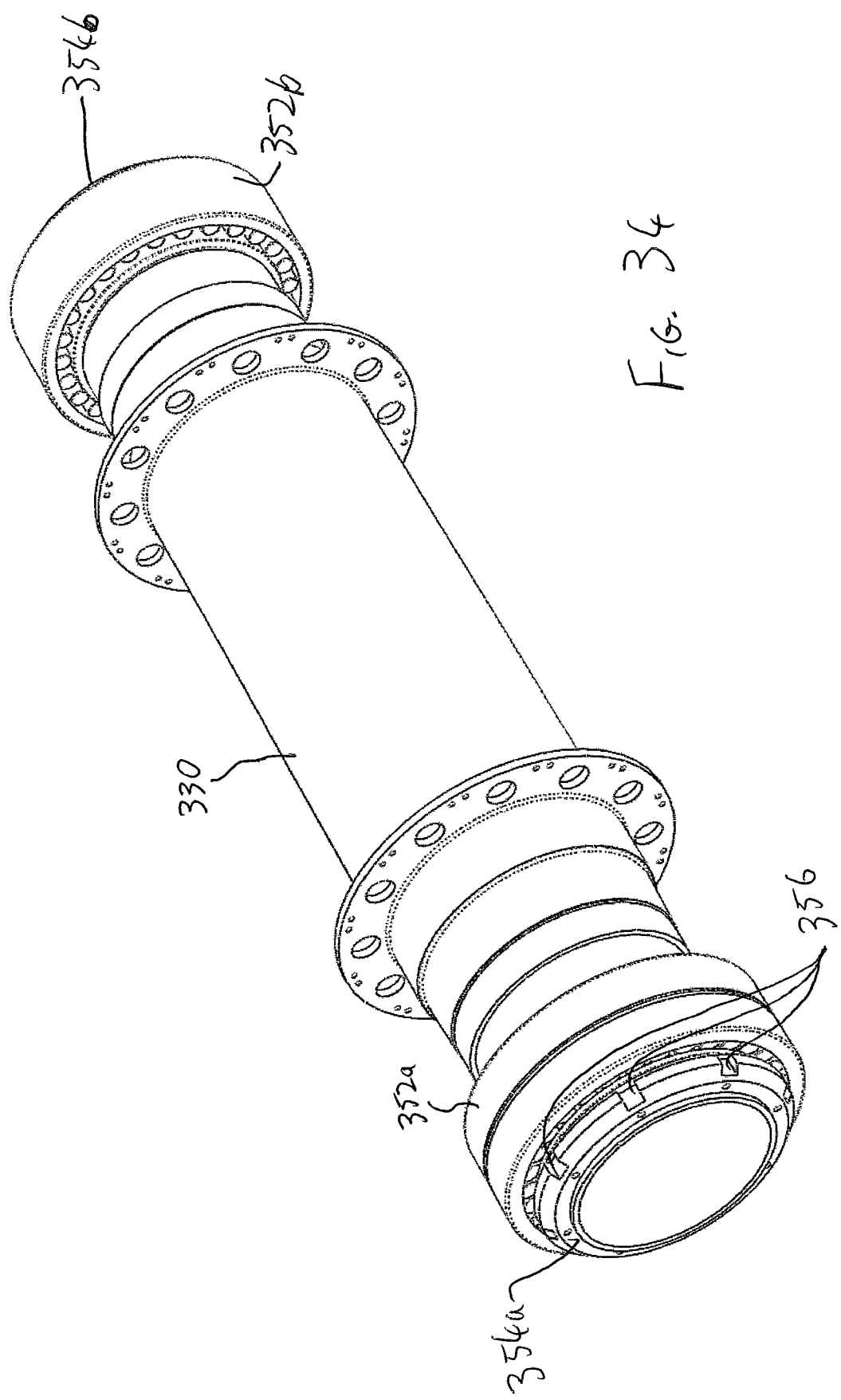

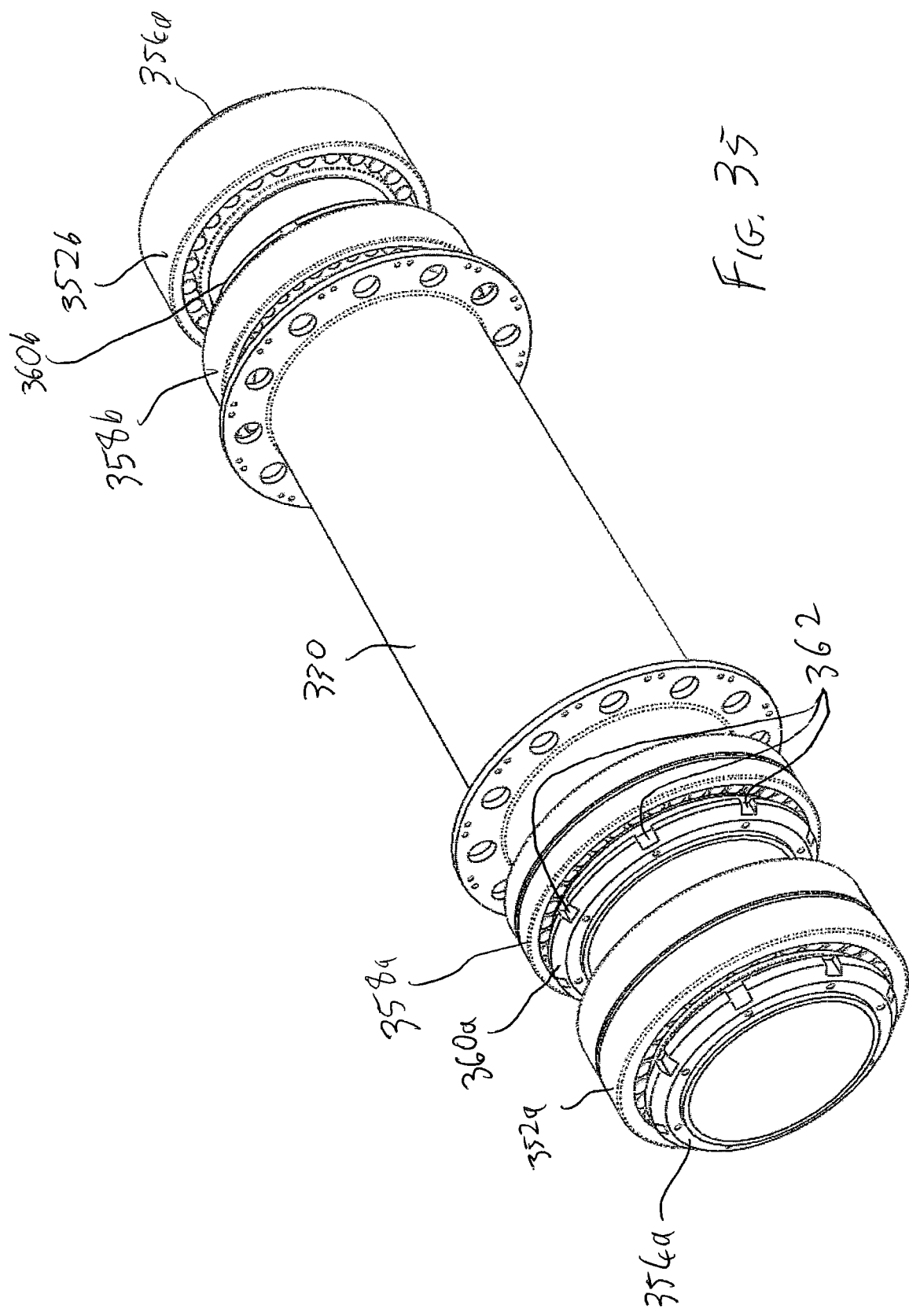

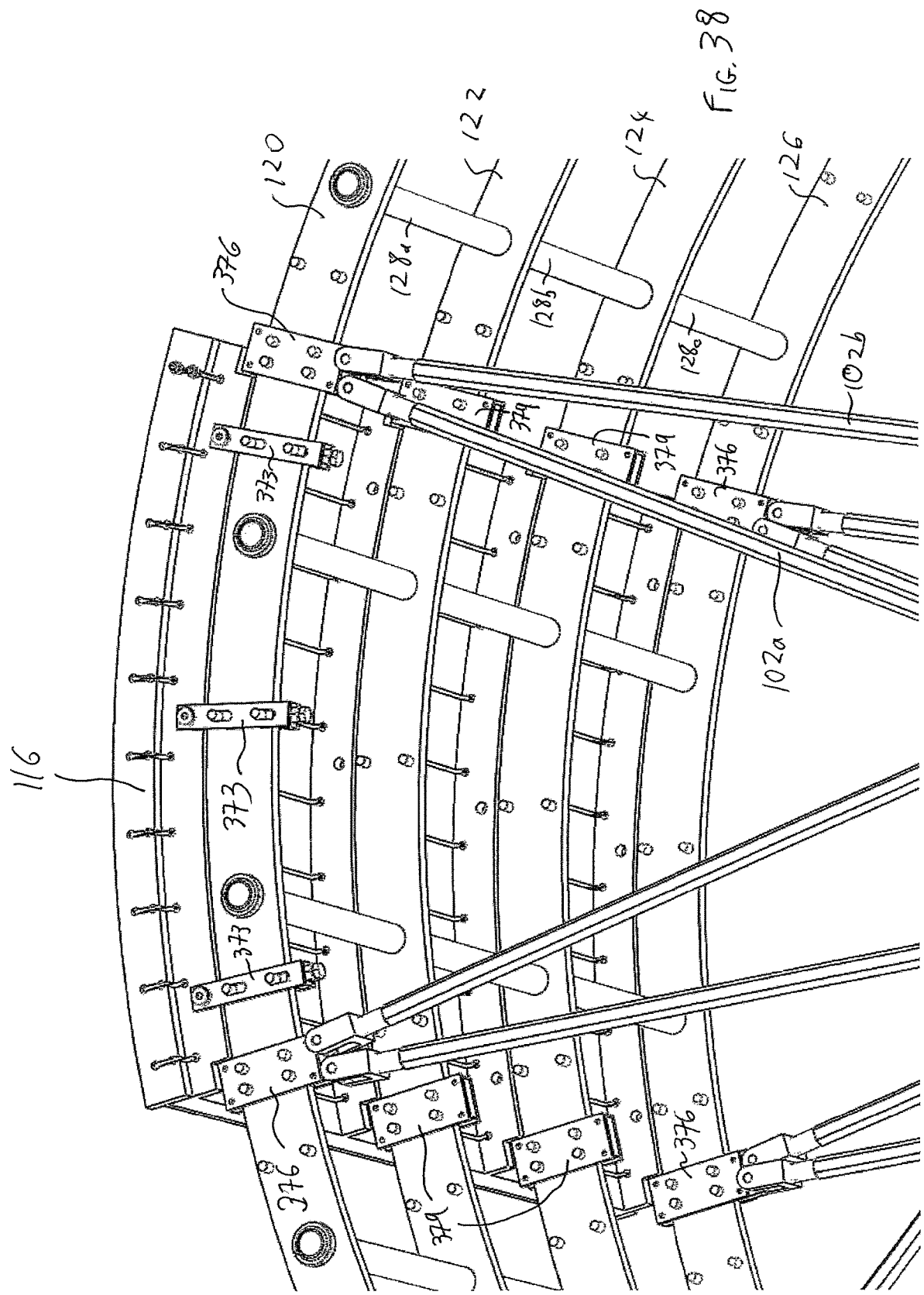

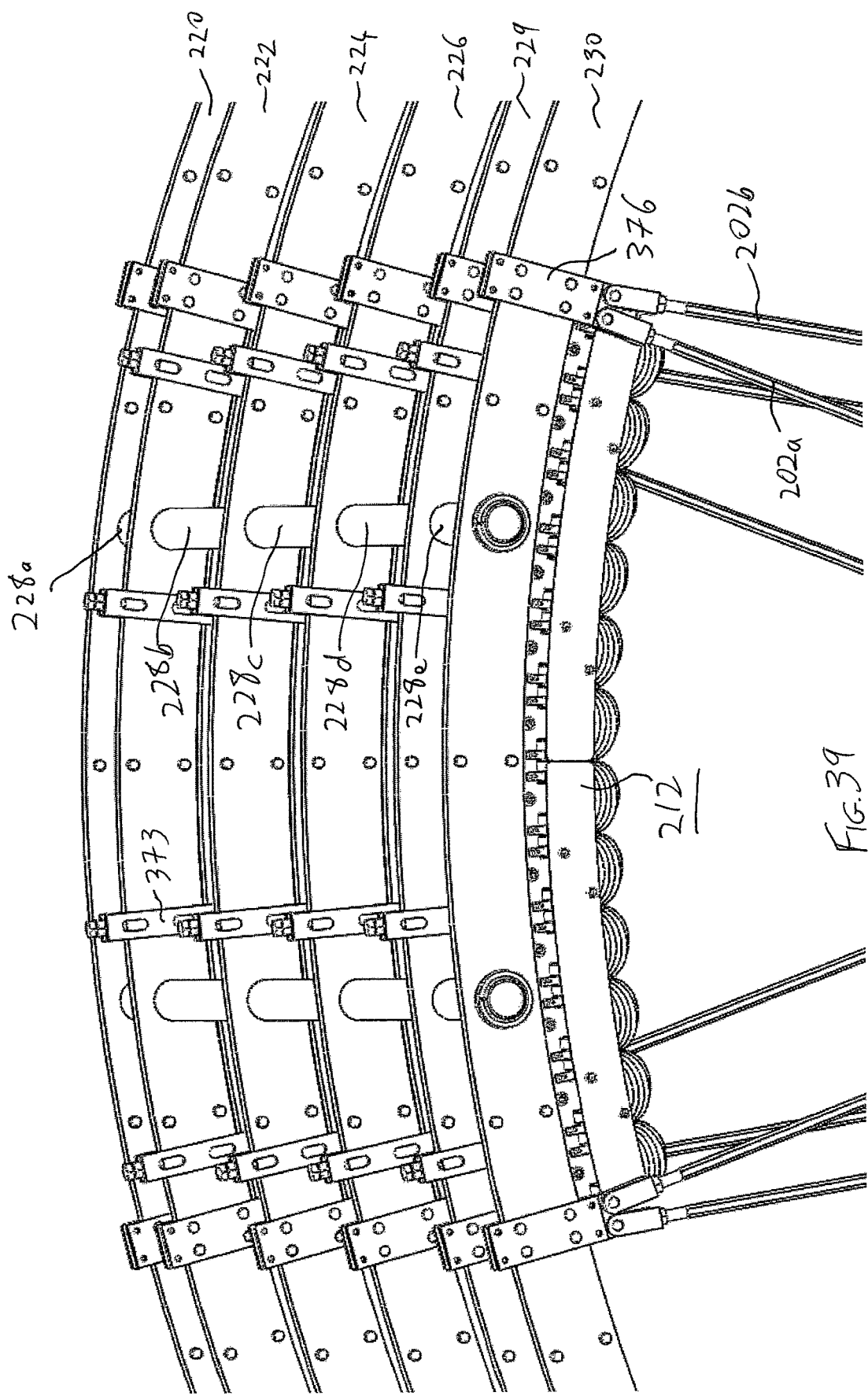

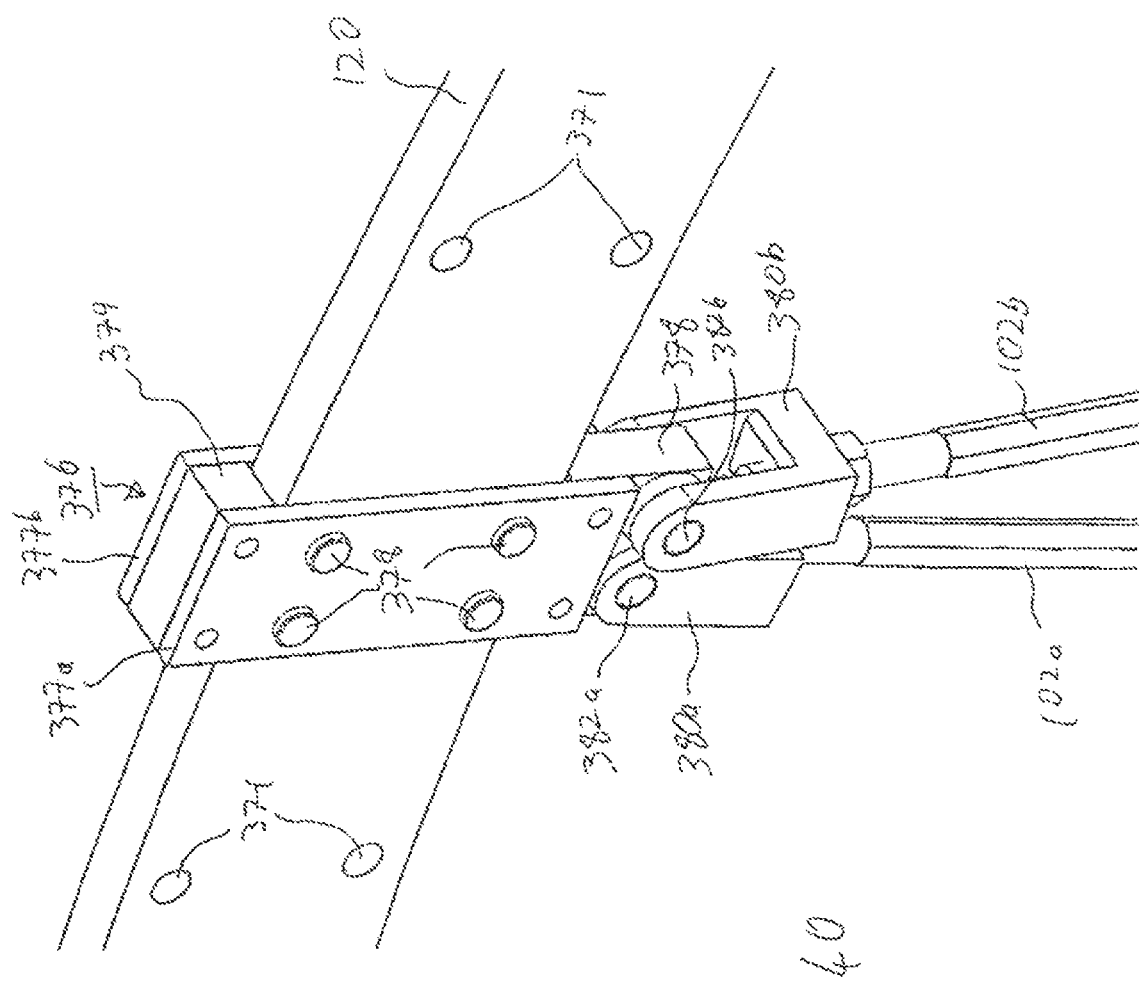

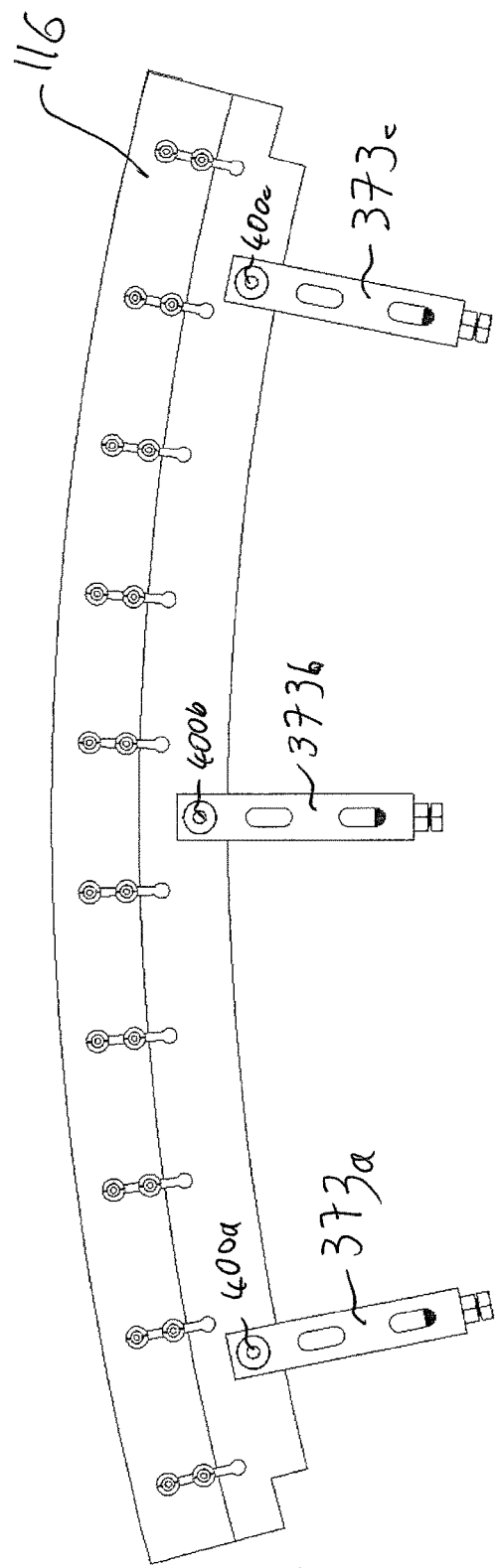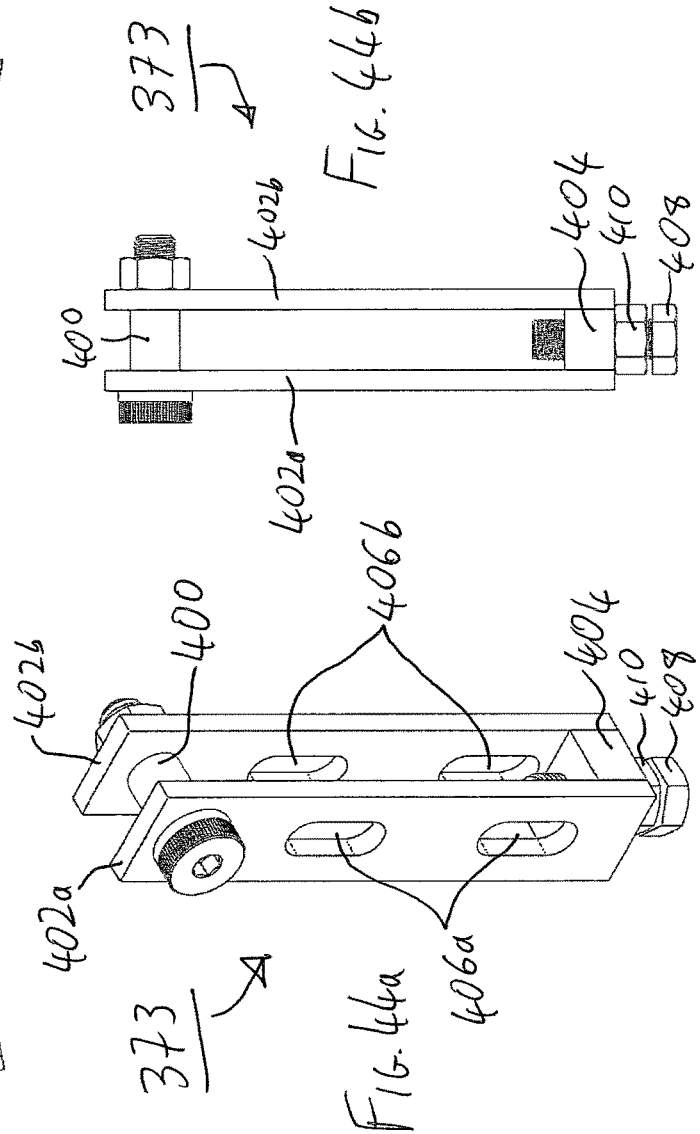

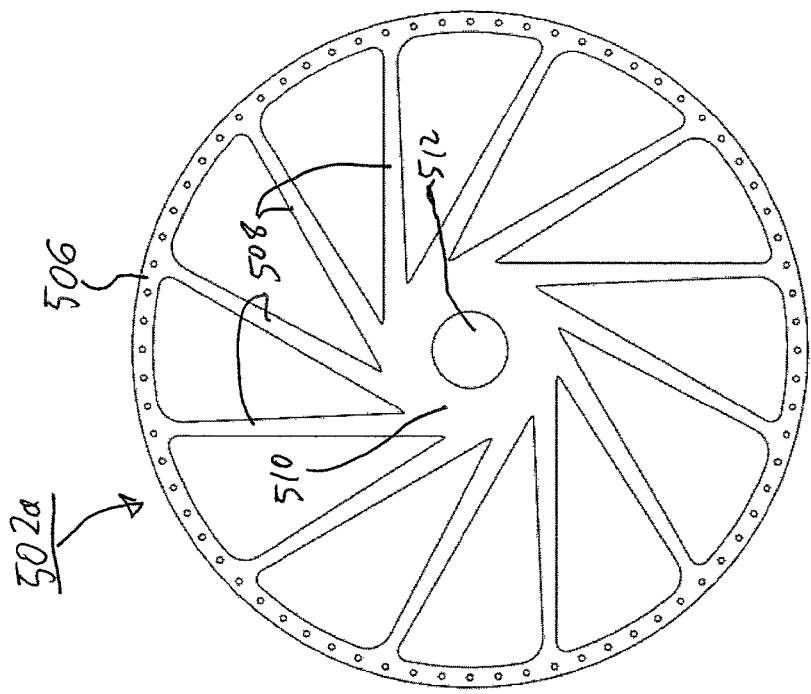
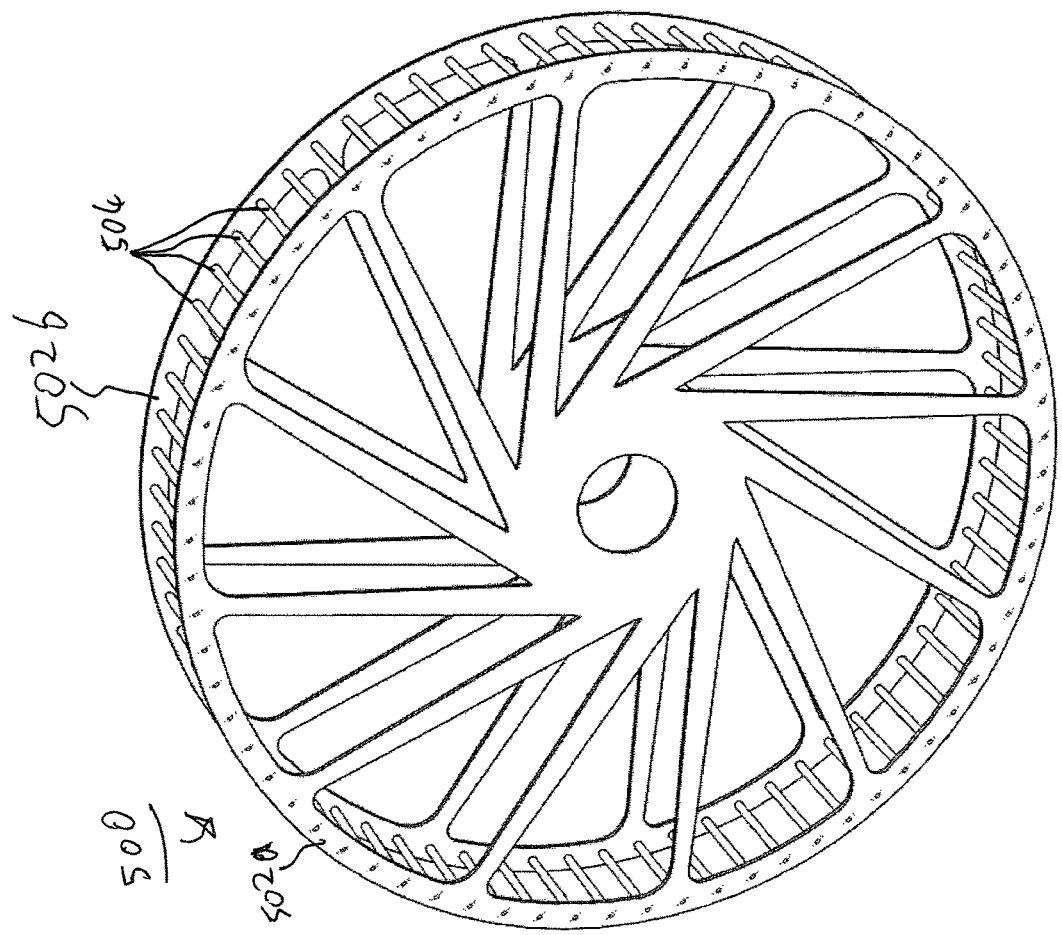

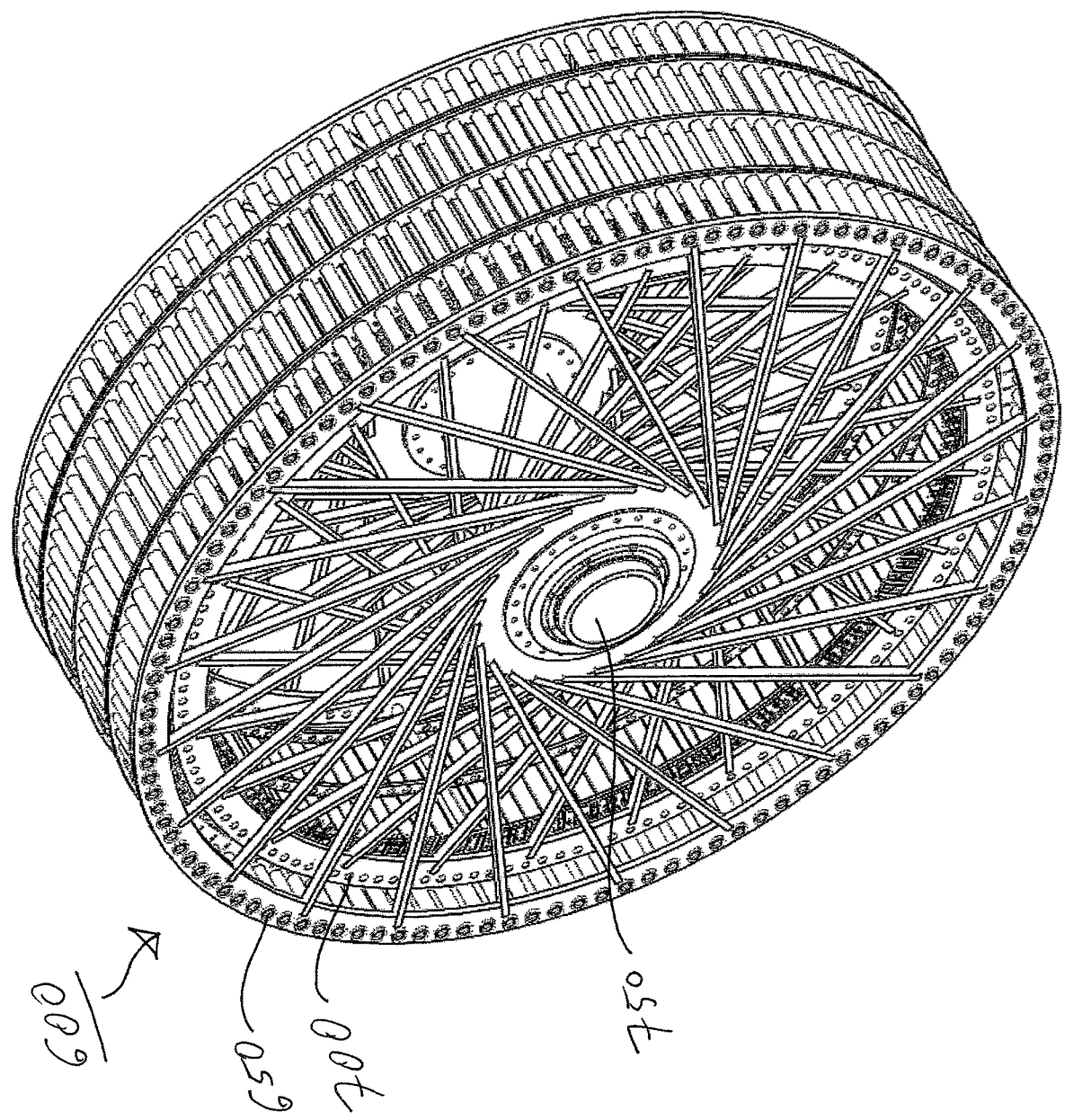

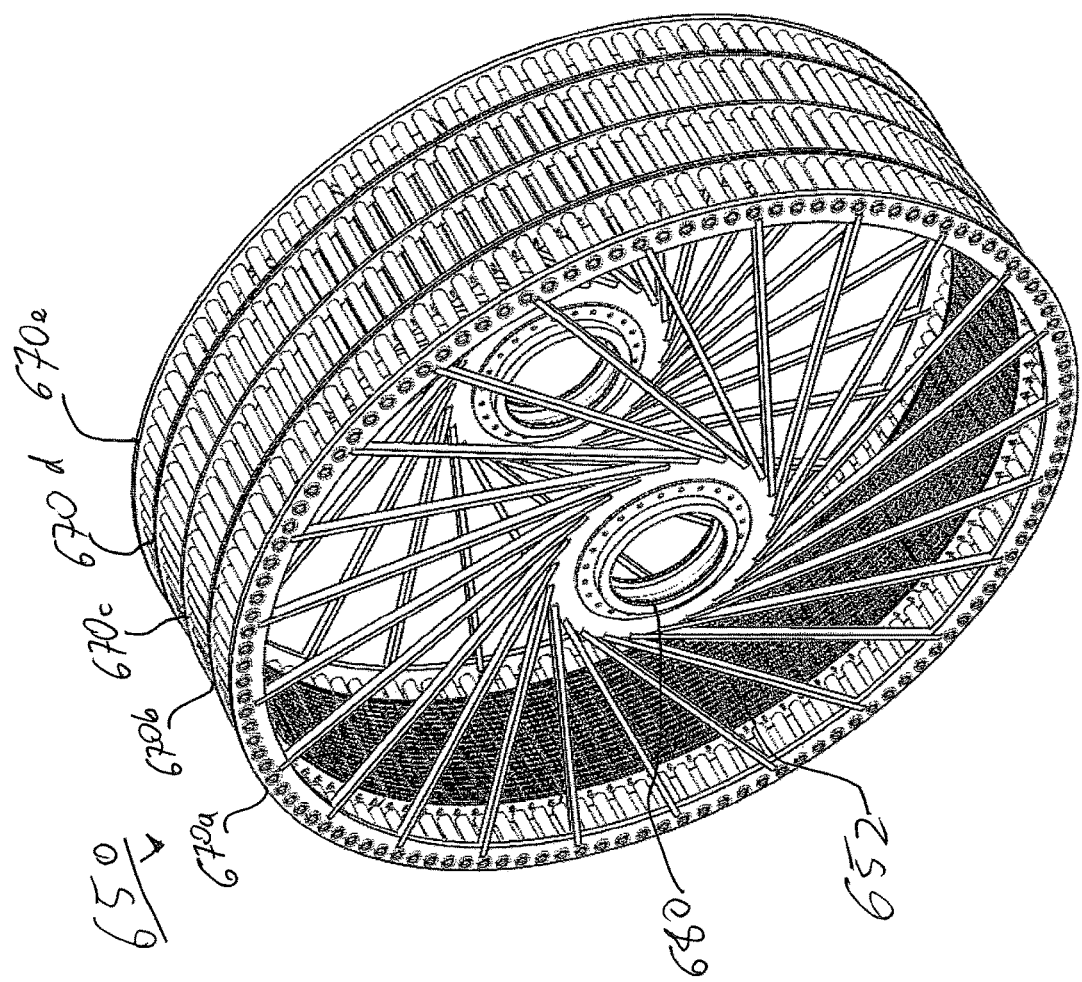

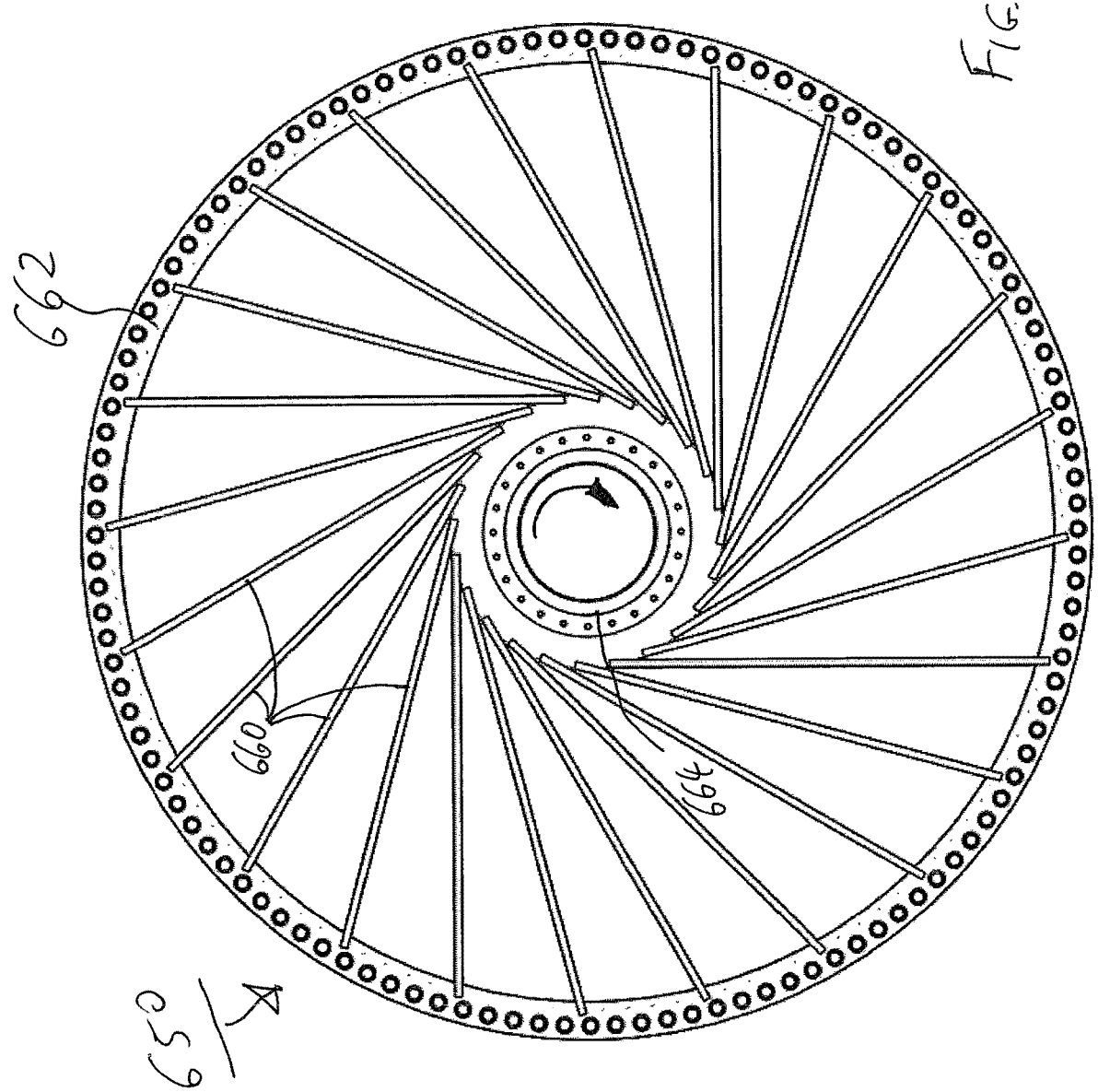

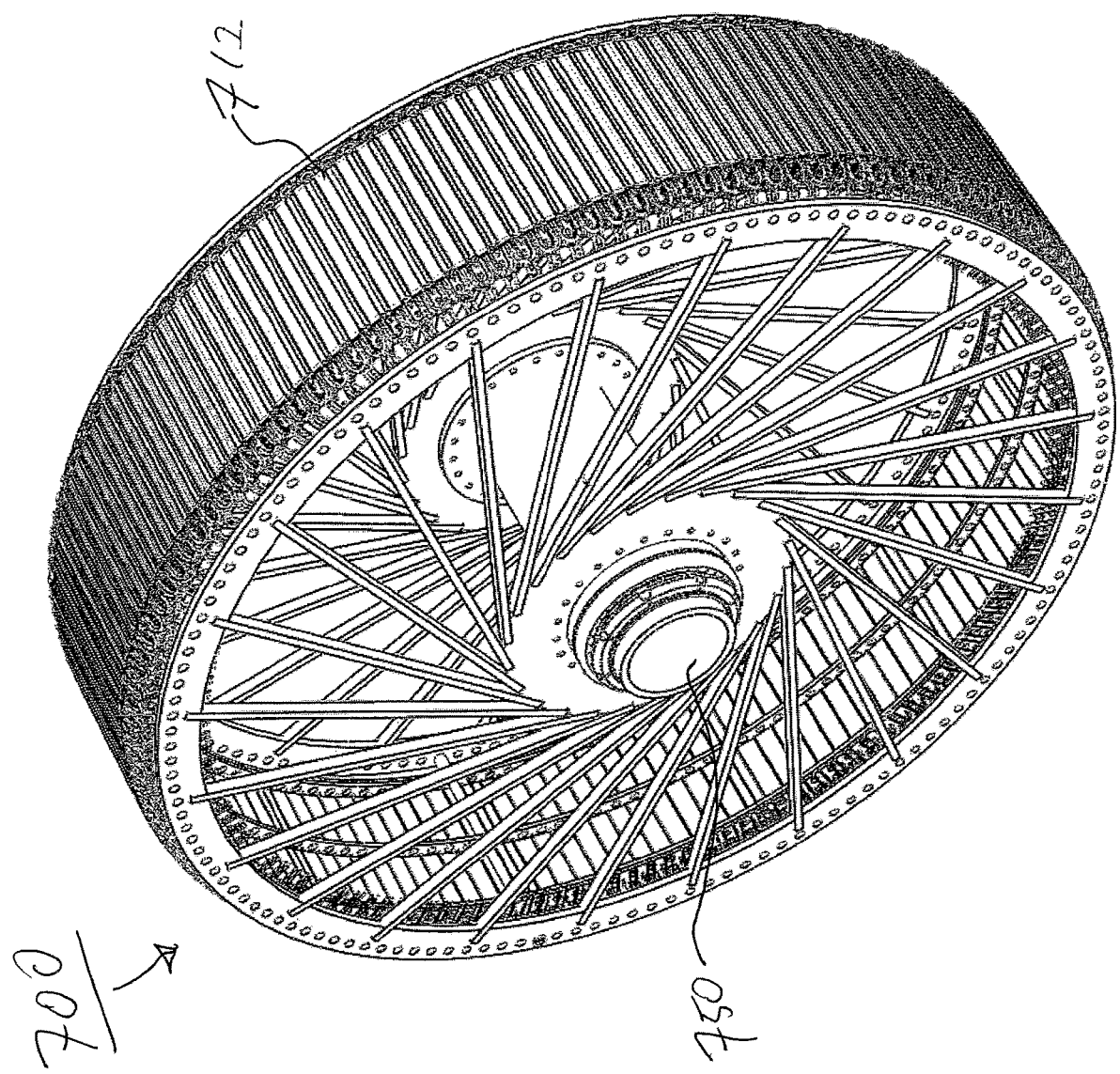

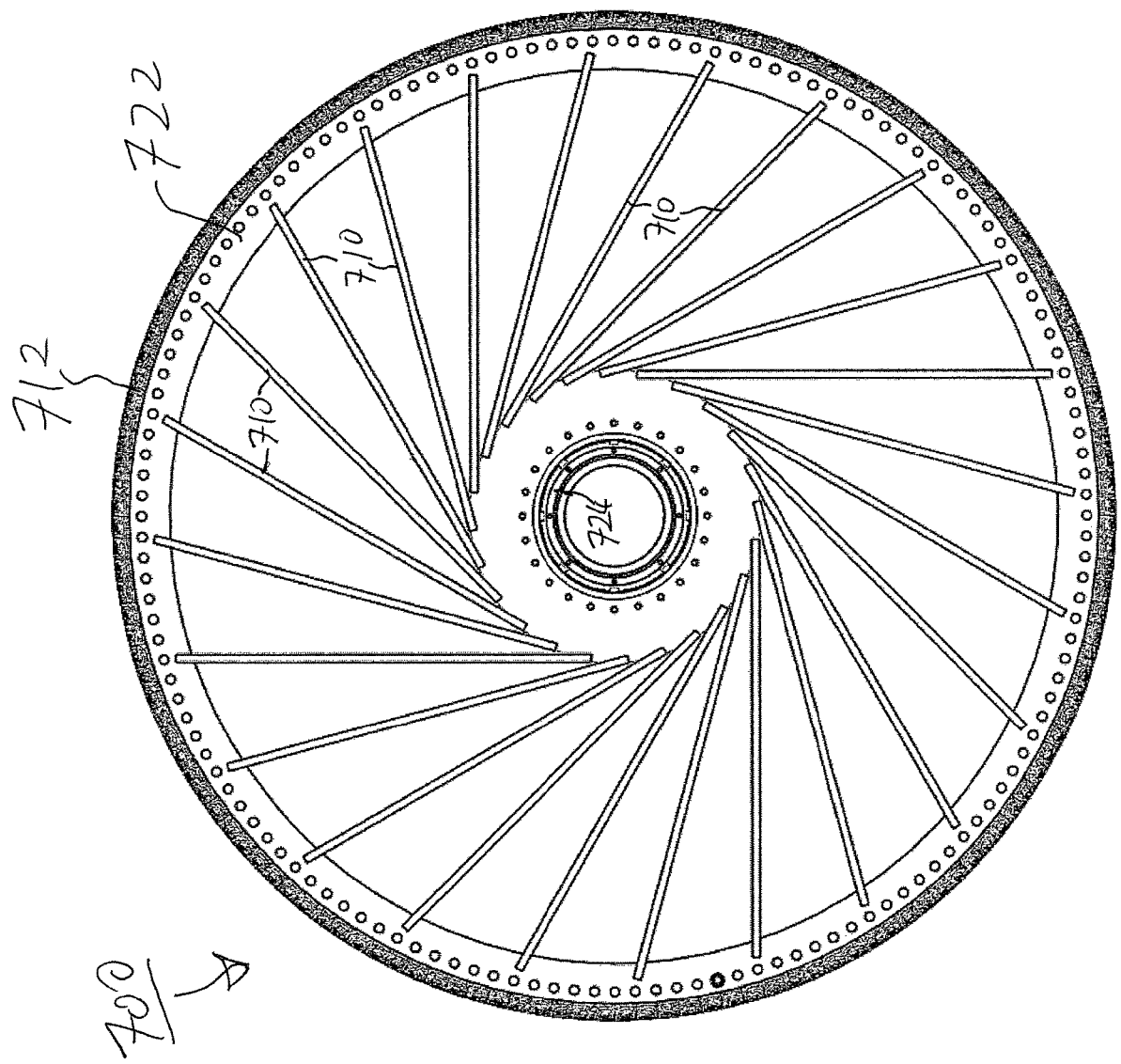

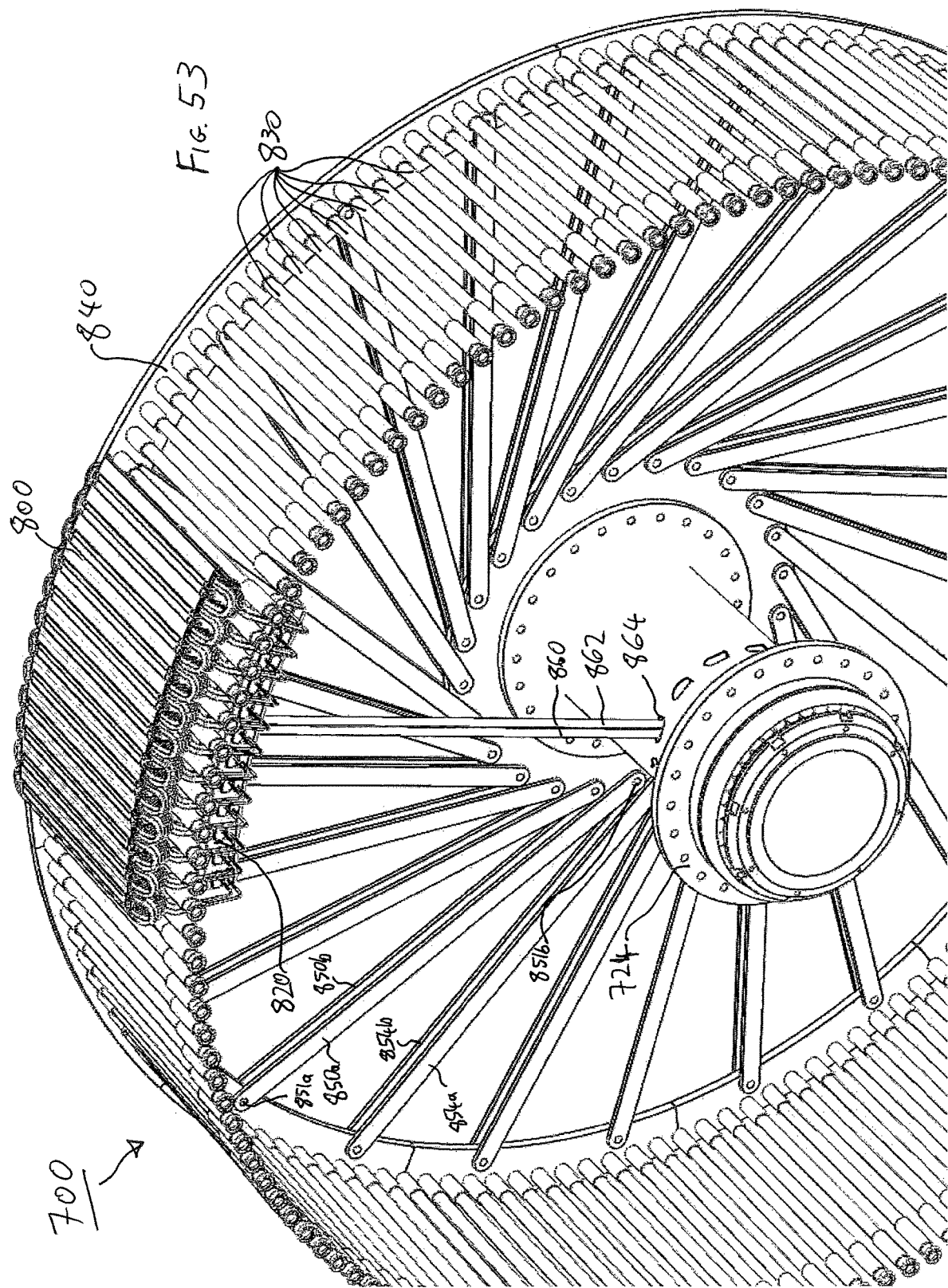

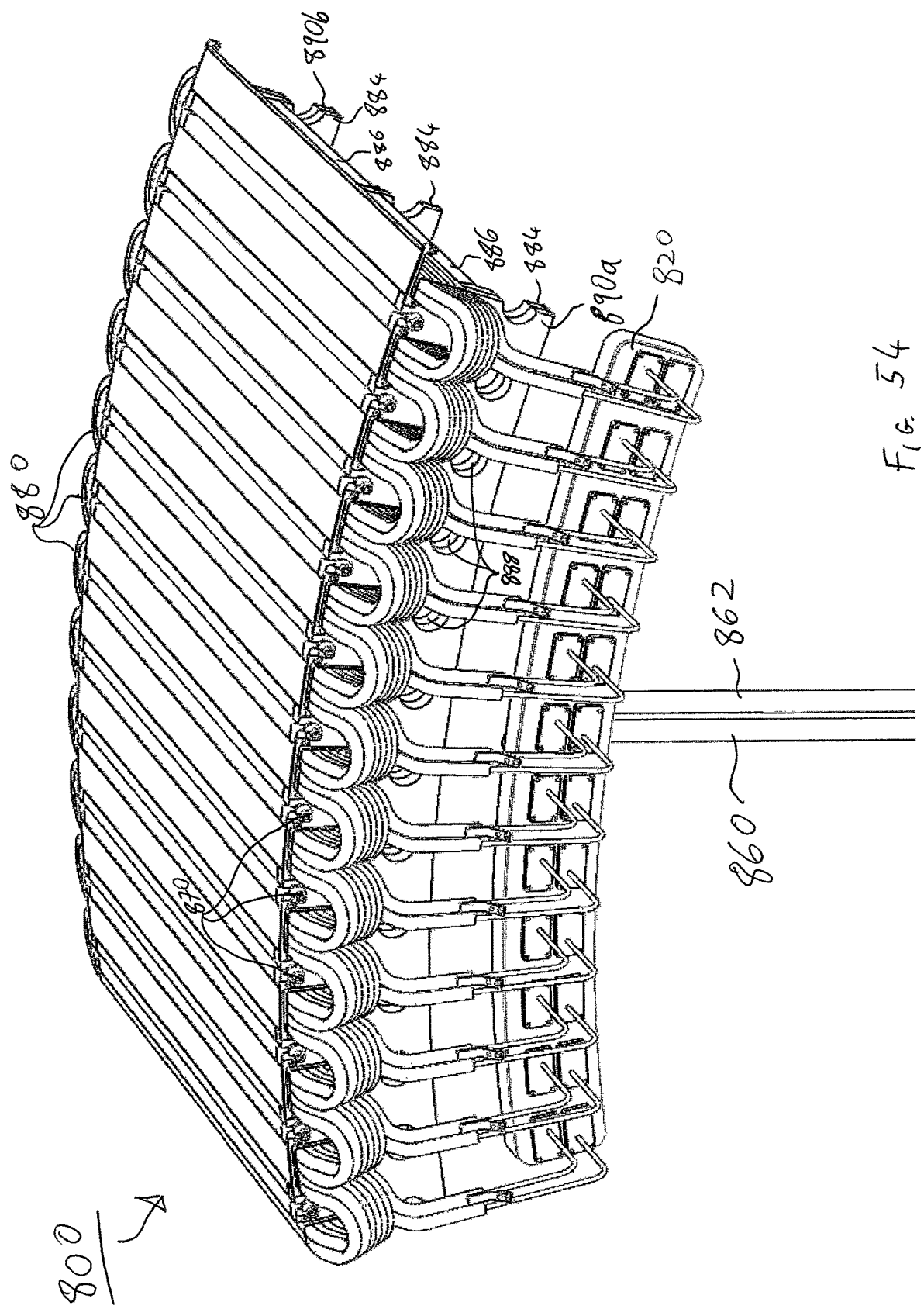

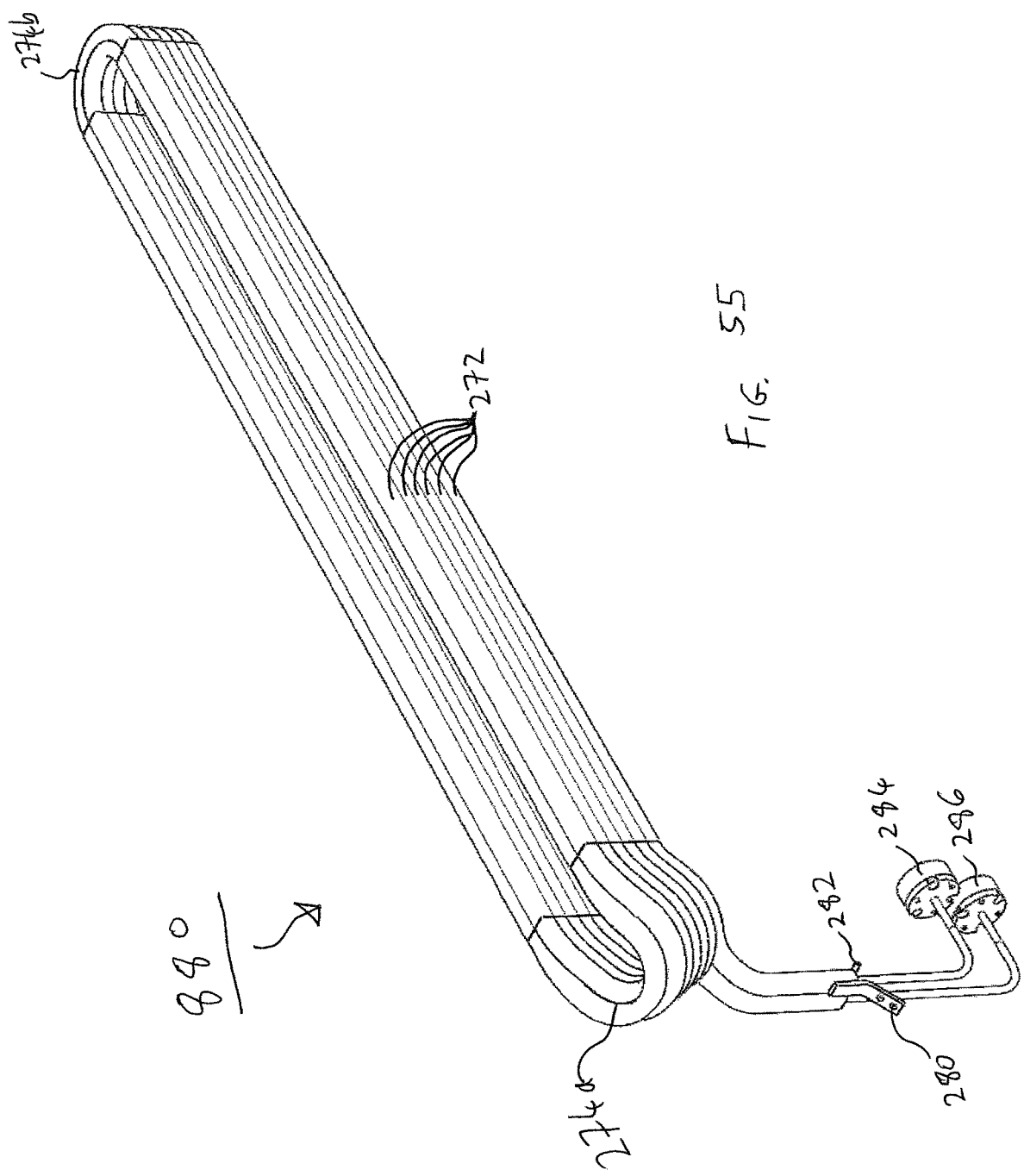

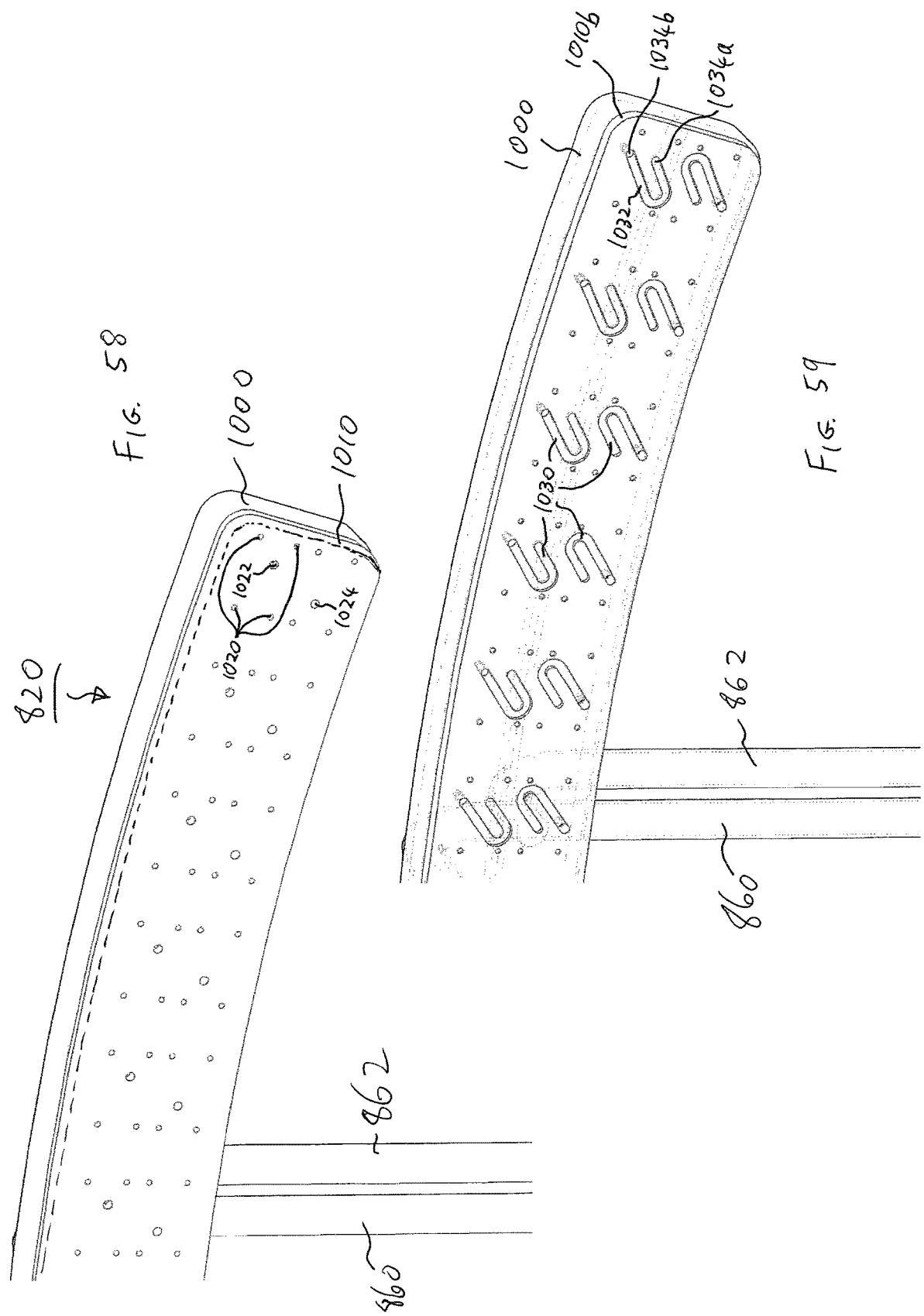

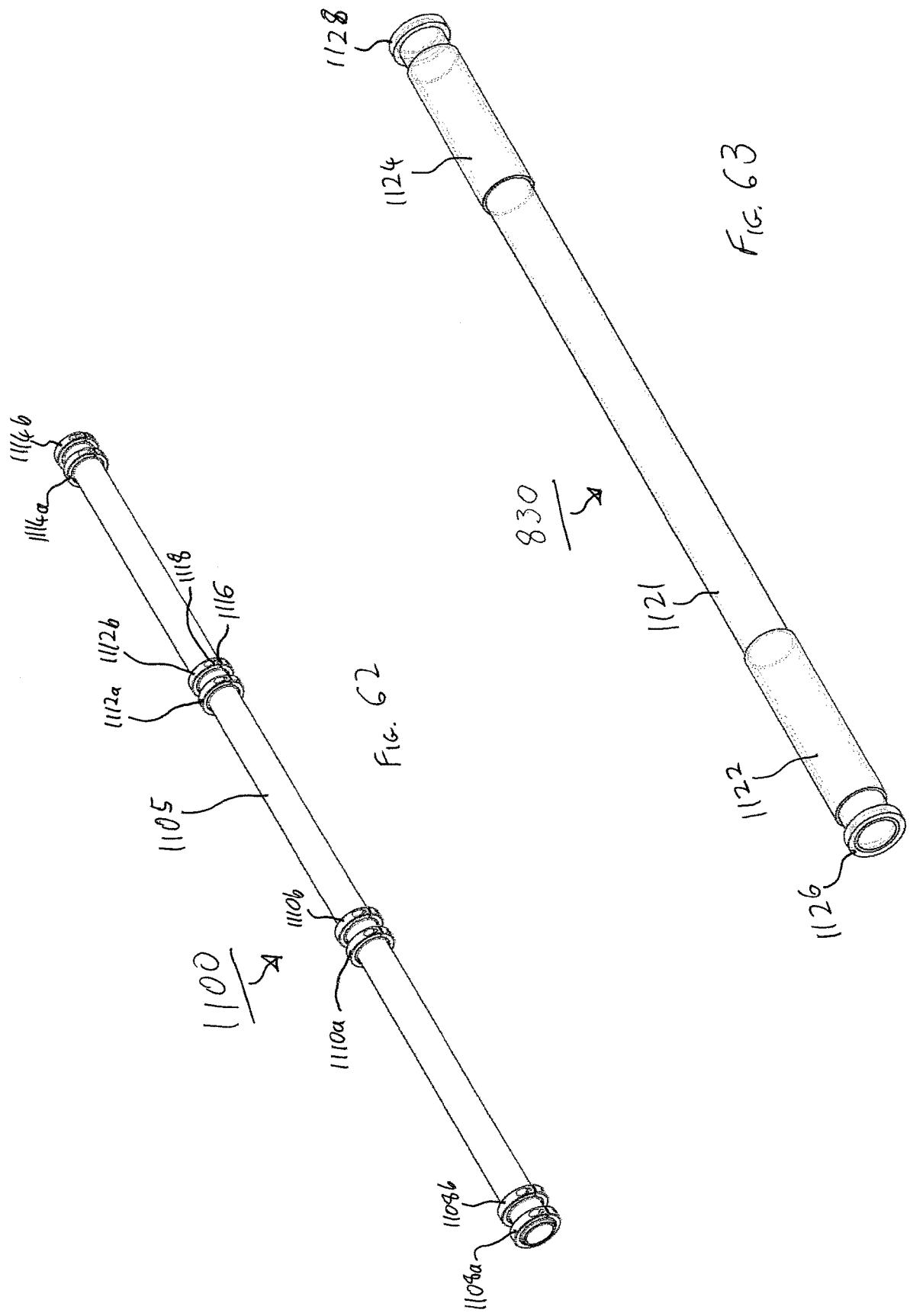

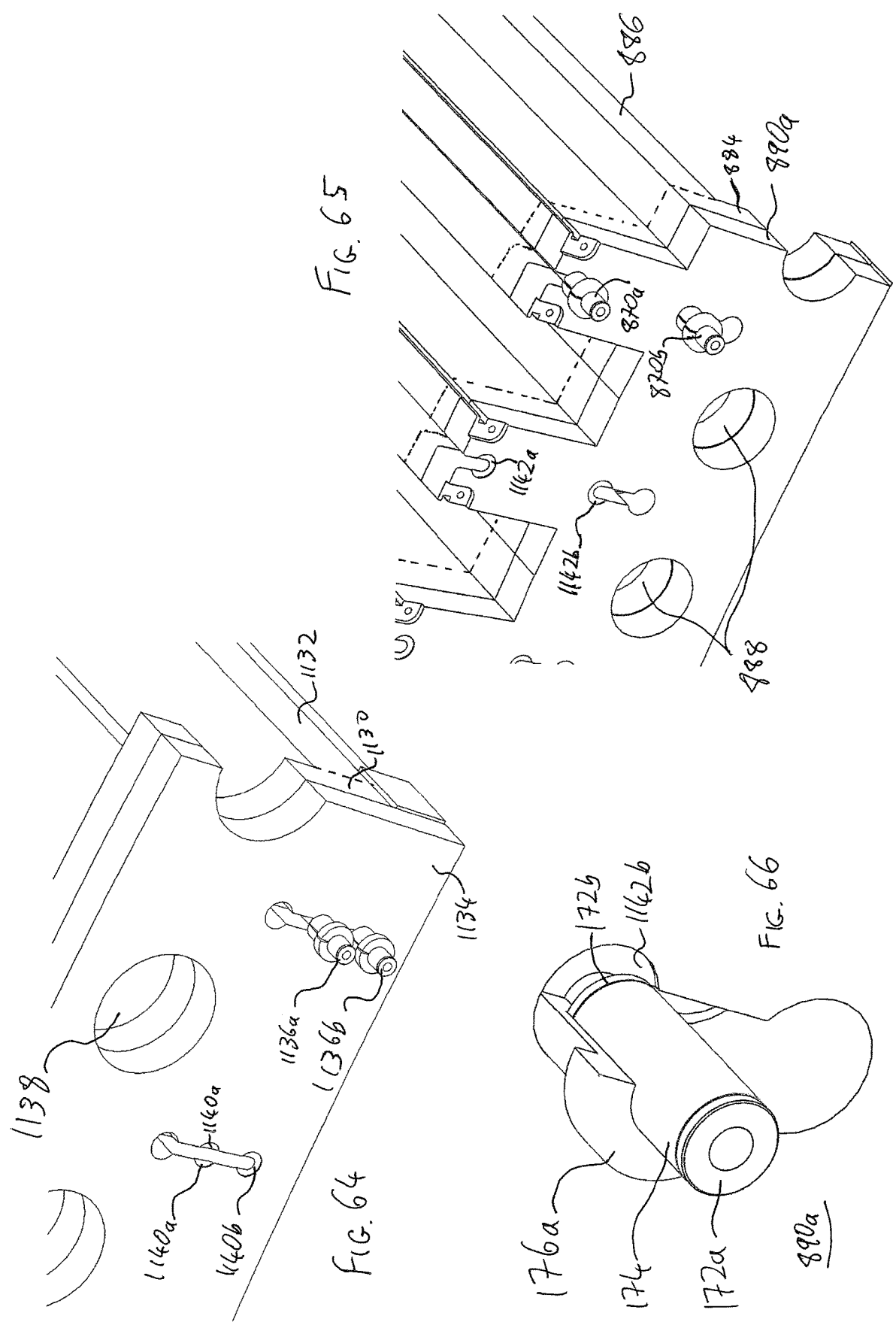

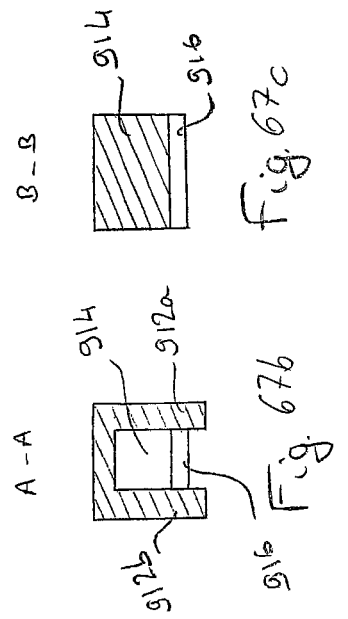
Fig. 67c
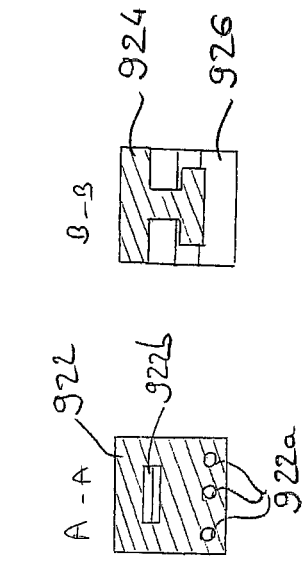
Fig. 68c
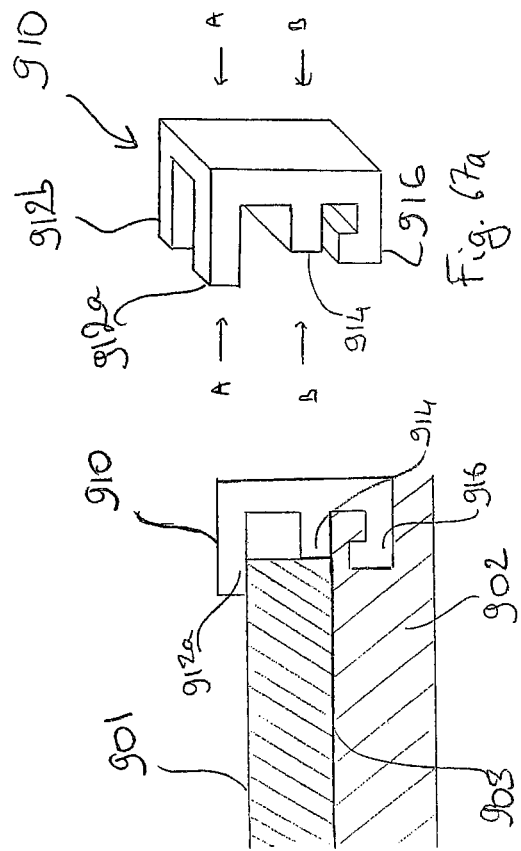
Fig. 67b
Fig. 67a
Fig. 67d
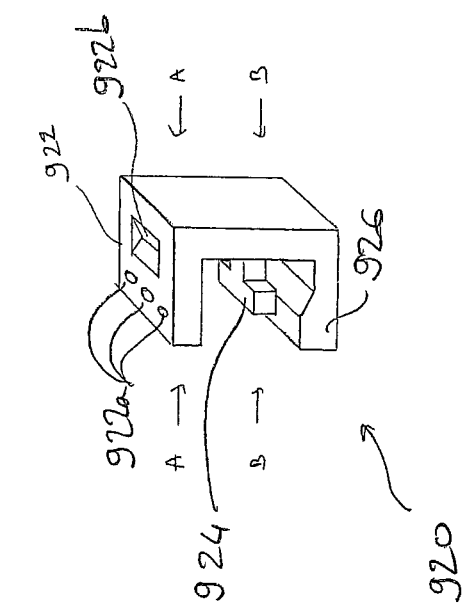
Fig. 68b
Fig. 68a

ELECTRICAL MACHINE

RELATED APPLICATION DATA

This application is a divisional of U.S. patent application Ser. No. 14/425,085 filed Mar. 2, 2015, which is a national phase of International Patent Application No. PCT/IB2013/058098 filed Aug. 29, 2013, which claims priority of United Kingdom Applications Nos. 1215534.7, 1215543.8, 1215525.5, 1215530.5, 1215528.9 and 1215532.1, each filed Aug. 31, 2012, all of which are hereby incorporated herein by reference.

BACKGROUND

The present disclosure relates to an electrical machine.

Over the past few decades, wind turbines have increasingly been used as energy converters, for example to provide electricity to a national electricity grid. Such wind turbines are considered to utilize renewable energy sources, unlike fossil fuels. It is predicted that fossil fuels may become increasingly expensive and difficult to obtain in the future, and therefore wind turbines are likely to play an increasingly important role for renewable energy.

Wind turbines are often deployed in so-called "wind farms" where a plurality of wind turbines are located within a particular area, for example an area which provides favourable wind conditions in which to operate the wind turbines. Wind farms may often be located in remote locations or situated out at sea so as to minimize disturbance to local inhabitants, and so as to try to provide wind conditions which promote efficient operation of the wind turbines.

Wind turbines typically comprise turbine blades and a generator for generating electricity. In some common designs of wind turbine, the wind turbine comprises a gear box located between the turbine blades and the generator to increase rotational speed sufficiently to be able to drive the generator efficiently. However, reliability of the gear box has been shown to be a problem, especially over the expected operational life span of the wind turbine, which is often more than twenty years. Given that wind turbines are often situated in remote and difficult to access locations, this can create a problem for servicing and maintaining reliability of the wind turbine.

Therefore, there has been recent interest in so-called "direct drive" wind turbines, in which the turbine blades are directly connected to the generator so that a rotor of the generator rotates at the same rotational speed as the turbine blades. The gear box can thus be omitted, saving weight and improving reliability. However, if the gear box is omitted, torque required increases over that required for a generator with a gear box and so the size of the electrical machine needs to be increased. However, as the diameter of the generator is increased, the overall weight of the generator will also increase. However, in most horizontal axis wind turbines, the generator is located within a nacelle at the top of a support tower and during assembly is typically winched into place by a suitable crane. This tends to place an upper practical limit on the weight of the generator of around 100 metric tons.

SUMMARY

It is therefore desirable to be able to provide a generator with reduced weight and improved efficiency, for example so that the diameter of the rotor can be increased without a large corresponding increase in weight. This may be especially desirable if the wind turbine is to be located at relatively inaccessible locations, such as an off shore wind farm.

In a first aspect, there is provided a segment for supporting electromagnetic coupling elements of a stator or rotor of an electrical machine, comprising: a plurality of elongate laminations which are stacked in a first direction to form a lamination stack with elongate edges of the laminations defining opposite first and second major faces of the lamination stack; and a plurality of elongate compression devices passing internally through the lamination stack in the first direction and arranged to compress together the laminations in the lamination stack.

In a second aspect, there is provided a compression device comprising: a central rod portion having first and second ends; and first and second anchor portions at respective ones of the first and second ends of the central rod portion; wherein each anchor portion is of larger diameter than the adjacent part of the central rod portion.

In a third aspect, there is provided a method of installing a compression device, comprising the steps of: providing a lamination stack having laminations stacked in a first direction and a slot extending longitudinally in the first direction; providing a compression device comprising a central rod portion having first and second anchor portions at respective first and second ends of the central rod portion; inserting the compression device into the slot; applying tension to the compression device to lengthen the central rod portion; fitting first and second collars respectively to the first and second anchor portions; and releasing the applied tension to cause the collars to apply a compressive force to the lamination stack.

By providing compression devices which are substantially internal to the segment, the overall weight and size of the segment may be reduced. Additionally, the compression device may help provide a compressive force on the laminations which may be maintained more easily over the lifetime of the electrical machine.

In a fourth aspect, there is provided a magnet mounting system for a stator or rotor of an electrical machine, the system comprising: a magnet mount comprising: a mounting surface for mounting a magnet; and a unit engaging portion comprising a mounting lip being arranged to engage with a corresponding magnet securing unit for securing a magnet onto the mounting surface; a magnet mounted on the mounting surface; and a magnet securing unit for securing the magnet onto the mounting surface, the magnet securing unit comprising: a securing lip portion shaped to engage with the mounting lip; a magnet holding portion comprising a magnet holding surface shaped to engage with a magnet so as to hold the magnet onto the magnet mount; and a connecting portion for connecting the securing lip portion and the magnet holding portion, wherein the magnet securing unit is arranged to restrict movement of the magnet away from the magnet mount when the securing lip portion is engaged with the mounting lip.

In a fifth aspect, there is provided a magnet mount for mounting one or more magnets onto a stator or rotor of an electrical machine, the magnet mount comprising: a mounting surface for mounting one or more magnets; and a unit engaging portion comprising a mounting lip arranged to engage with a corresponding magnet securing unit for securing one or more magnets onto the mounting surface.

In a sixth aspect, there is provided a lamination for forming a magnet mount of a plurality of laminations, the magnet mount being for mounting one or more magnets onto a stator or rotor of an electrical machine, wherein the lamination comprises: a mounting surface for mounting one or more magnets; and a unit engaging portion comprising a mounting lip arranged to engage with a corresponding magnet securing unit for securing one or more magnets onto the mounting surface.

In a seventh aspect, there is provided a magnet securing unit for securing one or more magnets onto a magnet mount of a stator or rotor of an electrical machine, the magnet securing unit comprising: a securing lip portion shaped to engage with a corresponding portion of the magnet mount; a magnet holding portion comprising a magnet holding surface shaped to engage with the one or more magnets so as to hold the one or more magnets onto the magnet mount; and a connecting portion for connecting the securing lip portion and the magnet holding portion, wherein the magnet securing unit is shaped to restrict movement of the one or more magnets mounted onto the magnet mount away from the magnet mount when the securing lip portion is engaged with the corresponding portion of the magnet mount.

Magnets of an electrical machine may therefore be able to be retained more securely whilst reducing weight of the electrical machine.

In an eighth aspect there is provided a fluid manifold for an electrical machine, the electrical machine comprising a plurality of electrical windings which comprise fluid channels through which a heat transfer fluid can pass so as to transfer heat between the fluid and the electrical windings, and the fluid manifold comprising: a main body comprising a fluid chamber; an electrically insulating element coupled to the main body, the insulating element comprising a plurality of fluid ports for fluidic communication with the fluid channels of the electrical windings and a plurality of electrically insulating fluid channels in fluid communication with the fluid chamber and the fluid connectors.

For example, the use of an electrically insulating element electrical may help improve electrical isolation between electrical windings of the electrical machine and other parts of the electrical machine, which may allow reduction in size and weight of the electrical machine. Furthermore, the heat transfer fluid may be used to cool the electrical windings, which may allow the electrical machine to be made smaller and more efficient.

In a ninth aspect, there is provided a rotor for an electrical machine, the rotor comprising: a hub arranged so that the rotor can rotate with respect to a stator of the electrical machine about an axis of rotation; a rim comprising a plurality of electromagnetic coupling elements for electromagnetic coupling with a stator of the electrical machine; and a plurality of spokes arranged between the hub and the rim so as to mechanically couple the hub with the rim.

In a tenth aspect, there is provided a stator for an electrical machine, the stator comprising: a hub arranged so that a rotor of the electrical machine can rotate with respect to the stator about an axis of rotation; a rim comprising a plurality of electromagnetic coupling elements for electromagnetic coupling with a rotor of the electrical machine; and a plurality of spokes arranged between the hub and the rim so as to mechanically couple the hub with the rim.

By using a plurality of spokes, the weight of the rotor or stator may be reduced.

In an eleventh aspect, there is provided a system comprising an electrical machine comprising an electrical winding, the electrical winding including a fluid channel, the system further comprising a temperature controlled fluid source in fluid communication with the fluid channel, the temperature controlled fluid source being operable to provide a fluid to the winding to increase the temperature of the winding above the ambient temperature.

By using a temperature controlled fluid source operable to provide fluid to the winding to increase the temperature of the winding above the ambient temperature, a temperature range over which the electrical machine may be operated may be improved. For example, if the ambient temperature is below freezing, then increasing the temperature of the winding above the ambient temperature may help prevent the electrical machine from freezing if it is non-operational. This may be important if the electrical machine is located at a relatively inaccessible location, where servicing or troubleshooting may be difficult to carry out.

In a twelfth aspect, there is provided an electrical generator comprising a stator comprising one or more electrical windings, and a rotor comprising one or more permanent magnets, the rotor being arranged to be rotatable with respect to the stator about an axis of rotation, in which the rotor is located further from the axis of rotation than the stator.

For example, by positioning the rotor so that it is located further from the axis of rotation than the stator, the torque may be increased without increasing the overall external dimensions of the generator. It may therefore be possible to make the generator made smaller and lighter.

Various other respective aspects and features are defined in the appended claims.

LIST OF FIGURES

Examples of the disclosure will now be described by way of example only with reference to the accompanying drawings, in which:

FIG. 1 is a schematic diagram of a direct drive permanent magnet synchronous generator;

FIG. 3 is a schematic illustration of a rotor;

FIGS. 5a and 5b are schematic diagrams of a plurality of rotor laminations;

Figure 22:
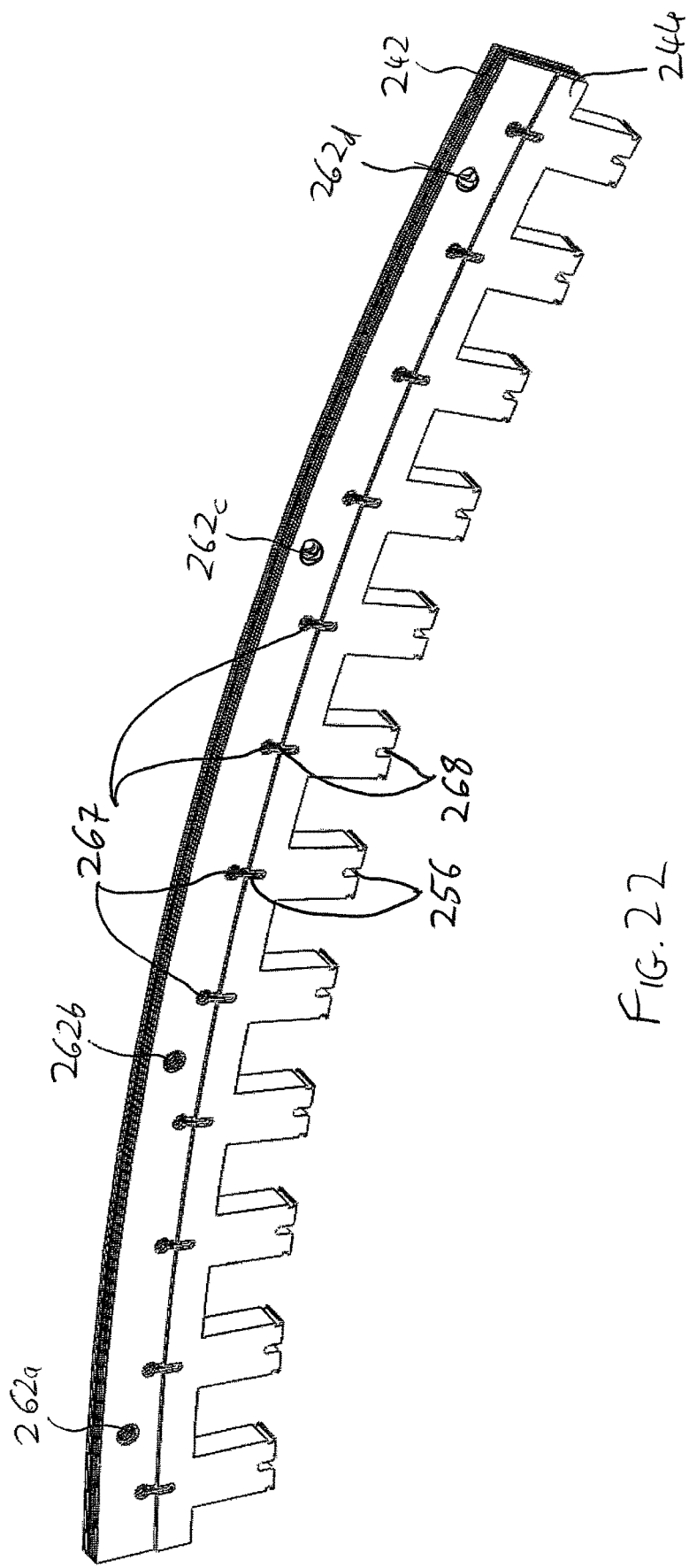
Figure 28:
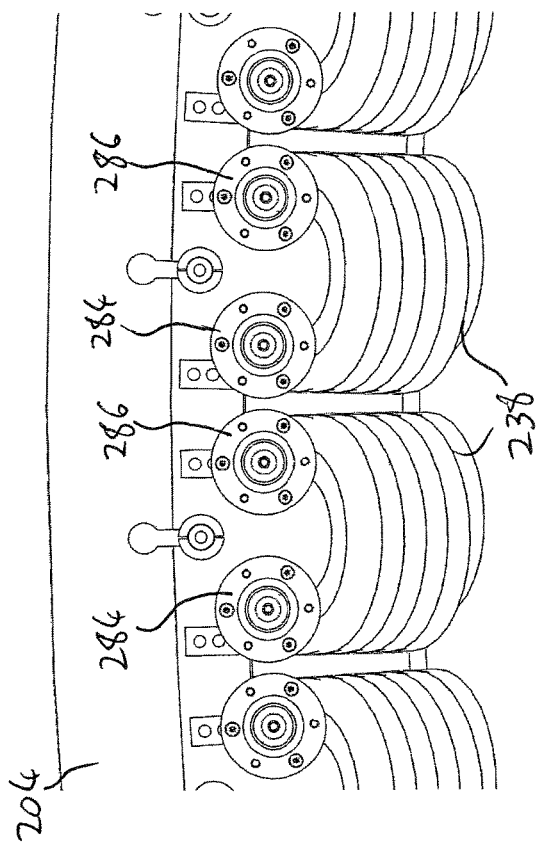
Figure 29:
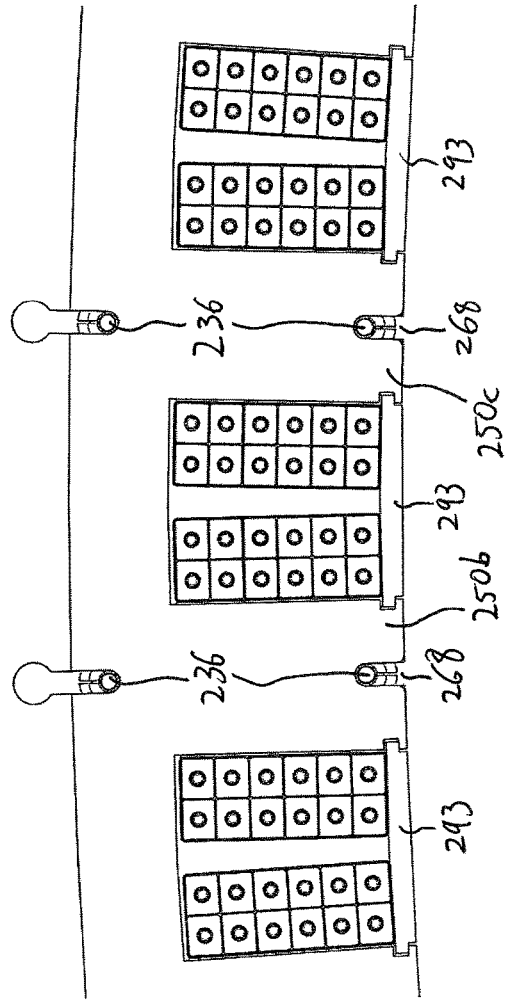
Figure 30:
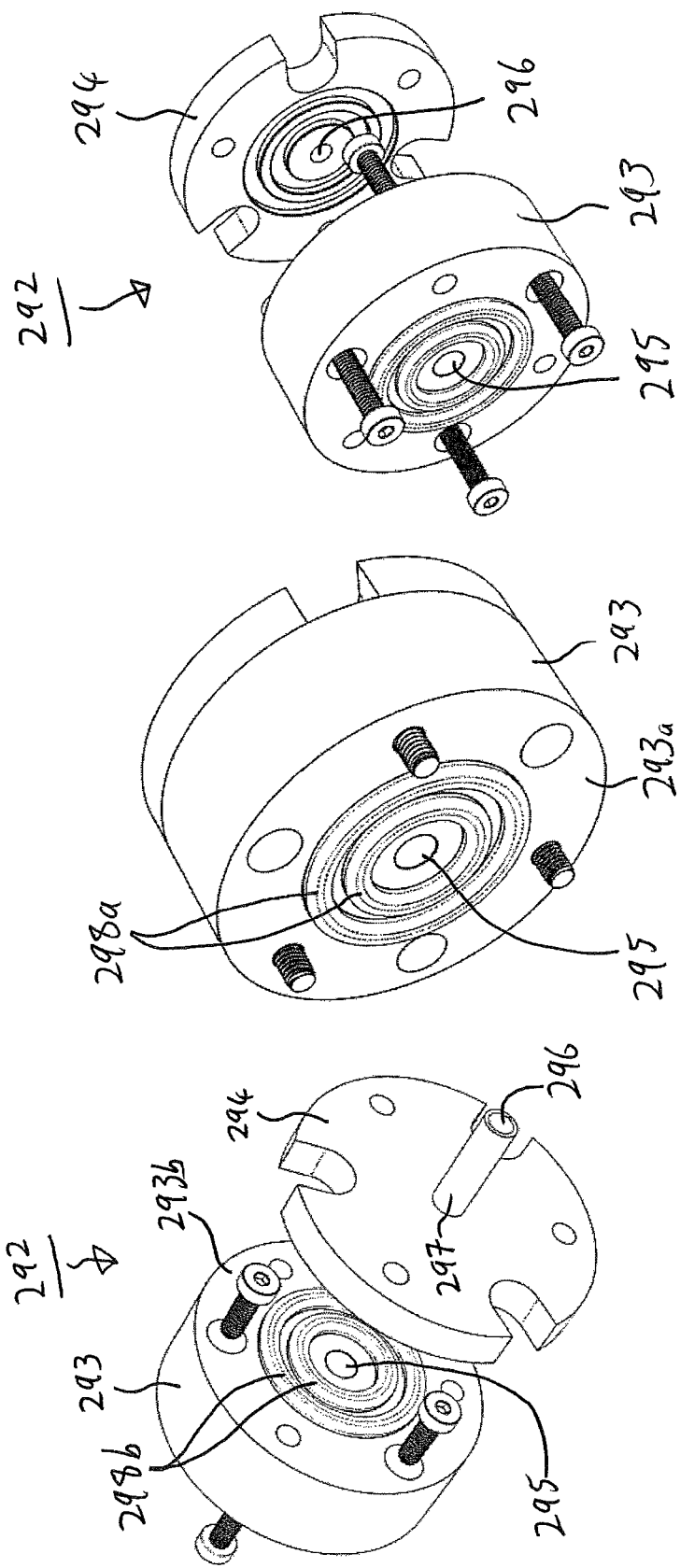
Figure 36:
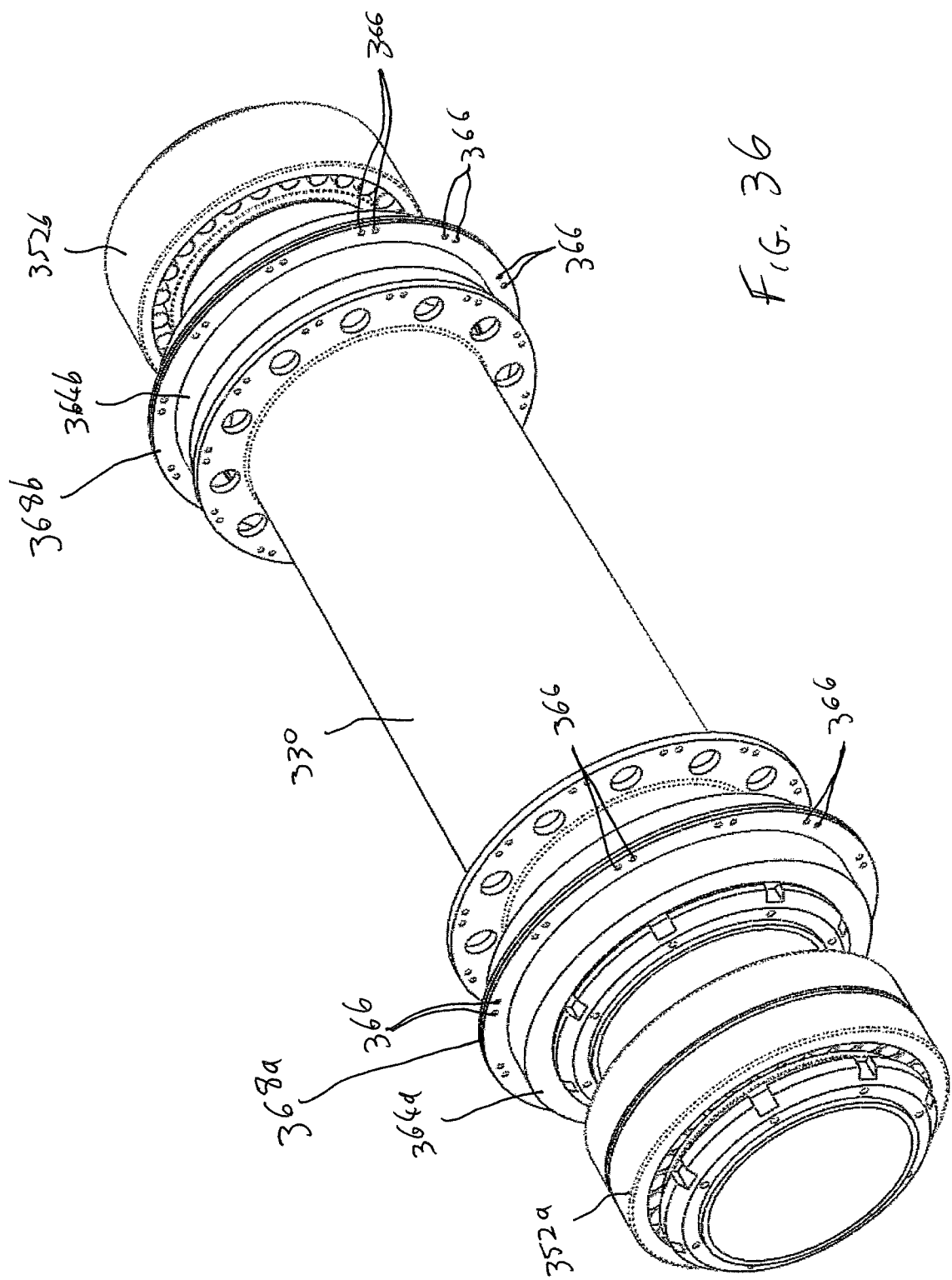
Figure 37B:
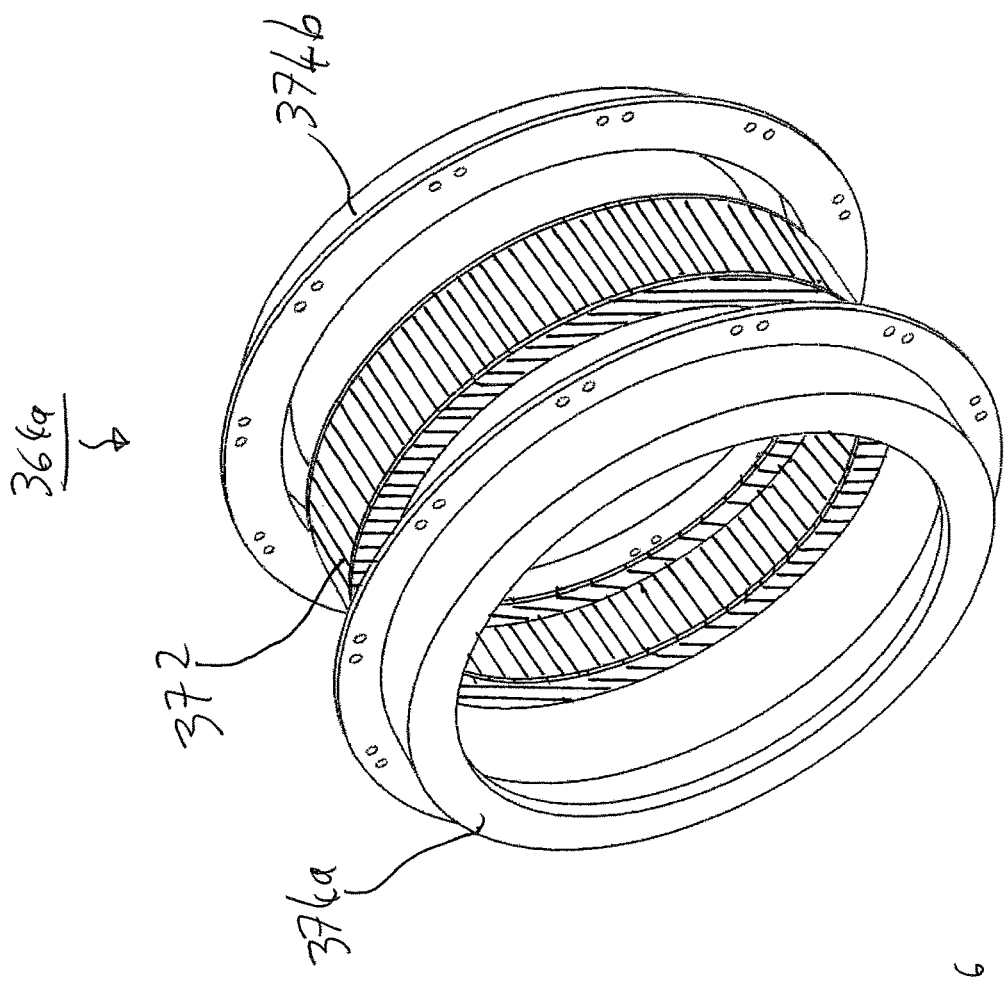
Figure 37A:
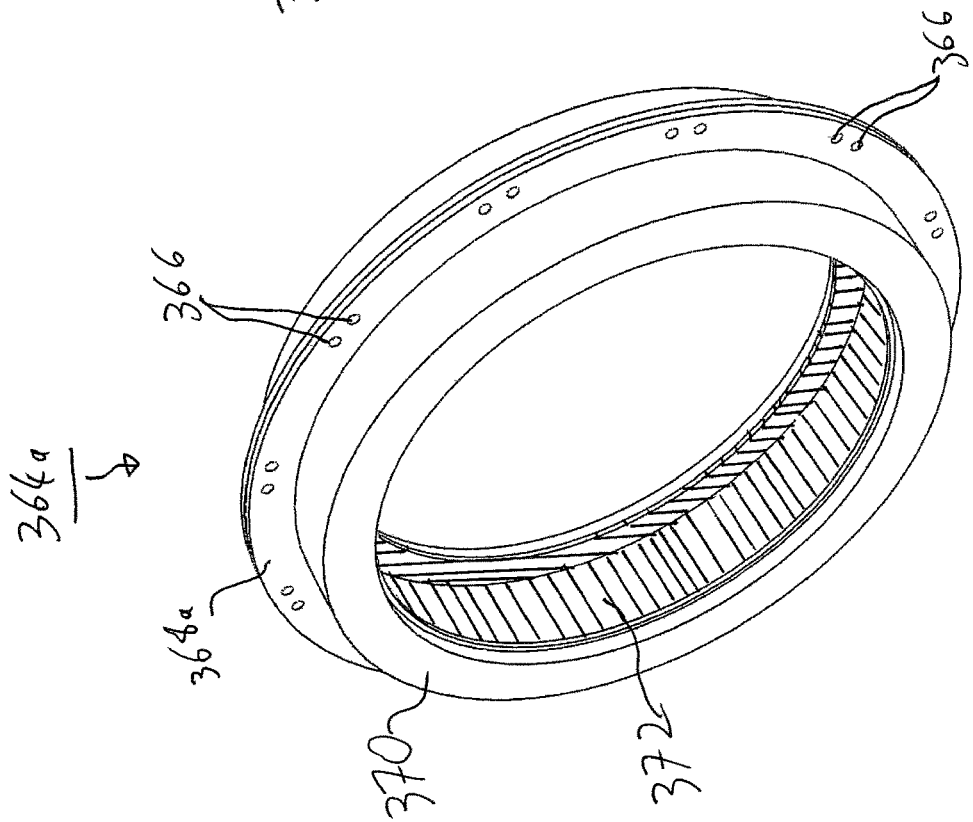
Figure 42:
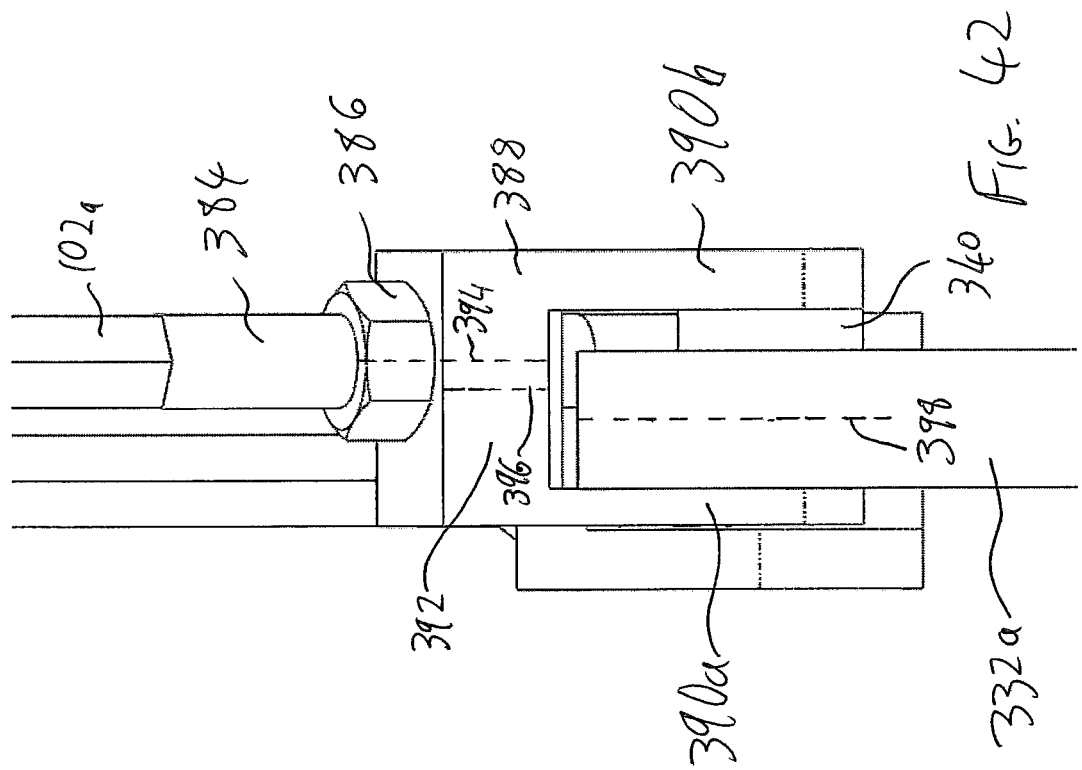
Figure 41:
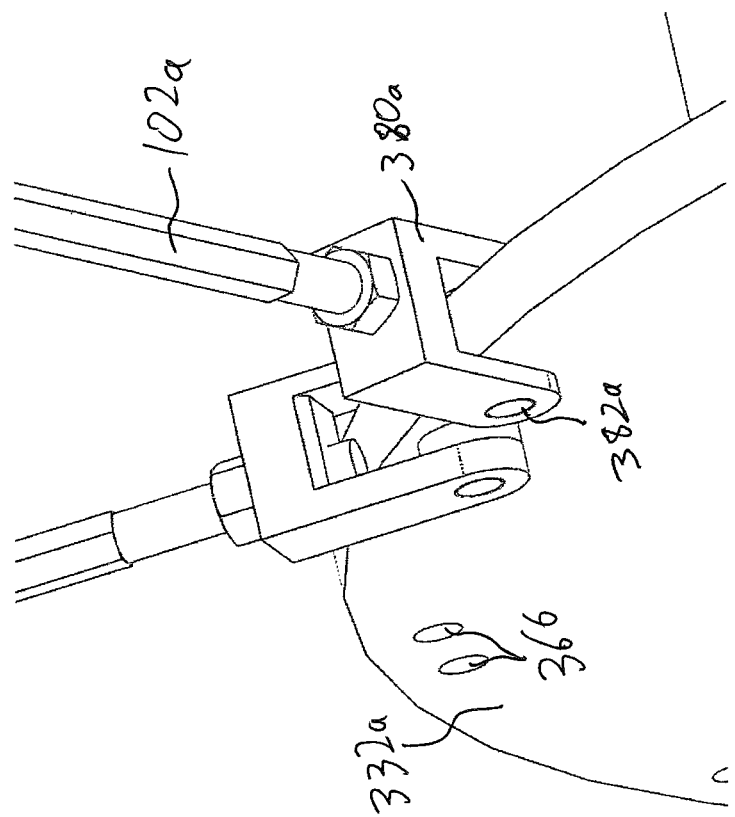
Figure 45:
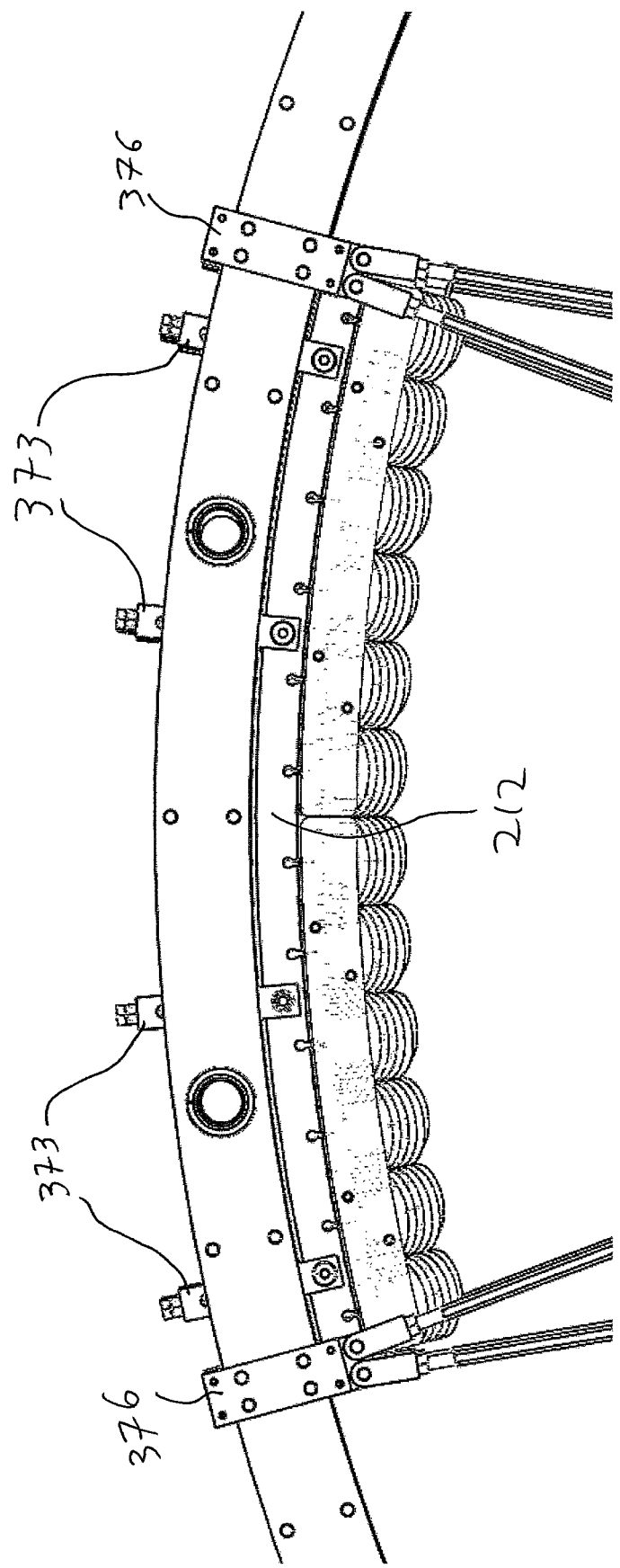

FIG. 6a schematically illustrates a rotor lamination and FIG. 6b schematically illustrates a magnified view of a portion of the rotor lamination illustrated in FIG. 6a;

FIG. 6c schematically illustrates a rotor lamination, and FIG. 6d schematically illustrates a portion 160 of the rotor lamination illustrated in FIG. 6c;

FIG. 7 schematically illustrates an arrangement of side plates with respect to the rotor laminations and rotor binding rods;

FIGS. 8a, 8b and 8c schematically illustrate a binding rod;

FIGS. 9a and 9b schematically illustrate a binding rod;

FIGS. 10a and 10b schematically illustrate a binding rod;

FIG. 11 schematically illustrates attachment of a magnet to the rotor laminations using magnet securing clips;

FIG. 12a schematically illustrates a side view of a magnet securing clip and FIG. 12b schematically illustrates a plan view of the magnet securing clip;

FIG. 13 schematically illustrates magnets mounted on the rotor laminations;

FIG. 14 schematically illustrates another arrangement for securing magnets to the rotor laminations;

FIG. 15 schematically illustrates the overall arrangement of the rotor;

FIG. 16 schematically illustrates a stator;

FIG. 17 schematically illustrates stator rings of the stator;

FIG. 18 schematically illustrates a magnified plan view of the stator;

FIG. 19 schematically illustrates a stator segment;

FIG. 20a schematically illustrates a stator lamination and FIG. 20b schematically illustrates a magnified view of a portion of the stator lamination illustrated in FIG. 20a;

FIG. 21a schematically illustrates a stator lamination, and FIG. 21b schematically illustrates a portion of the stator lamination illustrated in FIG. 21a;

FIG. 22 schematically illustrates stacking of stator laminations;

FIGS. 23a and 23b schematically illustrate a side view of the stator coils mounted over coil tooth portions of the stator laminations;

FIG. 24 schematically illustrates a stator coil;

FIG. 25 schematically illustrates a magnified view of one end of the stator coil;

FIG. 26 schematically illustrates a cross sectional view of the stator coil;

FIG. 27 schematically illustrates winding levels of a stator coil;

FIG. 28 schematically illustrates an arrangement of the stator coils with respect to a stator rim;

FIG. 29 schematically illustrates an arrangement for retaining the stator coils around the coil teeth;

FIG. 30 schematically illustrates an isolation connector;

FIG. 31 schematically illustrates an isolating connector;

FIG. 32a schematically illustrates a configuration of a manifold with respect to the stator coils;

FIG. 32b schematically illustrates a manifold;

FIG. 33 schematically illustrates a rotor axle;

FIG. 34 schematically illustrates an arrangement of the rotor axle and rotor bearings;

FIG. 35 schematically illustrates an arrangement of the rotor axle, rotor bearings and stator bearings;

FIG. 36 schematically illustrates a stator hub;

FIG. 37a schematically illustrates stator hub and FIG. 37b schematically illustrates an exploded view of the stator hub;

FIG. 38 schematically shows a section of the rotor;

FIG. 39 schematically shows a section of the stator;

FIG. 40 schematically illustrates attachment of spoke to a rotor ring using a spoke ring connector;

FIG. 41 schematically illustrates coupling of spokes to a spoke mounting flange;

FIG. 42 schematically illustrates a cross-sectional view of a spoke end attachment and a spoke mounted on a flange;

FIG. 43 schematically illustrates a cross sectional view of a rotor segment together with a plurality of segment mounting attachments;

FIGS. 44a and 44b schematically show a segment mounting attachment;

FIG. 45 schematically illustrates a stator segment mounted on stator rings;

FIG. 46a schematically shows an isometric view of a spoke structure and

Figure 48B:
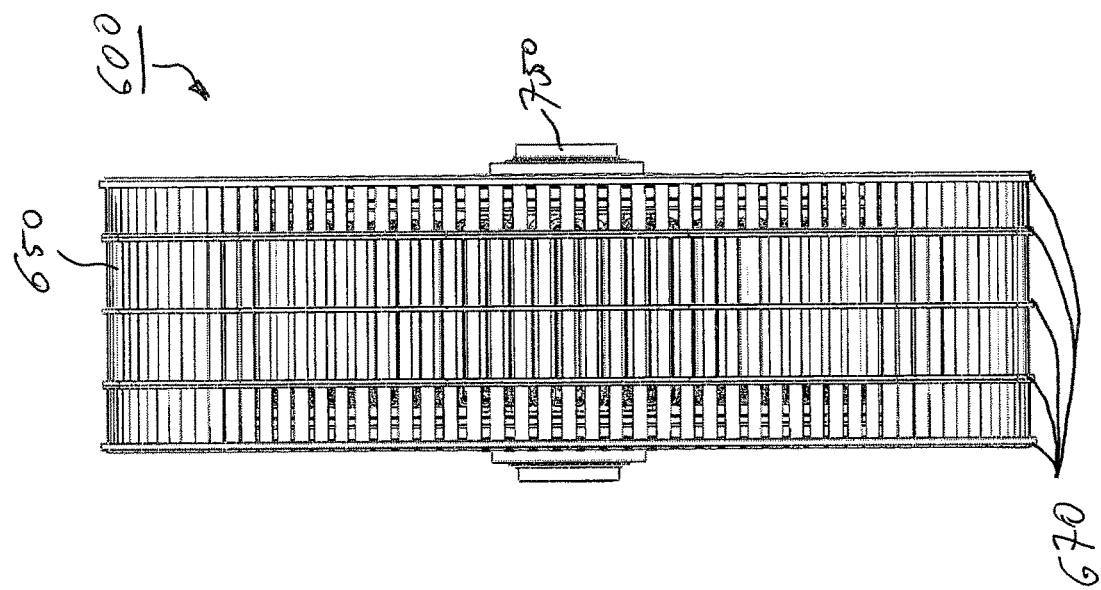
Figure 48A:
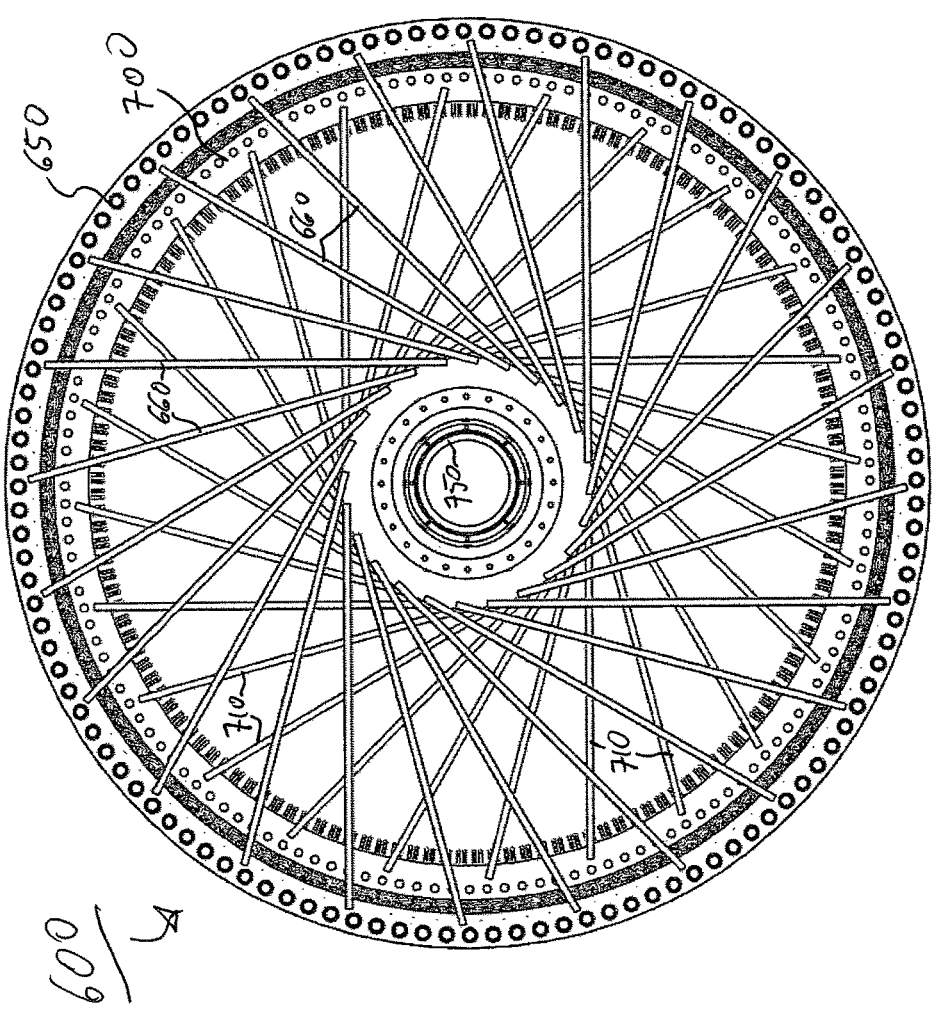

FIG. 46b schematically shows a side view of the spoke structure;

FIG. 47 is a schematic diagram of a direct drive permanent magnet synchronous generator;

FIG. 48a is a schematic elevation view of the generator of FIG. 47 and

Figure 56:
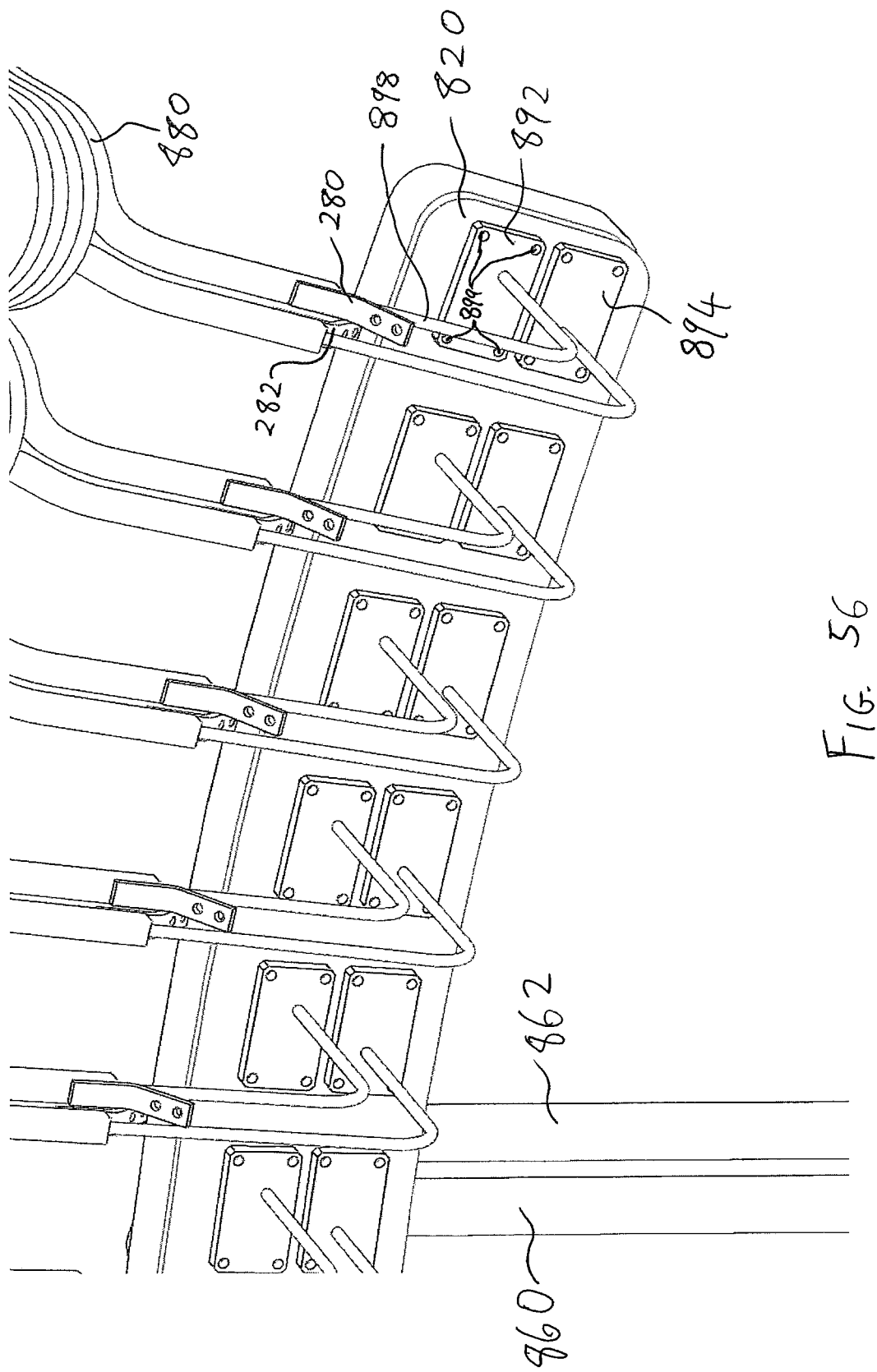
Figure 57:
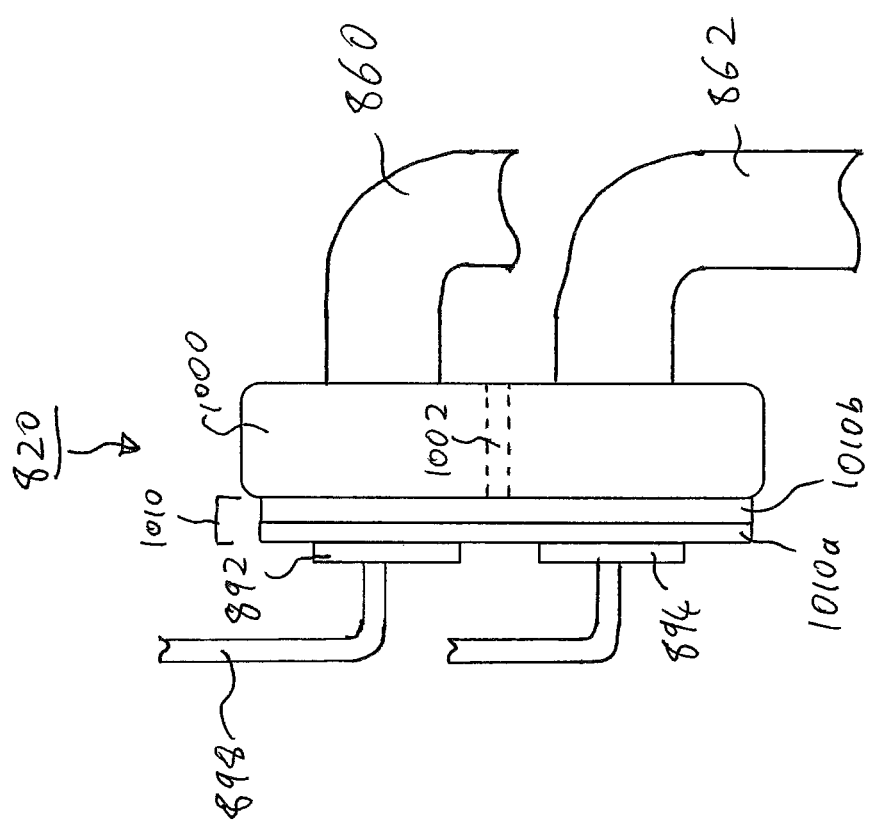
Figures 60, 61:
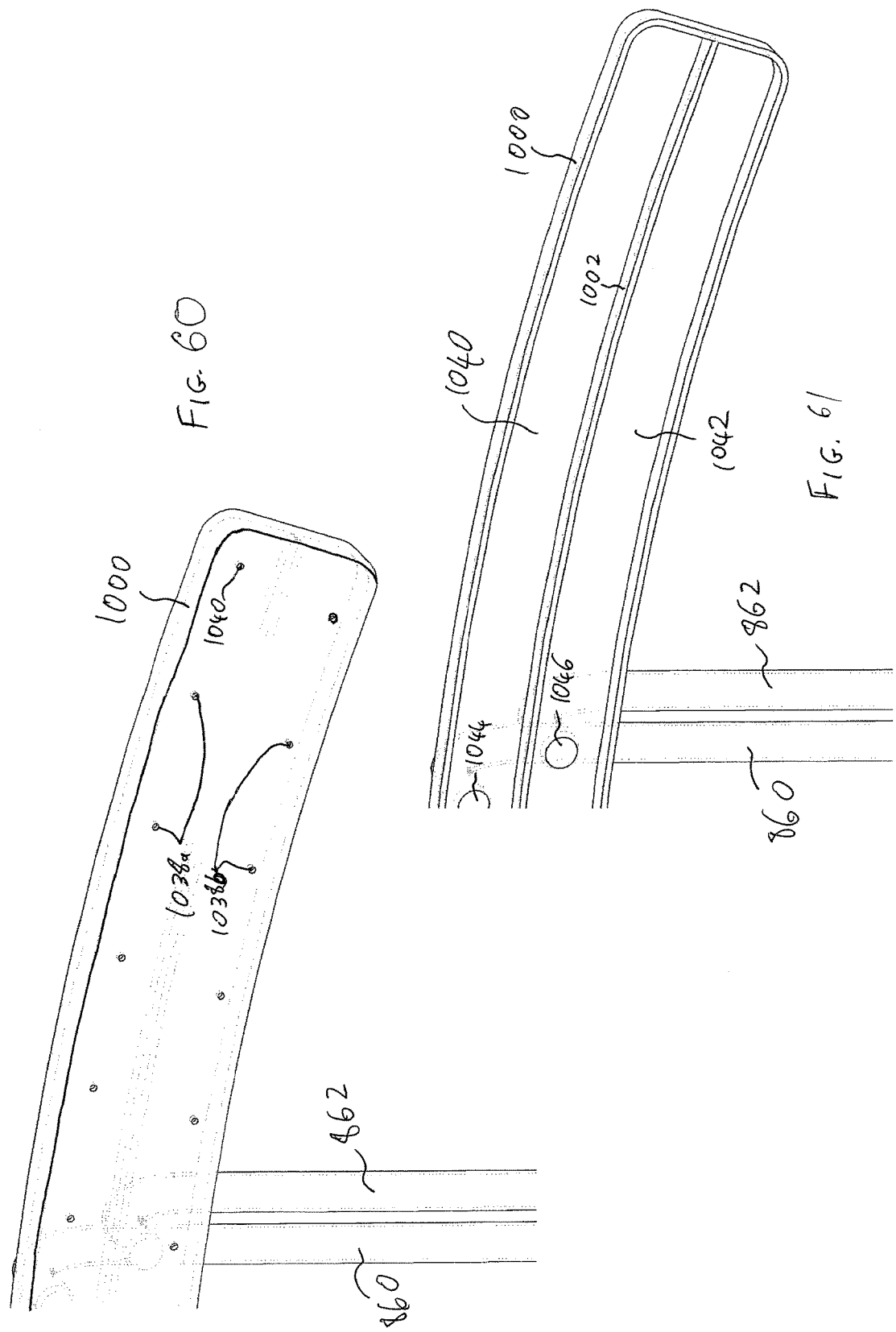
Figure 69:
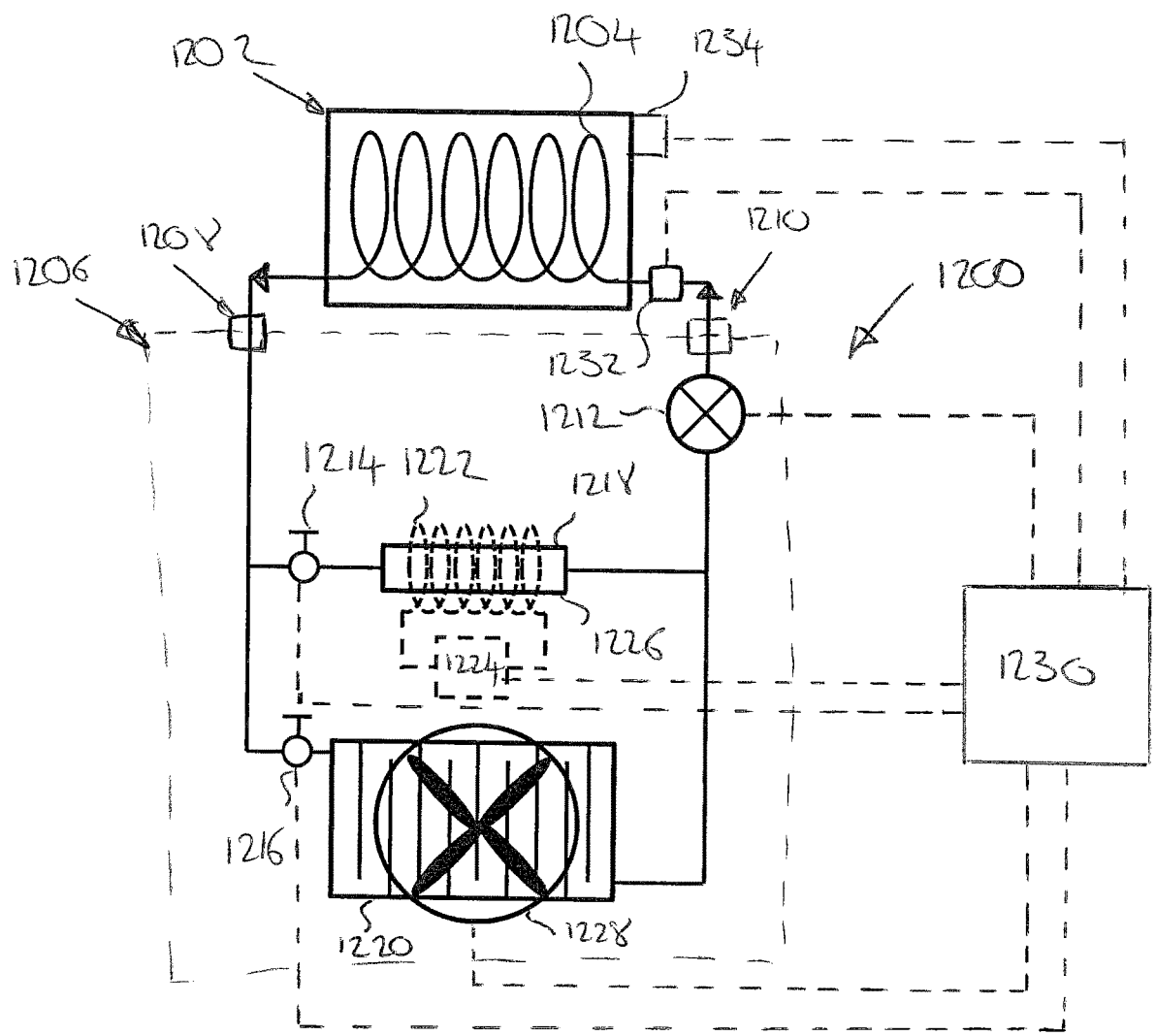

FIG. 48b is a schematic side view of the generator of FIG. 47;

FIG. 49 schematically illustrates a rotor of the generator of FIG. 47;

FIG. 50 schematically illustrates the spoke arrangement of the generator of FIG. 47;

FIG. 51 schematically illustrates a stator of the generator of FIG. 47;

FIG. 52 schematically illustrates a spoke arrangement of the stator of FIG. 51;

FIG. 53 schematically illustrates an arrangement of a stator segment of the stator and a manifold;

FIG. 54 schematically illustrates the stator segment;

FIG. 55 schematically shows a stator coil;

FIG. 56 schematically illustrates coupling of the stator coil to a manifold;

FIG. 57 schematically illustrates a side view of the manifold;

FIG. 58 schematically illustrates the manifold without inlet and outlet connectors;

FIG. 59 schematically illustrates a main body of the manifold together with an insulating plate;

FIG. 60 schematically shows the main body of the manifold;

FIG. 61 schematically shows a cross section through the main body;

FIG. 62 is a schematic diagram of a support tube assembly comprising clamping collars;

FIG. 63 is a schematic diagram of a support tube assembly comprising spacing tubes;

FIG. 64 schematically illustrates an enlarged view of part of the rotor laminations and side plate;

FIG. 65 schematically illustrates an enlarged view of part of the stator laminations and side plate;

FIG. 66 schematically illustrates positioning of a binding rod with respect to a recess formed in a stator side plate;

FIGS. 67a-67d schematically illustrate an example of magnet securing units from different views;

FIGS. 68a-68c schematically illustrate another example of magnet securing units from different views;

FIG. 69 schematically illustrates a fluid circulation system; and

Figure 70:
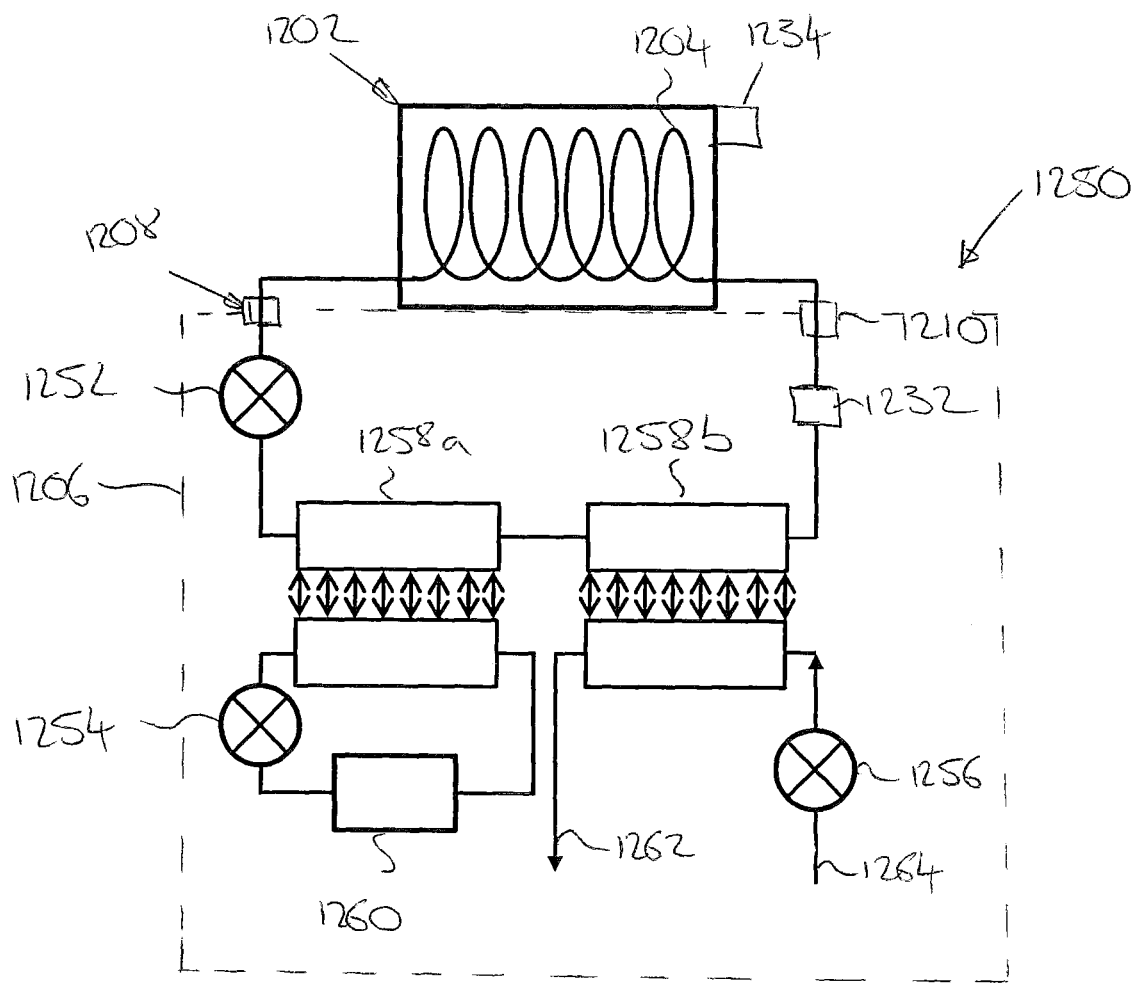

FIG. 70 schematically illustrates a fluid circulation system that includes a generator.

DETAILED DESCRIPTION

While the invention is susceptible to various modifications and alternative forms, specific embodiments are shown by way of example in the drawings and are herein described in detail. It should be understood however that the drawings and detailed description attached hereto are not intended to limit the invention to the particular form disclosed but rather the invention is to cover all modifications, equivalents and alternatives falling within the spirit and scope of the claimed invention Generator FIG. 1 is a schematic diagram of a direct drive permanent magnet synchronous generator 1 (DD-PMSG) according to examples of the disclosure. The generator 1 comprises a rotor 100, a stator 200, and an axle 300. The rotor 100 is arranged to rotate with respect to the stator 200. In the example described with respect to FIG. 1, the rotor 100 is arranged to rotate with respect to the stator 200 so that the axle 300 rotates with the rotor with respect to a housing of the generator. However, in other examples the rotor is located outside of the stator. In some examples, the axle 300 is fixed so as to restrict motion with respect to the housing, as will be described in more detail later below.

In examples, the rotor 100 comprises a plurality of permanent magnet poles and the stator 200 comprises a plurality of stator coils. Rotation of the rotor 100 with respect to the stator 200 causes a change in magnetic flux due to motion of the permanent magnets with respect to the stator 200 and so causes a voltage to be induced in the stator coils. In examples, the rotor is coupled to a plurality of wind turbine blades so as to cause rotation of the rotor 100 with respect to the stator 200. In other words, the wind turbine blades can be thought of as a driving element (prime mover) for driving the generator 1. However, it will be appreciated that other prime movers to generate rotational motion such as other types of turbine blades, an internal combustion engine, electric motor, hydropower turbine and the like could be used.

Figure 2B:
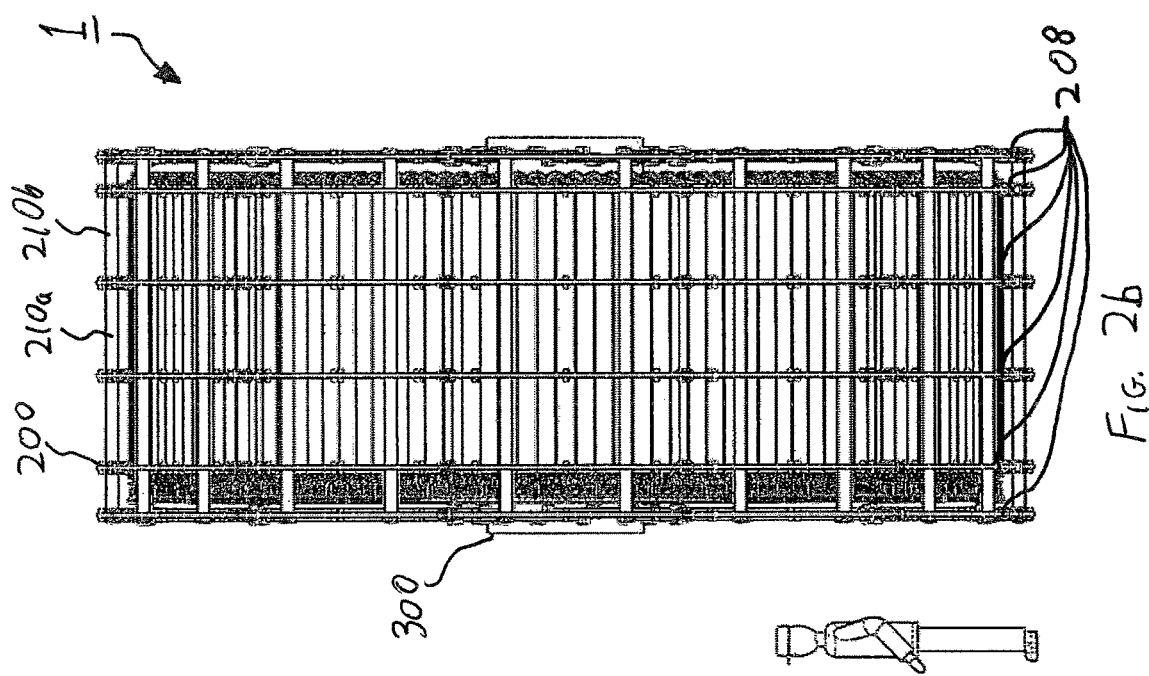
FIG. 2a is a schematic elevation view of the generator and FIG. 2b is a schematic side view of the generator.
Figure 2A:
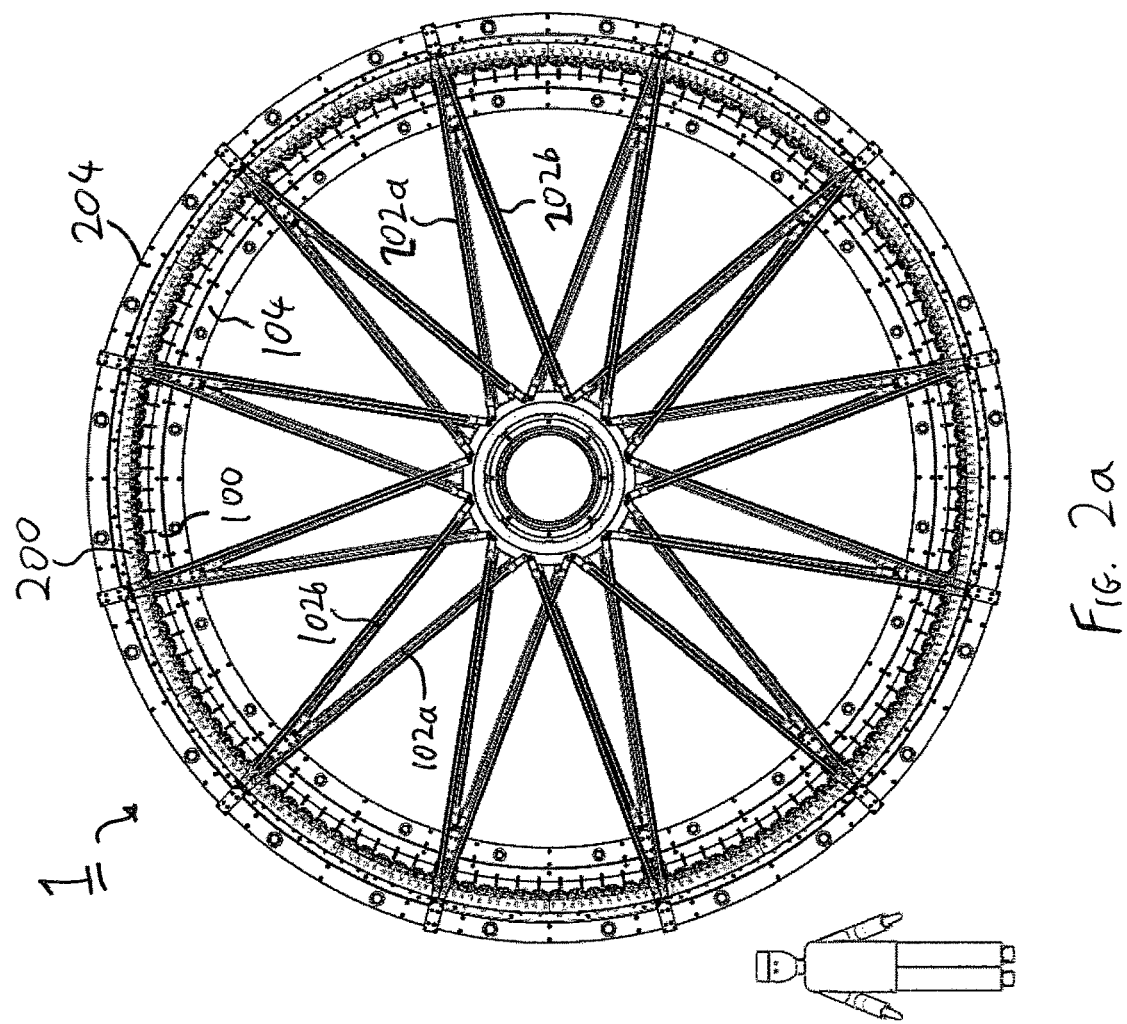

FIG. 2a is a schematic elevation view of the generator 1 and FIG. 2b is a schematic side view of the generator 1. As illustrated in FIG. 2a, the rotor 100 comprises a plurality of rotor spokes such as rotor spokes 102a, 102b, a rotor rim 104 and a rotor hub 106 (not shown in FIG. 2a). The rotor spokes couple the rotor hub 106 with the rotor rim. Similarly, the stator 200 comprises a plurality of stator spokes such as stator spokes 202a, 202b, a stator rim 204 and a stator hub 206 (not shown in FIG. 2a). The plurality of stator spokes couple the stator hub with the stator rim. The rotor rim 104 is concentric with the stator rim 204. Referring to FIG. 2b, the stator rim 204 comprises a plurality of stator rings 208 spaced apart from each other in the axial direction by stator spacing tubes such as stator spacing tubes 210a and 210b. In other words, for example, the stator rings can be thought of as stator supporting rings.

In the example illustrated in FIG. 2b, the stator rim comprises 6 stator rings, although it will be appreciated that any suitable number of stator rings could be used. The rotor rim 104 comprises a plurality of rotor rings arranged in a similar manner to the stator rings. The spoke arrangement of the rotor 100 and the stator 200 can help reduce the mass of the generator 1. The construction of the rotor 100 and the stator 200 will be described in more detail later below.

Rotor

The construction of the rotor 100 according to examples of the disclosure will now be described.

FIG. 3 is a schematic illustration of the rotor 100. The rotor 100 comprises a plurality of rotor segments (for example acting as rotor active segments), such as rotor segment 116, which provide the necessary magnetic paths and excitation for the generator. The rotor segments are arranged circumferentially around the rotor rim 104. In FIG. 3, one rotor segment (rotor segment 116) is illustrated for ease of understanding the Figure, although it will be appreciated that the rotor 100 typically comprises a plurality of rotor segments. In an example, the rotor 100 comprises 12 rotor segments, although it will be appreciated that any other number of rotor segments could be used such as 12, 18, 24. In an example, the number of rotor segments used is an integer divisor of 360, with each rotor segment having the same circumferential length, although it will be appreciated that the rotor segments could have different circumferential lengths from each other.

Rotor Rim

The rotor rim 104 is coupled to a rotor hub 105 by spokes (such as spokes 102a, 102b). In examples, the rotor has a similar spoked structure to the stator 200. The spoked structure of the rotor 100 and stator 200 will be described in more detail later below.

As mentioned above, the rotor rim 104 comprises a plurality of rotor rings axially spaced apart from each other. The rotor rings can, for example, be thought of as rotor supporting rings. In the example shown in FIG. 3, the rotor rim 104 (as illustrated in the example shown in FIG. 2) comprises a first rotor ring 120, a second rotor ring 122, a third rotor ring 124 and a fourth rotor ring 126. In other words, the rotor rim 104 of the example of FIG. 2 comprises four rotor rings (as illustrated in FIG. 3), although it will be appreciated that any appropriate number of rotor rings could be used.

The rotor rim 104 comprises a plurality of rotor ring support tube assemblies. In examples, each rotor ring support tube assembly comprises a support tube and one or more spacing elements. In some examples, the spacing elements are clamping collars which clamp around the tube. In other examples, the spacing elements are spacing tubes, which have a diameter larger than the diameter of the support tube, so that the support tube can be located within the spacing tubes. However, it will be appreciated that types of spacing element could be used. The spacing elements will be described in more detail later below.

In examples, a plurality of circumferentially arranged holes is formed in each rotor ring through which respective support tubes pass. The r spacing elements are arranged between the rotor rings so that the rotor rings are in a spaced relationship with each other.

Referring to FIG. 3 a first rotor ring support tube assembly (illustrated within dashed line 127a) and a second rotor ring support tube assembly (illustrated within a dashed line 127b) are shown as examples of sets of rotor ring support tube assembly.

As mentioned above, in examples, each rotor ring support tube assembly comprises one or more spacing elements. In the example illustrated in FIG. 3, the spacing elements are spacing tubes. For example, the second rotor ring support tube assembly (indicated by dashed line 127b) comprises three spacing tubes 128a, 128b and 128c. For example, the support rod of the second rotor ring support tube assembly passes through corresponding holes in the rotor rings, the spacing tube 128a is located between the first rotor ring 120 and the second rotor ring 122, the spacing tube 128b is located between the second rotor ring 122 and the third rotor ring 124, and the spacing tube 128c is located between the third rotor ring 124 and the fourth rotor ring 126 so that the rotor rings are held in spaced relationship with each other. In examples, the support tube is held within the holes of the rotor rings in the axial direction by retaining collars located at either end of the support tube next to the outer rotor rings (e.g. next to rotor rings 120 and 126). In other words, for example, the rotor ring support tube assemblies mechanically couple the rotor rings together in an axial direction so as to resist torsion and radial forces on the rotor rings.

In other examples (similar to the arrangement shown in FIG. 3), each rotor ring support tube assembly comprises four pairs of clamping collars, with the clamping collars of each pair being located each side of a respective rotor ring.

In an example, the rotor ring support tube assemblies are distributed around the rotor rings in a circumferential direction. In the example of FIG. 3, the rotor ring support tube assemblies are distributed evenly in the circumferential direction (i.e. the distance between each rod in the circumferential direction is the same), although it will be appreciated that they could be distributed unevenly (i.e. with different spacing between the rotor ring support tube assemblies in the circumferential direction). In the example shown in FIG. 3, the spacing tubes have the same length as each other so that the rotor rings have the same distance between them in the axial direction (in the case where there are three or more rotor rings), although it will be appreciated that the spacing tubes could have different lengths from each other. For example, the length of the spacing tube between the first rotor ring 120 and the second rotor ring 122 could be different from the length of the r spacing tube between the second rotor ring 122 and the third rotor ring 124.

In examples, the lengths of the spacing tubes between one rotor spacing ring and another rotor spacing ring are the same as each other. In other words, in examples, the rotor rings are arranged to be parallel to each other in a plane perpendicular to the axis of rotation of the rotor. This can help provide stiffness in the axial direction as well as simplifying construction. However, it will be appreciated that the rotor rings need not be parallel with each other.

In the example of FIG. 3, the support tubes of the rotor ring support tube assemblies are perpendicular to the planes of the rotor rings, that is the major length of the support tube is parallel to the axis of rotation, although it will be appreciated that other arrangements are possible. In the example of FIG. 3, support tubes and spacing tubes have a circular cross section, although it will be appreciated that other cross sections could be used such as square, oval, rectangular and the like. Additionally, it will be appreciated that the cross sections of the rotor ring support assemblies could be different from each other.

Rotor Segment

A rotor segment according to example of the disclosure will now be described with reference to FIGS. 4 to 15.

Figure 4:
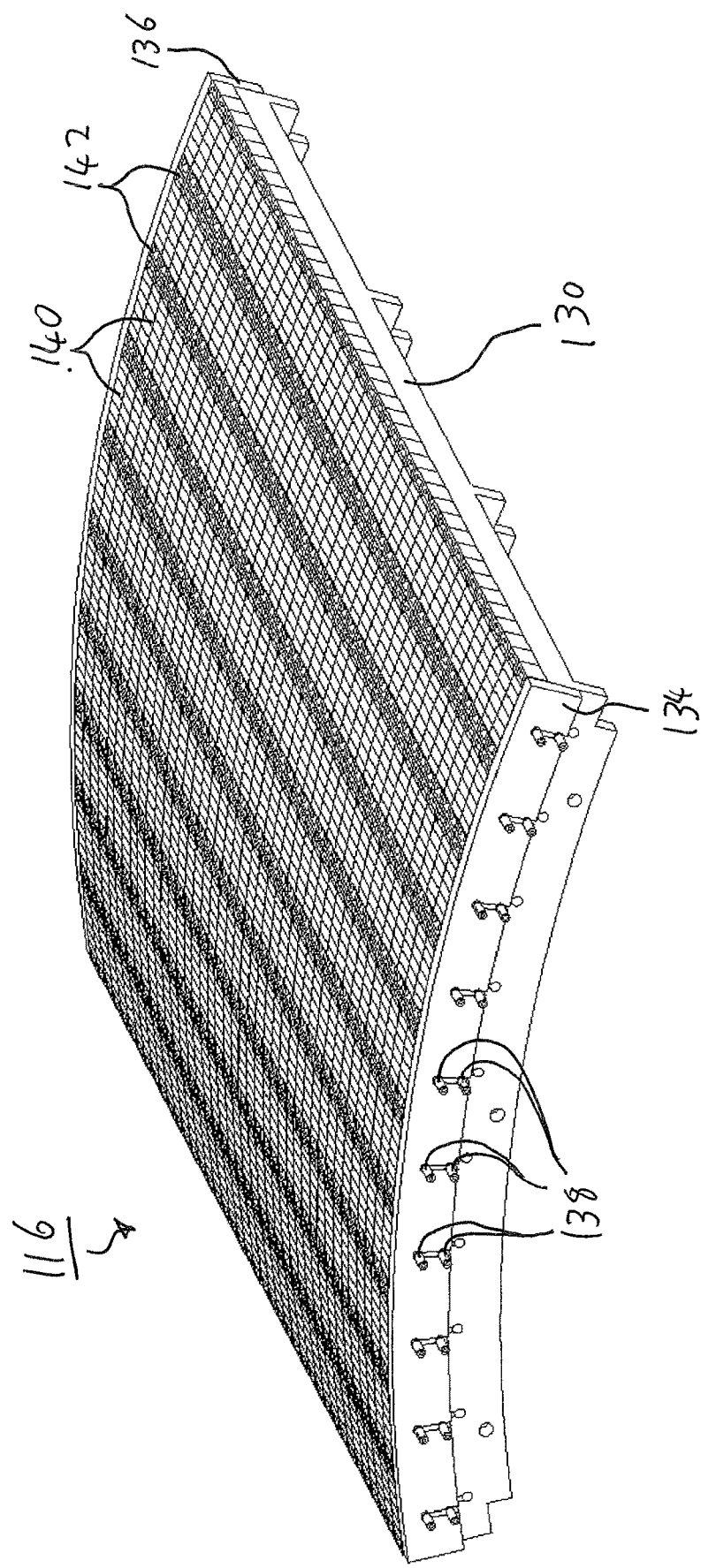
FIG. 4 is a schematic diagram of the rotor segment.

FIG. 4 is a schematic diagram of the rotor segment 116 in accordance with examples of the disclosure. The rotor segment 116 comprises a plurality of rotor laminations 130, a first rotor segment side plate 134, a second rotor segment side plate 136, a plurality of rotor binding rods (such as rotor binding rods 138), a plurality of permanent magnets (such as permanent magnets 140), and a plurality of magnet securing clips (such as magnet securing clips 142).

The binding rods pass through the rotor segment side plates in an axial direction and the rotor laminations (i.e. parallel to the axis of rotation of the rotor) so that the laminations are compressed together by the rotor side plates. In other words, for example, a binding rod can be thought of as an example of a compression device. In examples, the binding rods are positioned in the middle of a permanent magnet pole so as to reduce interaction between the binding rods and the magnetic paths of the rotor. The arrangement of rotor laminations, rotor side plates and rotor binding rods will be described in more detail later below.

In examples, the magnet securing clips mechanically couple the permanent magnets to the rotor laminations as will be described in more detail below. In other words, the magnet clips secure the permanent magnets onto the rotor laminations. In examples, the permanent magnets are NdFeB (Neodymium Iron Boron) magnets, typically referred to as neodymium magnets, although it will be appreciated that other suitable permanent magnets could be used, such as other rare earth magnets, or transition metal magnets.

Rotor Laminations

The rotor laminations 130 will now be described with reference to FIGS. 5a-5b, and 6a-6d.

Electrical machines such as electric motors and electric generators typically use laminated cores around which stator or rotor coils are respectively located, although solid cores may sometimes be used. It is desirable for the core (laminated or solid) to have a relatively high magnetic permeability so as to help reduce the current needed to produce a magnetic field. To help reduce eddy currents in the core, a solid core should be avoided and a laminated core used. A laminated core typically comprises a plurality of metallic laminations stacked together in a lamination stack but insulated from each other using a suitable insulating coating. The laminations are typically arranged so that the plane of the laminations is perpendicular to the axis of rotation. In other words, the laminations are typically arranged so that their major length (longest length) is arranged in the circumferential direction of the electric machine. Laminations are also often used to hold permanent magnets if permanent magnets are used in the particular design of electrical machine.

In operation, the laminations are subject to fluctuating fatigue stress caused by travelling magnetic fields. To help reduce fatigue stress, noise, vibration and wear of the laminations, the laminations are typically compressed together with a predetermined force. This can also help improve heat transfer between the laminations.

To compress the laminations, the laminations are typically compressed together during manufacture, for example using a mechanical or hydraulic press and then held in compression by an external rigid structure. However, during use, repeated changes of temperature of the electrical machine causes the laminations to expand and contract. Furthermore, although the design of most electrical machines seeks to reduce vibration during operation, it is difficult to eliminate vibration and so the laminations may move with respect to each other. This can cause the insulating coating between the laminations to wear and so the overall width of the lamination stack can reduce. Therefore, as the external structure compressing the laminations together is fixed, the compressive force on the laminations reduces, and so the laminations may be able to move more, causing more wear on the insulating coating.

To help address this problem, some manufacturers use external spring systems to help maintain the compressive force on the laminations during use. However, these systems are typically bulky and often use many metallic parts, which may be sensitive to undesirable losses. Therefore, eddy currents induced in the metallic parts when the electrical machine is in operation may become a problem, for example increasing heating and so reducing efficiency. The increased mass of such spring systems and the size of such spring systems can also increase manufacturing and installation costs especially if used in offshore wind turbine applications.

Examples of the disclosure seek to address the above problems.

FIGS. 5a and 5b are schematic diagrams of a plurality of rotor laminations according to examples of the disclosure.

FIG. 5a schematically illustrates a plurality of rotor laminations. The rotor laminations are stacked together in the axial direction. In the example of FIG. 5a, the rotor laminations comprise first rotor laminations 144 and second rotor laminations 146. The second rotor laminations 146 are located between the first rotor laminations 144 in the axial direction. A plurality of rotor binding rod slots (such as rotor binding rod slots 148) are formed in the first and second rotor laminations so that the rotor binding rods can pass through the rotor laminations. As mentioned above, in examples the binding rods are positioned in the middle (center) of respective magnetic poles (for example where the magnetic field is a minimum). In some examples, each binding rod is positioned within a threshold distance of center of the respective magnetic pole. In examples, the threshold distance is chosen so that distortion of the magnetic field due to the binding rod is less than a desired distortion threshold.

One or more rotor mounting holes, such as rotor mounting hole 150, are formed in the first laminations 144 for mounting the rotor laminations on the rotor 100. The rotor binding rod slots and rotor mounting hole are illustrated in more detail in FIG. 5*b* which schematically illustrates a plurality of the first rotor laminations according to examples of the disclosure.

FIG. 6*a* schematically illustrates one of the second rotor laminations according to examples of the disclosure. FIG. 6*b* schematically illustrates a magnified view of portion 152 of the second rotor lamination illustrated in FIG. 6*a*. The second rotor lamination comprises magnet mounting surfaces (magnet engaging surfaces) located between magnet securing regions in a circumferential direction. For example, referring to FIG. 6*b*, the portion 152 comprises magnet mounting surfaces 154*a*, 154*b* and magnet securing regions 156*a*, 156*b* and 156*c*. In the example shown in FIGS. 6*a* and 6*b* each magnet securing region comprises a pair of magnet clip securing lips. For example, the magnet securing region 156*a* comprises a magnet clip securing lip 158*a* and a magnet clip securing lip 158*b*. However, it will be appreciated that the magnet securing regions could comprise one or more magnet clip securing lips. For example, magnet securing regions at the edges of the rotor laminations in the circumferential direction would comprise one magnet clip securing lip.

In examples, the magnet clip securing lips engage with corresponding portions of the magnet securing clips to secure the magnets onto the magnet engaging surface. This will be described in more detail later below. The second rotor laminations have substantially the same profile as the second rotor lamination illustrated in FIG. 6*a*. In some examples, the magnets are glued onto the magnet engaging surface using a suitable glue, as well as being secured with the magnet securing clips, although it will be appreciated that in other examples, the glue may be omitted. A magnet mounting system can thus be formed with for example one or more magnet clips, one or more magnet mounts (wherein each magnet mount can comprise at least one lamination and/or any other suitable magnet mount) and one or more magnets mounted on the mounting surface of the magnet mount.

FIG. 6*c* schematically illustrates one of the first rotor laminations, and FIG. 6*d* schematically illustrates a portion 160 of the first rotor lamination illustrated in FIG. 6*c*. In the example shown in FIG. 6*c*, the first rotor lamination comprises three rotor mounting holes 150*a*, 150*b*, 150*c*, although it will be appreciated that the first rotor laminations could comprises any appropriate number of rotor mounting holes. In examples, the mounting holes are positioned in the center (middle) of the magnetic poles so as to reduce their influence on the magnetic flux. In some examples, the mounting holes are positioned within a mounting hole threshold distance from the center of the respective magnetic pole.

In a similar manner to the second rotor laminations, the first rotor laminations comprise a plurality of magnet engaging surfaces located between magnet securing regions in the circumferential direction. For example, referring to FIG. 6*d*, the second rotor lamination comprises magnet mounting surfaces 162*a*, 162*b* and magnet securing regions 164*a*, 164*b*, 164*c*. Each magnet securing region comprises a pair of magnet clip securing lips. For example, the magnet securing region 164*a* comprises a magnet clip securing lip 166*a* and a magnet clip securing lip 166*b*. The magnet clip securing lips engage with corresponding portions of the magnet securing clips to secure the magnets onto the magnet engaging surface. This will be described in more detail later below.

In examples the first rotor laminations each comprise a first portion and a second portion. In examples, the first portion corresponds to an outer portion of the first rotor lamination and the second portion corresponds to an inner portion of the first rotor lamination. In other words, the first portion is located further from the axis of rotation than the second portion. Referring to FIG. 6*d*, the first rotor lamination comprises a first (outer) portion 168*a*, and a second (inner) portion 168*b*. In examples, the profile of the first portion of the first rotor laminations corresponds with the profile of the second rotor laminations. When the first and second rotor laminations are stacked together, for example as illustrated in FIG. 5*a*, so that the second rotor laminations are located between the first rotor laminations in the axial direction, the outer surface of the rotor laminations has substantially the same profile (cross section) in the direction parallel to the axis of rotation. Here, "outer surface" is taken to mean the surface of the rotor laminations comprising the magnet mounting surfaces and located towards the outside of the rotor 100, that is away from the hub 300.

It will be appreciated that other configurations of the first and/or second laminations could be used. For example, three sets of first laminations could be used with two sets of second laminations respectively located between the first laminations, or four sets of first laminations could be used with three sets of second laminations respectively located between the first laminations, although any other suitable combination could be used. In some examples, the number of sets of second laminations is one less than the number of sets of first laminations. It will be appreciated that such different combinations of laminations could also be used for the stator.

FIG. 7 schematically illustrates how the side plates are arranged with respect to the rotor laminations and the rotor binding rods. For ease of understanding the drawing, FIG. 7 illustrates one side plate, rotor side plate 134, although it will be appreciated that the rotor side plate 136 would be configured in a similar manner to that illustrated in FIG. 7.

FIG. 7 schematically illustrates the binding rods (such as binding rods 138), the first rotor laminations 144 and the second rotor laminations 146. The rotor binding rods compress the rotor side plate against the rotor laminations so that the rotor laminations are compressed together. In examples, the length of the rotor laminations in the axial direction is greater than that of the length of the stator laminations in the axial direction so as to reduce losses in the side plates.

Rotor Binding Rods

Further details of the rotor binding rods will now be described with reference to FIGS. 8*a*-8*c*, 9*a*-9*b* and 10*a*-10*b*.

In examples, the binding rods are electrically non-conducting, non-magnetic rods with a substantially constant elastic spring constant (spring rate) over an elastic range. However, it will be appreciated that electrically conductive materials and/or magnetic materials could also be used to form the binding rods. In examples where electrically conductive materials are used, the binding rods may be galvanically insulated from the rotor or stator segment.

In examples, the binding rods have a constant elastic spring constant over a length change of predetermined length change with respect to the natural length of the binding rod, although it will be appreciated that the binding rods could have a constant spring rate (spring constant) over other appropriate strain ranges. In other words, the elastic behavior of the binding rods substantially conforms with Hooke's law within a predetermined strain range. In examples, the predetermined strain range over which the binding rods have a constant elastic spring constant depends on the material of the binding rod. In examples, the natural length (unextended length) of each binding rod is less than the combined length of the stacked rotor laminations and the side plates in the axial direction.

FIGS. 8a, 8b and 8c schematically illustrate an example of a binding rod according to the disclosure. FIG. 8a schematically illustrates a binding rod 138. In the example illustrated in FIGS. 8a-8c, the binding rod 138 is formed from a uniaxially oriented glass-fiber composite pultruded rod 169 comprising an anchor 170a, 170b at each end.

FIG. 8b schematically illustrates the anchor 170a. The anchor 170a comprises a first winding guide 172a and a second winding guide 172b and fiberglass roving 174, which is wound around the pultruded rod 169. To help adhere the roving 174, the pultruded rod 169 is abraded before the roving 174 is wound around the pultruded rod 169. The fiberglass roving 174 is saturated with polyester or epoxy resin while winding the roving 174 around the pultruded rod between the first winding guide 172a and the second winding guide 172b, although it will be appreciated that other suitable adhesives or resins could be used, such as epoxy adhesive. This process of winding the roving is carried out for both ends of the binding rod 138 and the rod is then cured using known techniques. The circular orientation of the fiberglass roving 174 can help resist radial forces when the rod is positioned to hold the rotor laminations and the uniaxial orientation of the fibers in the pultruded rod help resist tension forces in the axial direction. In the example of FIGS. 8a-8c, the anchors are cylindrical although it will be appreciated that other configurations could be used. Additionally, it will be appreciated that other materials could be used instead of the fiberglass roving such as fiberglass ribbon, carbon fiber roving, carbon fiber ribbon, and the like could be used.

In examples, to hold the binding rods so that they compress the rotor laminations, a spacing collar is positioned between the anchor and the side plate. In the example of FIG. 8b, the spacing collar comprises a first half 176a and a second half 176b which engage with the anchor to hold the anchor away from the side plate. The first half 176a and the second half 176b of the spacing collar each comprise a shoulder 178a and 178b respectively (shoulder 178b is not shown in FIG. 8b). To hold the binding rod in tension, when the rotor segment is in assembled form, the shoulder of each half of the spacing collar is positioned between the anchor and the side plate so that the length of the binding rod is greater than the natural (unextended) length of the binding rod. In examples, a depth d of the shoulder in the axial direction of the binding rod can be chosen so as to achieve the desired tension in the binding rod.

FIG. 8c schematically illustrates the spacing collar positioned around the anchor. In examples, the spacing collar has a circular cross-section, although it will be appreciated that other cross sections as appropriate for the anchor could be used.

FIGS. 9a and 9b schematically illustrate a binding rod according to another example of the disclosure.

FIG. 9a schematically illustrates a binding rod 180 formed from sheet molding compound (SMC) fiberglass. The binding rod 180 comprises an anchor portion at each end which is integrally molded with the binding rod. Referring to FIG. 9b, the binding rod 180 comprises an anchor portion 181. A spacing collar 182 comprising a first half 182a and a second half 182b. The anchor portion 181 comprises an anchor portion shoulder 183 and the spacing collar 182 comprises a spacing collar shoulder 184a and 184b (shoulder 184a is not shown in FIG. 9b). To hold the binding rod 180 in tension so as to compress the laminations in the axial direction, the spacing collar 182 is positioned around the anchor portion 181 so that the spacing collar shoulder 184 engages with the anchor portion shoulder 183 between the side plate and the anchor portion 181 so that the anchor portion is held away from the side plate. In other words, the anchor portion 181 can be thought of as an anchor in a similar manner to the anchors 170a and 170b of FIGS. 8a-8c.

In examples, the anchor portion 181 has a circular cross section and the spacing collar 182 has an internal profile, which corresponds with the external profile of the anchor portion 181. However, it will be appreciated that the anchor portion 181 could have other cross sections such as square, hexagonal, and the like as appropriate. In examples, a depth d of the shoulder 184 in the axial direction of the binding rod 180 can be chosen so as to achieve the desired tension in the binding rod 180.

Although the examples of FIGS. 8 and 9 illustrate spacing collars which comprise two halves, it will be appreciated that the spacing collars could be divided in other suitable manners such as into thirds, quarters, or any other number of pieces and/or sizes of pieces.

FIGS. 10a and 10b schematically illustrate a binding rod according to another example of the disclosure.

FIG. 10a schematically illustrates a binding rod 185 formed from sheet molding compound (SMC) fiberglass. The binding rod 185 comprises an anchor portion at each end which is integrally molded with the binding rod. A first spacing collar 186a and a second spacing collar 186b are located at each end of the binding rod 185.

Referring to FIG. 10b, the binding rod 185 comprises an anchor portion 187. The outside diameter of the anchor portion 187 is threaded. A threaded hole 189 is formed in the first spacing collar 186a and dimensioned so as to engage with the anchor portion in a threaded manner when the spacing collar is rotated with respect to the anchor portion 187 about the longitudinal axis of the binding rod 185. The spacing collar 186a comprises a hexagonal nut portion 188 for rotating the spacing collar with respect to the anchor portion 187 using a suitable tool such as a spanner hexagonal socket driver. However, it will be appreciated that the nut portion 188 could take other suitable configurations, such as a pair of machined parallel flats arranged in a plane parallel to the longitudinal axis of the binding rod 185. In examples, the threaded hole 189 is a blind hole and the nut portion 188 has a recess shaped to engage with a suitable tool such as an Allen key, slot head screw driver, posidrive screwdriver, and the like.

In examples, to hold the binding rod 180 in tension so as to compress the laminations in the axial direction, a face 190 of the spacing collar contacts with side plate of the rotor segment and the spacing collar 186a, 186b is rotated with respect to the anchor portion 187 so as to tighten the spacing collar against the side plate and apply tension to the binding rod 185. In these examples, the tension in the binding rod 185 can be adjusted to a desired tension by rotating the spacing collar 186a (186b) with respect to the anchor portion 187.

In the examples described with respect to FIGS. 8a-8c, the binding rod is formed from pultruded fiberglass and in the examples of FIGS. 9a, 9b, 10a, and 10b, the binding rod is formed from sheet molding compound (SMC) fiberglass. However, it will be appreciated that other suitable materials could be used, such as titanium grade 5, steel, or others.

Referring back to FIG. 7, assembly of the laminations for the rotor segment will now be described.

As mentioned above, the first rotor laminations 144 and second rotor laminations 146 are stacked together in the axial direction. The rotor segment side plate 134 comprises a plurality of slots (such as slots 135) which are positioned to correspond with the slots in the rotor laminations, such as slots 148. In examples, the slots in the first rotor laminations are keyhole shaped. In other words, referring to the example of FIG. 6d, the slots in the first rotor laminations comprise a linear portion 165a where the sides of the slot are parallel to each other and a circular portion 165b. In examples, the linear portion 165a is located to be further away from the hub 300 than circular portion 165b, although it will be appreciated that the opposite arrangement could be used, and that other slot configurations could be used.

The diameter of the circular portion 165b is dimensioned so as to allow passage of the anchor(s) of the binding rods through the circular portion 165b. The width of the linear portion in the circumferential direction is substantially the same as the diameter of the corresponding binding rod. In examples, the width of the linear portion 165a is a first predetermined clearance distance greater than the diameter of the corresponding binding rod, the diameter of the circular portion 165b is a second predetermined clearance distance greater than the diameter of the anchor of the binding rod.

In an example, to assemble the laminations with the rotor side plates, the rotor laminations are stacked together in the desired arrangement and the rotor side plates are positioned either side of the rotor laminations. The binding rod is passed through the circular portion 165b of the slot 148 and tension is applied to the binding rod in a suitable manner so that the anchors (anchor portions) of the binding rod are located either side of the rotor side plates. In other words, the anchors are positioned so that they are spaced away from the respective rotor side plates. The binding rod is moved from the circular portion 165b to the linear portion 165a so that the binding rod contacts an end of the slot in the linear portion 165a which is furthest from the circular portion 165b. The spacing collar is then applied to the anchor so that the anchor is held away from the respective side plate and the binding rod is held with the desired tension to compress the laminations. This process is repeated for each anchor and each binding rod as appropriate.

In other examples, to assemble the laminations with the rotor side plates, the rotor laminations are stacked together in the desired arrangement and the rotor side plates are positioned either side of the rotor laminations. The spacing collars are applied to each end of the binding rod and held onto the binding rod by a suitable binding rod mounting tool. In an example, the binding rod mounting tool engages with a flange on the collar, which is located at an end of the collar away from the binding rod (e.g. at the other end of the collar from the end corresponding to shoulder 178a, 178b of FIG. 8b, and shoulder 184a, 184b of FIG. 9b). Tension is applied to the binding rod by the binding rod mounting tool and the binding rod is moved into position. The tension on the binding rod applied by the binding rod mounting tool is then relieved so that the spacing collar contact the outer laminations and the binding rod is held with the desired tension to compress the laminations. This process is repeated for each anchor and each binding rod as appropriate.

In some examples described with respect to FIGS. 5 to 7, a first set of binding rods are arranged so that they are located at a first distance from the hub 300 when positioned so as to compress the rotor laminations and a second set of binding rods are located at a second distance from the hub 300 when positioned so as to compress the rotor laminations.

In examples, the first distance is greater than the second distance. In some examples, as shown in FIGS. 4 and 7 each slot comprises two binding rods. This helps distribute the compressive force provided by the binding rods evenly across the laminations in the radial direction. However, it will be appreciated that the slots could accommodate any appropriate number of binding rods. In some examples, each slot accommodates one binding rod and the binding rods of the first set of binding rods are arranged alternately with the binding rods of the second set in alternate slots in the circumferential direction, although it will be appreciated that other arrangements are possible.

Magnet Clips

In many electrical machines using permanent magnets, the magnets are typically secured to the rotor using a suitable adhesive. However, over time, the adhesive can break down and the magnets detach from the rotor. This can be difficult to repair and may cause damage to the electrical machine if one or more magnets come away from the rotor when the electrical machine is in operation. Examples of the disclosure seek to address this problem.

The arrangement of magnet securing units, e.g. magnet clips, with respect to the rotor laminations so as to hold the magnets onto the rotor segment according to examples of the disclosure will now be described with reference to FIGS. 11 to 14.

FIG. 11 schematically illustrates the attachment of a magnet 140a to the rotor laminations 130 (an example of a magnet mount), using magnet securing clips 142a, 142b, (examples of magnet securing units). As mentioned above, the rotor laminations comprise a plurality of magnet securing regions (also called unit engaging portions). Each magnet securing region comprises at least one mounting lip, or magnet clip securing lip. For example, referring to FIG. 11, the rotor laminations comprise a magnet clip securing lip 191a, and a magnet clip securing lip 191b. The magnet clip securing clips 142a, 142b engage with corresponding portions of the magnet securing clips to secure the magnets onto the magnet engaging surface. A magnet clip securing lip, or mounting lip, can for example comprise a protrusion in a direction and/or a portion having a neck shape so as to engage with corresponding portions of the magnet securing clips to restrict motion of the magnet clips away from the rotor segment.

A magnet securing unit, e.g. a magnet securing clip, according to examples of the disclosure will now be described with reference to FIGS. 12a and 12b.

FIG. 12a schematically illustrates a side view of a magnet securing clip 142 and FIG. 12b schematically illustrates a plan view of the magnet securing clip 142.

The magnet securing clip 142 is substantially c-shaped when viewed from the side (for example as in FIG. 12a) but in other examples it could also be L-shaped. The magnet securing clip 142 comprises a securing lip portion 192 and a magnet holding portion 193. The securing lip portion 192 is shaped to engage with the magnet clip securing lip of the rotor laminations so as to restrict motion of the securing clip in the circumferential direction and the radial direction. In some examples, the magnet clip securing lips of the rotor laminations and the securing lip portion of the securing clips are shaped so as to allow the clips to slide in an axial direction with respect to the rotor laminations. This can help assemble the securing clips onto the rotor laminations.

The magnet holding portion of the magnet securing clip comprises a magnet holding surface 194 for engaging with a surface of the magnet 140a so as to restrict motion of the magnet in the radial direction. In other words, the magnet holding surface is shaped so as to hold the magnet on the magnet engaging surface of the rotor laminations. In the example shown in FIG. 12a, the magnet holding surface 194 forms a plane angled at 45 degrees to a plane in the radial direction, although it will be appreciated that any other suitable angle could be used. The magnet 140a comprises corner portions 196a and 196b that form faces which lie parallel to the plane of the magnet holding surface. The corner portions of the magnet engage with the magnet holding surfaces of the securing clips. The magnet holding portion can for example be provided in a protrusion, such as an element protruding or extending in the circumferential direction and/or axial direction, and/or be connected to the securing lip portion of the magnet-securing unit using a connecting portion and may comprise at least one of an arm, a T-shaped element, a crescent-shaped element, a half cylinder element, a plate, and a perforated plate.

Referring to FIG. 12b, in examples, the magnet holding portion 193 comprises two arms 193a, 193b which are spaced apart from each other so that there is a gap between the two arms, where an arm may be an extension, for example an elongated element with a substantially rectangular (e.g. substantially square) cross section. This allows air to flow between the magnet securing clip 142 and the magnet 140a when the rotor 100 rotates. As the rotor 100 rotates, air can flow between the securing clips and the magnets causing turbulence around the rotor 100. This can help improve cooling of the rotor magnets and stator coils. The gap between the arms, or the spacing apart of the arms can thus form a turbulence causing element for facilitating the cooling of the magnets when in use. Other types of turbulence causing elements may be provided on the magnet securing clips, for example one or more recesses and/or one or more perforations. When an air flow flows relative to a turbulence causing element (for example the magnet securing clip is mounted on a rotor currently rotating and/or wind is currently blowing on the magnet securing clip), turbulences in the airflow are caused by the turbulence causing element. As the air flow and magnet securing unit move relative to one another, at least part of the turbulences are likely to arrive in an area with magnets and will thus increase the cooling of the magnets by increasing the amount of air that will approach or contact the magnets.

FIG. 13 schematically illustrates the magnets 140 mounted on the rotor laminations 130 and secured to the rotor laminations 130 using the securing clips 142. In some examples, the magnets are secured to the rotor laminations using a suitable adhesive such as an epoxy adhesive, and the securing clips positioned to restrict motion of the magnets as described above with reference to FIGS. 11 and 12. This can help decrease the likelihood that a magnet will become detached from the rotor 100 when the generator is in use. In other examples, the adhesive is omitted.

In examples, the securing clips are formed from extruded aluminum, although it will be appreciated that other suitable metallic materials (e.g. aluminum, steel, metallic alloys) or non-metallic materials and manufacturing methods could be used, such as SMC fiberglass, fiberglass, plastics material, polymer, nylon, glass filled nylon or other materials. In examples where the securing clips are formed from metallic materials or electrically conductive materials, some eddy currents will be present in the clips on operation of the generator. Therefore, in some examples, the securing clips are formed so as to minimize the cross section of the clips in a direction perpendicular to that of the direction of eddy current flow. In other words, in examples, the securing clips are formed so as to provide an electrical resistance which is greater than a desired threshold electrical resistance.

In the examples described above with reference to FIGS. 11 to 13, a plurality of securing clips is arranged in the axial direction to secure the magnets to the rotor laminations. In other words, in these examples, the length of a securing clip in the axial direction is less than the length of the rotor laminations in the axial direction.

However, in other examples, the length of the securing clip in the axial direction corresponds with the length of the rotor laminations in the axial direction. In other words, in these examples, the securing clip is continuous in the axial direction. In these examples, the securing clip comprises a plurality of arms which are arranged to form air gaps between the securing clip and the magnets. In some examples, the securing clip is formed from one piece to correspond to a plurality of securing clips (such as securing clip 142 described with respect to FIGS. 12a and 12b).

FIG. 14 schematically illustrates another example of an arrangement for securing the magnets to the rotor laminations according to examples of the disclosure.

In the example of FIG. 14, the rotor comprises a plurality of rotor laminations 195, a plurality of magnets 196 mounted on the rotor laminations 195, and a securing clip 197. The securing clip 197 comprises an elongate biasing element 198 (in this example an elastomer cord) which runs along the length of the securing clip. In the example of FIG. 14, the length of the securing clip 197 in the axial direction corresponds with the length of the stacked rotor laminations 195 in the axial direction. The rotor laminations 195 comprise a first securing lip 199a and a second securing lip 199b for engaging with the securing clip 197 so as to restrict motion of the securing clip 197 in the axial direction, for example to restrict motion away from the rotor laminations. In this example, the unit engaging portion of laminations 195 is substantially pommel-shaped for engaging with the corresponding portion of the magnet securing clip 197, the corresponding portion having a substantially rounded cross-section.

The securing clip 197 comprises a first magnet engaging portion 191a and a second magnet engaging portion 191b and comprises a flexible portion forming a hollow elongated portion for receiving an elongate biasing element. An elongate biasing element such as the elastomer cord 198 is located between the first magnet engaging portion 191a and the second magnet engaging portion 191b and causes the magnet engaging portions to be biased towards the magnets and away from the cord. The magnets 196 comprise securing clip engaging portions which mate with the magnet engaging portions 191a, 191b of the securing clip 197 to restrict motion of the magnets 196 away from the rotor laminations 195. In examples, the securing clip engaging portions are crescent shaped, and the magnet engaging portions 191a, 191b are shaped to correspond with the shape of the securing clip engaging portions, although it will be appreciated that other shapes could be used.

In examples, to assemble the magnets on the rotor, the magnets 196 are secured to the rotor laminations 195 using a suitable adhesive, and the securing clip 197 slid between the magnets in the axial direction so as to engage with the securing lips 199a, 199b and the securing clip engaging portions of the magnets. The elastomeric cord 198 is then inserted into the securing clip 197 to bias the magnet engaging portions 191a, 191b towards the magnets 196. The securing clip 197 can therefore restrict the motion of the magnets away from the rotor laminations 195 even if the adhesive fails. In some examples, the adhesive may be omitted.

In examples, the securing clip 197 is formed from extruded nylon although it will be appreciated that other plastics materials, plastic composites, or other materials could be used. Additionally, although the example of FIG. 14 uses an elastomeric cord 198, it will be appreciated that other elements for biasing magnet engaging portions towards the magnets could be used such as one or more springs. Additionally, it will be appreciated that the cord need not be continuous along the length of the securing clip 197 and that a plurality of biasing elements, such as a plurality of elastomeric cords could be used. It will also be appreciated that the securing clip 197 need not be continuous along the length of the rotor laminations in the axial direction and that one or more securing clips whose respective lengths are shorter than the length of the stacked laminations in the axial direction could be used.

In the examples of FIGS. 13 and 14, the mounting surface comprise mount restricting means for restricting movement of magnets on the mounting surface. For example, in FIG. 13 illustrates an example where the mounting surface is provided with side projections acting as walls which can be for example helpful for restricting circumferential movement of the magnets by co-operating with the sides of the magnets. In the example illustrated in FIG. 14, the mounting surface comprises a projection on the shape of a boss which can co-operated with a corresponding recess of magnets thereby restricting circumferential movement of magnets on the mounting surface.

FIG. 15 schematically illustrates the overall arrangement of the rotor 100. As mentioned above, the rotor comprises a plurality of rotor segments, such as rotor segment 116. The rotor segments are arranged around the circumference of the rotor rim so that the rotor segments are continuous with each other. In examples, the rotor comprises 12 rotor segments and the magnets are arranged to form 120 rotor magnet poles. However, it will be appreciated that any other number of rotor segments and rotor magnet poles could be used.

It will be appreciated that the teachings of the present disclosure for mounting the magnets may also be used for magnet mounts not comprising laminations, for example, an integrally formed magnet mount having substantially the same external configuration as a plurality of laminations.

The attachment of the rotor segments to the rotor rings will be described in more detail later below.

Stator

The stator 200 according to examples of the disclosure will now be described in more detail with reference to FIGS. 16 to 32b.

FIG. 16 schematically illustrates the stator 200 according to examples of the disclosure.

The stator 200 comprises a plurality of stator segments such as stator segment 212. The stator segments are arranged circumferentially around the stator rim 204. The stator 200 typically comprises a plurality of stator segments. In an example, the stator 200 comprises 12 stator segments, although it will be appreciated that any other number of stator segments could be used such as 12, 18, 24. In an example, the number of stator segments used is an integer divisor of 360, with each stator segment having the same circumferential length, although it will be appreciated that the stator segments could have different circumferential lengths from each other.

The stator 200 comprises a stator hub 214 which is coupled to the stator rim 204 via a plurality of spokes such as spokes 202a and 202b. In examples, the stator 200 has a similar spoked structure to that of the rotor 100. The spoked structure will be described in more detail later below.

Stator Rim

The stator rim 204 comprises a plurality of stator rings axially spaced apart from each other. This will now be described in more detail with reference to FIG. 17.

FIG. 17 schematically illustrates the stator rings of the stator 200 according to examples of the disclosure. In examples, the stator rings can be thought of as stator supporting rings. In the example shown in FIG. 17, the stator rim 204 comprises a first stator ring 220, a second stator ring 222, a third stator ring 224, a fourth stator ring 226, a fifth stator ring 229 and a sixth stator ring 230. In other words, the stator rim 204 of the example of FIG. 17 comprises six stator rings, although it will be appreciated that any appropriate number of stator rings could be used. In examples, the spacing in the axial direction between the second stator ring 222, the third stator ring 224, the fourth stator ring 226, and the fifth stator ring 229 corresponds to the axial spacing between the first rotor ring 120, the second rotor ring 122, the third rotor ring 124 and the fourth rotor ring 126, although it will be appreciated that the spacing between the stator rings could be different from that of the rotor rings.

In examples, the axial spacing between the first stator ring 220 and the second stator ring 222, is the same as the spacing between the fifth stator ring 229 and the sixth stator ring 230. In some examples, the axial spacing between the first stator ring 220 and the second stator ring 222 and the axial spacing between the fifth stator ring 229 and the sixth stator ring 230 is smaller than the axial spacing between each of the second stator ring 222, the third stator ring 224, the fourth stator ring 226, and the fifth stator ring 229. However, it will be appreciated that any appropriate spacing between the stator rings could be used.

The stator rim 204 comprises a plurality of stator ring support tube assemblies. In examples, each stator ring support tube assembly comprises a support tube and one or more spacing elements. In some examples, the spacing elements are clamping collars which clamp around the tube. In other examples, the spacing elements are spacing tubes, which have a diameter larger than the diameter of the support tube, so that the support tube can be located within the spacing tubes. However, it will be appreciated that types of spacing element could be used. The spacing elements will be described in more detail later below. In some examples, the stator ring support tube assemblies are the same as the rotor ring support tube assemblies, although it will be appreciated that they could be different.

In examples, a plurality of circumferentially arranged holes is formed in each stator ring through which respective support tubes pass. The spacing elements are arranged between the stator rings (e.g. stator rings 220, 222, 224, 226, 229, 230) so that the stator rings are in a spaced relationship with each other.

Referring to FIG. 17 a first stator ring support tube assembly (illustrated within dashed line 227a) and a second stator ring support tube assembly (illustrated within a dashed line 227b) are shown as examples of stator ring support tube assemblies.

As mentioned above, in examples, each stator ring support tube assembly comprises one or more spacing elements. In the example illustrated in FIG. 17, the spacing elements are spacing tubes. For example, the second stator ring support tube assembly (indicated by dashed line 227b) comprises five spacing tubes 228a, 228b, 228c, 228d and 228e.

For example, the support rod of the second stator ring support tube assembly passes through corresponding holes in the stator rings (that is stator rings 220, 222, 224, 226, 229, and 230), the spacing tube 228a is located between the first stator ring 220 and the second stator ring 222, the spacing tube 228b is located between the second stator ring 222 and the third stator ring 224, the spacing tube 228c is located between the third stator ring 224 and the fourth stator ring 226, the spacing tube 228d is located between the fourth stator ring 226 and the fifth stator ring 228, and the spacing tube 228e is located between the fifth stator ring 228 and the sixth stator ring 230. In other words, for example, the stator ring support tube assemblies mechanically couple the stator rings together in an axial direction so as to resist torsion and radial forces on the stator rings.

In other examples (similar to the arrangement shown in FIG. 17), each stator ring support tube assembly comprises six pairs of clamping collars, with the clamping collars of each pair being located each side of a respective stator ring.

In an example, the stator ting support tube assemblies are distributed around the stator rings in a circumferential direction. In the example of FIG. 17, the sets of stator spacing rods are distributed evenly in the circumferential direction (i.e. the distance between each stator rod in the circumferential direction is the same), although it will be appreciated that they could be distributed unevenly (i.e. with different spacing between the stator ring support tube assemblies in the circumferential direction). In examples, the stator rings are arranged to be parallel to each other in a plane perpendicular to the axis of rotation of the stator. This can help provide stiffness in the axial direction as well as simplifying construction. However, it will be appreciated that the stator rings need not be parallel with each other. In the example of FIG. 17, the support tubes of the stator ring support tube assemblies are perpendicular to the planes of the stator spacing rings, that is the major length of the stator of each support tube is parallel to the axis of rotation, although it will be appreciated that other arrangements are possible. In the example of FIG. 17, the support tubes and spacing tubes have a circular cross section, although it will be appreciated that other cross sections could be used such as square, oval, rectangular and the like. Additionally, it will be appreciated that the cross sections of stator ring support tube assemblies could be different from each other and the that cross sections of the support tubes and spacing tubes could be different from each other. In some examples, the support tubes of the rotor ring support tube assemblies and/or the stator ring support tubes assemblies are hollow, although it will be appreciated that they could be solid or be filled with a material other than the material of the support tube.

In examples, the spacing tubes of the stator ring support tube assemblies comprise a first subset and a second subset of spacing tubes. In examples, the spacing tubes of the second subset are located between the spacing tubes of the first subset in the axial direction. In other words, the spacing tubes of the first subset can be thought of as outer spacing tubes and the spacing tubes of the second subset can be thought of as inner spacing tubes. Referring to FIG. 17 for example, the stator ring support tube assembly 227b comprises a first subset which comprises the spacing tubes 228a and 228e, and a second subset which comprises the spacing tubes 228b, 228c, and 228d.

In examples, spacing tubes in the first subset have a first length and the spacing tubes in the second subset have a second length. In examples, the first length is less than the second length. For example, as mentioned above, the axial spacing between the first stator ring 220 and the second stator ring 222, is the same as the spacing between the fifth stator ring 229 and the sixth stator ring 230 and the axial spacing between the first stator ring 220 and the second stator ring 222 and the axial spacing between the fifth stator ring 229 and the sixth stator ring 230 is smaller than the axial spacing between each of the second stator ring 222, the third stator ring 224, the fourth stator ring 226, and the fifth stator ring 229. The lengths of the spacing tubes in the first and second subsets can be chosen so as to achieve the desired spacing between the stator rings. In other examples where clamping collars are used, the clamping collars are positioned so as to achieve the desired spacing between the stator rings.

However, it will be appreciated that the spacing tubes could have the same length as each other or the clamping collars can be arranged so that the stator rings have the same distance between them in the axial direction (in the case where there are three or more stator rings), although it will be appreciated that the spacing tubes could have different lengths from each other.

FIG. 18 schematically illustrates a magnified plan view of the stator 200. FIG. 18 schematically illustrates an example of a stator segment 212 together with the stator rings and stator spacing rods, for example as described above with reference to FIG. 17. The stator segment will now be described in more detail with reference to FIGS. 19 to 32b.

Stator Segment

FIG. 19 schematically illustrates the stator segment 212. The stator segment 212 comprises a plurality of stator laminations 235, a plurality of stator binding rods (such as binding rods 236), a plurality of stator coils (such as stator coils 238), a pair of stator laminations side plates 240a, 240b located on either side of the stator laminations 235 in the axial direction, and heat transfer manifolds (not shown). The heat transfer manifolds will be described in more detail later below. In examples, the stator segment 212 comprises 12 stator coils, although it will be appreciated that the stator segment could comprise any suitable number of stator coils.

Referring to FIG. 19, the stator laminations 235 comprise first stator laminations 242 and second stator laminations 244. The one or more mounting holes (such as mounting holes 246) are formed in the first stator laminations for mounting the stator laminations 135 on the stator rings. The stator laminations 235 will now be described in more detail with reference to FIGS. 20a, 20b, 21a, 21b, and 22.

Stator Laminations

FIG. 20a schematically illustrates one of the second stator laminations according to examples of the disclosure. FIG. 20b schematically illustrates a magnified view of portion 248 of the second stator lamination illustrated in FIG. 20a. The second stator lamination comprises a plurality of coil tooth portions arranged in a circumferential direction. For example, referring to FIG. 20b, the portion 248 comprises tooth portions 250a, 250b, 250c, 250d. For example a tooth can be thought as a coil tooth or magnetic circuit tooth around which a coil can be placed.

Each tooth portion comprises one or more coil retaining slots for holding the stator coils onto the second stator laminations. For example, tooth portion 250b comprises a first coil retaining slot 252a and a second coil retaining slot 252b and tooth portion 250c comprises a first coil retaining slot 254a and a second coil retaining slot 254b. In examples, a coil retaining plate engages with a coil retaining slot (e.g. coil retaining slot 252b) of a first coil tooth portion (e.g. coil tooth portion 250b) and a coil retaining slot (e.g. coil mounting slot 254a) of an adjacent coil tooth portion (e.g.

coil tooth portion 250c) so as to retain the coil with respect to the stator laminations. This will be described in more detail later below.

In examples, all the second stator laminations have substantially the same profile as the second stator lamination illustrated in FIG. 20a although it will be appreciated that the profiles of the second stator laminations could differ from each other.

Referring to FIG. 20b, the second stator laminations comprise a plurality of stator binding rod engaging slots, such as binding rod engaging slots 256a, 256b, 256c, and 256d. In examples, each tooth portion comprises a binding rod engaging slot. For example tooth portion 250c comprises binding rod engaging slot 256c and tooth portion 250d comprises binding rod engaging slot 256d. In examples, the outer edge of the second stator laminations comprises binding rod engaging slots respectively located opposite the binding rod engaging slots of the coil tooth portions, for example binding rod engaging slot 256a and binding rod engaging slot 256c.

In other words, the edge of the second stator laminations further from the axis of rotation than the coil tooth portions when the stator segment is mounted on the stator comprises binding rod engaging slots which lie on a radial line passing through the respective binding rod engaging slots of the coil tooth portions and the axis of rotation. However, it will be appreciated that the binding rod engaging slots of the outer edge could be offset set in the circumferential direction from the binding rod engaging slots of the coil tooth portions.

FIG. 21a schematically illustrates one of the first stator laminations, and FIG. 21b schematically illustrates a portion 260 of the first stator lamination illustrated in FIG. 21a. In the example shown in FIG. 21a, the first stator lamination comprises four stator mounting holes 262a, 262b, 262c, and 262d, although it will be appreciated that the first stator laminations could comprises any appropriate number of stator mounting holes. In other words, the stator mounting holes are formed in the first stator laminations.

In a similar manner to the second stator laminations, the first stator laminations comprise a plurality of coil tooth portions arranged in a circumferential direction. For example, referring to FIG. 21b, the portion 260 comprises coil tooth portions 264a, 264b, 264c, 264d. Each coil tooth portion comprises one or more coil mounting slots for holding the stator coils onto the first stator laminations. For example, coil tooth portion 264b comprises a first coil mounting slot 252a and a second coil mounting slot 252b and coil tooth portion 264c comprises a first coil mounting slot 254a and a second coil mounting slot 254b. As mentioned above, in examples, a coil retaining plate engages with a coil mounting slot (e.g. coil mounting slot 252b) of a first coil tooth portion (e.g. coil tooth portion 250b) and a coil mounting slot (e.g. coil mounting slot 254a) of an adjacent coil tooth portion (e.g. coil tooth portion 250c) so as to retain the coil with respect to the stator laminations. This will be described in more detail later below.

In examples, a portion of the first stator laminations has a profile which corresponds with the profile of the second stator laminations. In examples, the first stator laminations each comprise a first portion and a second portion. In examples, the first portion corresponds to an inner portion of the first stator lamination and the second portion corresponds to an outer portion of the first stator lamination when the stator segment is mounted on the stator. In other words, the first portion is located closer to the axis of rotation than the second portion.

Referring to FIG. 21b, the first stator lamination comprises a first (inner) portion 266a, and a second (outer) portion 266b. In examples, the profile of the first portion of the first stator laminations corresponds with the profile of the second stator laminations. When the first and second stator laminations are stacked together, for example as illustrated in FIG. 19, so that the second stator laminations are located between the first stator laminations in the axial direction, the inner surface of the stator laminations has substantially the same profile (cross section) across all the stator laminations in the direction parallel to the axis of rotation. Here, "inner surface" is taken to mean the surface of the stator laminations located towards the inside of the stator 200, that is towards the axis of rotation.

In examples, the rotor laminations and/or the stator laminations are formed by stamping the appropriate profile from metallic sheet material such as steel sheet, although it will be appreciated that the rotor laminations and/or the stator laminations could be laser cut or die cut from metallic sheet material. However, it will be appreciated that other methods for fabricating the laminations could be used.

In examples, the first stator laminations 242 and the second stator laminations 244 are stacked together in the axial direction to form the stator laminations on which the tooth coils are mounted. In examples, the first stator laminations comprise an inner (first) set of binding rod slots and an outer (second) set of binding rod slots. For example, referring to FIG. 21b, the coil tooth portions of the first stator lamination each comprise a stator binding rod slot of the inner set. For example the inner set of stator binding rod slots comprises binding rod slots 268a, 268b, 268c.

In some examples, a non-segmented stator can be used, with for example, the stator laminations forming a continuous circle. In these examples, only the outer binding rods may be used, although it will be appreciated that both inner and outer binding rods could be used.

In examples where the laminations are segmented (that is not forming a continuous circle), both inner and outer binding rods can be used, without the inner binding rods unduly influencing the magnetic properties. However, in these examples, it is preferable that the binding rods are formed from a non-conducting material so as to reduce any influence of the binding rods on the magnetic properties.

Referring to the example of FIG. 21b, the outer (second) set of binding rod slots in the first stator laminations are keyhole shaped. For example, the outer set of stator binding rod slots comprises binding rod slots 267a, 267b, 267c. In other words, referring to the example of FIG. 21b, the slots in the second set of binding rod slots comprise a linear portion 270a where the sides of the slot are parallel to each other and a circular portion 270b. In examples, the linear portion 270a is located to be closer to the hub 214 than the circular portion 270b, although it will be appreciated that the opposite arrangement could be used, and that other slot configurations could be used. In examples, when the first stator laminations are stacked with the second stator laminations, at least a part of the linear portion of the second set of stator binding rod slots corresponds with a position of the outer binding rod slots of the second stator laminations.

FIG. 22 schematically illustrates stacking of some of the first stator laminations with the second stator laminations. For example, as illustrated in FIG. 22, the position of the inner set of binding rod slots 268 of the first stator laminations 242 substantially corresponds with the position of the binding rod slots 256 of the second stator laminations 244. Additionally, for example, at least a part of the outer set of binding rod slots 267 of the first stator laminations 242 corresponds with the position of the binding rod slots 256 on the outer edge of the second stator laminations.

In examples, the stator laminations are compressed together using binding rods in a similar manner to that described above for the rotor laminations.

For example, referring back to FIG. 21*b*, the diameter of the circular portion 270*b* is dimensioned so as to allow passage of the anchor(s) of the binding rods through the circular portion 270*b*. The width of the linear portion in the circumferential direction is substantially the same as the diameter of the corresponding binding rod. In examples, the width of the linear portion 270*a* in the circumferential direction is a first predetermined clearance distance greater than the diameter of the corresponding binding rod, the diameter of the circular portion 165*b* is a second predetermined clearance distance greater than the diameter of the anchor of the binding rod.

The stator segment side plates 240*a*, 240*b* each comprise a plurality of binding rod slots which are positioned to correspond with the binding rod engaging slots in the stator laminations, such as slots 256*a*, 256*c*. The stator laminations and stator side plates are assembled to be held together in a similar manner to that described above for the rotor laminations. In examples, the stator side plates are positioned in areas of fluctuating magnetic flux. Therefore, in examples, to reduce eddy current losses in the side plates, the side plates are formed from a non-magnetic material such as aluminum, austenitic stainless steel, or other non-magnetic metal or non-metal.

FIGS. 23*a* and 23*b* schematically illustrates a side view of the stator coils mounted over the coil tooth portions of the stator laminations according to examples of the disclosure. For example, as illustrated in FIG. 23*a*, the binding rods 236 compress the stator laminations in the axial direction and the stator coils are mounted so that the coils are located around respective coil tooth portions of the stator laminations. The stator coils will now be described in more detail with reference to FIGS. 24 to 29.

Stator Coils

The stator coils will now be described in more detail with reference to FIGS. 24 to 29.

FIG. 24 schematically illustrates a stator coil 238 according to examples of the disclosure. The stator coil 238 comprises a plurality of linear winding portions (such as linear winding portions 272) and a plurality of end winding portions (such as end winding portions 274*a*, 274*b*) located at each end of the linear winding portions. In other words, the coil 238 comprises a plurality of windings formed by the linear winding portions and the end winding portions.

The coil 238 comprises a fluid channel through which a fluid can be passed to heat or cool the coil 238. In examples, the fluid is a liquid although it will be appreciated that a gas could be used. The coil 238 comprises a fluid inlet 276 and a fluid outlet 278. The coil 238 is dimensioned so as to be able to fit over a coil tooth of the stator laminations so that the winding portions are located around the coil tooth. In other words, in examples, the coil 238 can be positioned in stator slots between the coil teeth of the stator laminations. In examples, the fluid channel comprises stainless steel and the winding portions comprise copper, although it will be appreciated that other suitable materials could be used for the fluid channel and the windings.

In examples, the windings are formed from a continuous conductor, such as copper, with the fluid channel passing within the conductor. The windings are electrically insulated from each other with resin or lacquer coating although it will be appreciated that other techniques for insulating the windings from each other could be used. In the example illustrated in FIG. 24, the coil 238 comprises a first electrical connector 280 and a second electrical connector 282. The first electrical connector 280 is electrically connected to one end of the windings and the second electrical connector 282 is connected to the other end of the windings so that current generated in the coil 238 flows round the windings between the electrical connectors. The electrical connectors 280, 282 are electrically connected to external circuitry and or other electrical connectors of other stator coils so as to achieve a desired output such as a desired current or voltage.

FIG. 25 schematically illustrates a magnified view of one end of the coil 238 according to examples of the disclosure. The fluid inlet 276 comprises an inlet connector 284 and the fluid outlet 278 comprises an outlet connector 286. The inlet and outlet connectors are configured to connect to a manifold so that the fluid channel is in fluid communication with the manifold. The inlet connector 284 and the outlet connector 286 will be described in more detail later below. Referring to FIG. 25, the coil 238 comprises an electrically insulating sleeve which surrounds the linear winding portions of the coil 238, although it will be appreciated that other configurations of an insulting sleeve could be used. The electrically insulating sleeve helps galvanically isolate the coil from the stator laminations. In some examples, the electrically isolating sleeve helps protect the insulating coating of the windings from mechanical abrasion from the laminations.

FIG. 26 schematically illustrates a cross sectional view of the coil 238 viewed in the direction of arrow 289 in FIG. 24, and FIG. 27 schematically illustrates a cross sectional view of the coil 238 viewed in the direction of arrow 290 in FIG. 24. As mentioned above, the coil comprises a fluid channel 291, for example as illustrated in FIG. 26.

In examples, the cross section of the conductor used to form the windings of the coil 238 is rectangular. Therefore, in examples, the windings in the end winding portion 274*a* are angled with respect to the linear portion so as to accommodate a step for one winding level to a next winding level.

FIG. 27 schematically illustrates winding turns (levels) of a stator coil according to examples of the disclosure. Referring to FIG. 27, in examples, the coil 238 comprises 12 winding turns formed by bending the conductor and fluid channel into the coil configuration. In the example illustrated in FIG. 27, there are 6 winding turns on top of each other, labelled 1 to 6 (each winding level comprises two windings). In this example, there are 4×6 conductors in a slot. However, it will be appreciated that the winding could comprise any suitable number of winding turns to be mounted in a coil slot. Additionally, although the conductor illustrated in FIG. 27 has a rectangular cross section, it will be appreciated that the cross section of the conductor could be square, hexagonal, or circular or any other appropriate cross section.

FIG. 28 schematically illustrates an arrangement of the stator coils with respect to the stator rim according to examples of the disclosure. FIG. 29 schematically illustrates a cross section of the stator coils and the stator laminations in accordance with examples of the disclosure.

In particular, FIG. 29 schematically illustrates an arrangement for retaining the stator coils around the coil teeth. A coil retaining plate 293 (also referred to as a slot key) engages with a coil mounting slot of a first coil tooth portion (e.g. coil tooth portion 250*b*) and a coil mounting slot of an adjacent coil tooth portion (e.g. coil tooth portion 250*c*) so as to retain the coil with respect to the stator laminations. In other words, the coil retaining plate helps restrict motion of the coil away from the stator laminations. In examples, each coil retaining plate is arranged to retain the windings of two coils, although it will be appreciated that the coils could be retained in the stator slots (that is between the coil teeth of the stator laminations) using other appropriate arrangements.

Inlet and Outlet Connectors

The inlet and outlet connectors will now be described with reference to FIGS. 30 and 31. The inlet connector and the outlet connector are examples of an isolation connector according to examples of the disclosure.

FIG. 30 schematically illustrates an isolation connector 292 such as inlet connector 280 or outlet connector 282. In examples, the outlet connectors have a similar or the same configuration as the inlet connectors.

The isolation connector 292 is designed to electrically isolate (insulate) the coil from the fluid system. The isolating connector 292 comprises an electrically isolating disc 293 and a coupling disc 294. In examples, the thickness of the isolating disc 293 is chosen to be a suitable thickness based on the electric field strength in the insulation. The isolating disc comprises a first face 293a on one side of the disc and a second face 293b on the other side of the disc.

A fluid insulating channel 295 is formed in the isolating disc 293 and a fluid channel 296 is formed in the coupling disc 294. The coupling disc 294 comprises a coupling element 297 for coupling the isolation connector 292 to a fluid channel of the conductor or the manifold. The isolating disc 293 is bolted to the coupling disc 294 via co-located through holes and threaded holes in the discs so that the fluid channel 295 is arranged to be in fluid communication with the fluid channel 296. In examples, the length of the fluid insulating channel 295 is chosen to provide the required resistance to electrical current flowing through the fluid insulating channel 295.

The isolating connector 292 comprises a seal located between the isolating disc 293 and the coupling disc 294 so as to form a fluid seal between the discs. In examples, the seal comprises a pair of concentric elastomeric O-rings located concentrically with the fluid channel 295 and the fluid channel 296 in the plane parallel to the fluid channels. In other words, the seal comprises a plurality of sealing elements (such as O-rings). The plurality of seals can thus be thought of as redundant seals which can act as a back-up seal should one of the seals fail. This helps reduce the likelihood of leaks occurring. However, it will be appreciated that other suitable seals could be used.

In examples, the first face 293a comprises a first seal 298a for sealing the connector to a fluid system, such as a manifold, fluid channel of the coil conductor, or coupling element of a coupling disc such as coupling disc 294. The second face 293b comprises a second seal 298b for sealing between the isolating disc 293 and the coupling disc 294. In examples, the first seal 298a and the second seal 298b each comprise a pair of concentric O-rings located in corresponding O-ring grooves, although it will be appreciated that other types of fluid seal could be used.

FIG. 31 schematically illustrates an example of an isolating connector 301. The isolating connector 301 comprises similar elements to isolating connector 292. The isolating connector 301 comprises an isolating disc 293 and a pair of coupling discs 294 located either side of the isolating disc. The configuration of the isolating disc 293 and the coupling discs 294 is the same as that described above with reference to FIG. 31. The isolating connector 301 comprises a connector frame 302 for holding the discs together. The connector frame comprises a pair of frame discs located either side of the coupling discs 294 and linked by bolts 304 so that the connector frame can compress the coupling discs 294 to the isolating disc 293 in a direction perpendicular to the plane of the discs. In examples, the connector frame 302 comprises a pair of frame isolation discs 299a, 299b located between the coupling discs 294 and the frame discs so as to electrically isolate the coupling discs 294 from the connector frame 302.

In examples, the isolating connector 292 is coupled to the conductor fluid channel or the manifold via the coupling element 297. In examples, the coupling element is soldered to the coil conductor fluid channel or the manifold so that the fluid channels of the isolating connector are in fluid communication with fluid channel of the coil conductor or manifold, although it will be appreciated that these connections could be formed in other suitable manners, for example, using adhesive, or by welding.

In examples, the isolating disc 293 and the frame isolation discs 299a, 299b comprise plastics material such as polyetherimide (PEI) or phenolic plastics, although it will be appreciated that any suitable electrically insulating material could be used. Additionally, although the isolating connectors in the examples of FIGS. 30 and 31 comprises discs, it will be appreciated that elements with any other cross section could be used. For example, the isolating connector could have a rectangular or square cross section.

Manifold

A manifold according to examples of the disclosure will now be described in more detail with reference to FIGS. 32a and 32b.

FIG. 32a schematically illustrates the configuration of the manifold with respect to the stator coils according to examples of the disclosure. In the example of FIG. 32a, the stator segment comprises a first manifold 306 and a second manifold 308. The first manifold 306 and the second manifold 308 are arranged to connect to the fluid channels of the stator coils (such as stator coils 238) so that the manifolds are in fluid communication with the fluid channels of the stator coils. In examples, the manifolds are arranged to be in fluid communication with a fluid heat transfer system (fluid circulation system) for passing heating and/or cooling fluid through the stator coils.

For example, when the generator 1 is operational so as to generate electrical power cooling fluid can be passed through the fluid channels of the stator coils via the manifolds so as to cool the stator coils. This can allow tangential torque to be increased for a given rotor/stator diameter and so the power output for a given size of generator can be increased.

In another example, if the generator is in stand-by, for example, the prime mover is not driving the generator to generate power, then it may be desirable to heat the stator coils. For example, in an offshore wind turbine application or onshore wind turbine application where the ambient temperature is likely to be below freezing (i.e. below 0 degrees centigrade) for at least some of the year, there is a risk that the generator may freeze or ice may form on it when not operational. Therefore, in some examples, to help prevent freezing of the generator, heating fluid is passed through the fluid channels of the stator coils.

In examples, the heat transfer fluid comprises a non-conductive fluid such as deionized water, although it will be appreciated that other heat transfer fluids could be used.

FIG. 32b schematically illustrates a manifold according to examples of the disclosure.

FIG. 32b shows the manifold 308. The manifold 308 comprises a first part 310 and a second part 312. The first part 310 is joined to the second part 312 so as to form a first fluid chamber 314 and a second fluid chamber 316 within the manifold between the first part 310 and the second part 312. The manifold 308 comprises a chamber divider 318 which separates the first fluid chamber 314 from the second fluid chamber 316 so that the fluid chambers are in fluid isolation from each other within the manifold 308. In examples, the first part 310 is joined to the second part 312 by welding. However, it will be appreciated that the first part 310 could be joined to the second part 312 by bolts with elastomeric seals being provided between the joins, and that other techniques such as adhesive bonding, ultrasonic welding, and the like (alone or in combination) could be used.

The manifold 308 comprises a plurality of first ports (such as ports 320) in fluid communication with the first chamber 314 and plurality of second ports (such as ports 322) in fluid communication with the second chamber 316. In examples, the first ports are configured to connect to the fluid inlets of the stator coils and the second ports are configured to connect to the fluid outlets of the stator coils. However, it will be appreciated that the first ports could be configured to connect to the fluid outlets of the stator coils and the second ports could be configured to connect to the fluid inlets of the stator coils, or that other connection configurations could be used.

In examples, the cross section of the manifold 308 in the plane of rotation of the generator is a truncated circular sector. In other words, an outer and inner edge of the manifold in the radial direction corresponds to arcs of concentric circles. However, it will be appreciated that the manifold could have any other appropriate shape.

In examples, the first ports 320 and the second ports 322 are arranged in a circumferential direction along a circular arc centered on the axis of rotation. In other words, the ports lie on a curved line which follows the circumference of the stator rim. In these examples, the chamber divider 318 has a wave-like profile in the circumferential direction. In examples, each fluid inlet and fluid outlet of a stator coil corresponds to a respective first port and second port (pair of ports). The chamber divider is located between each pair of ports (first port and second port). For example, a portion 318a of the chamber divider 318 is located between a first port 320a and a second port 322a.

In examples, the chamber divider 318, and/or the walls of the first part 310 and/or second part 312 comprise insulating material for thermally insulating fluid in the first fluid chamber 314 from fluid in the second fluid chamber 316. In an example, the chamber divider 318 and/or the first part 310 and/or the second part 312 have a sandwich construction (i.e. a double wall construction), with insulating material sandwiched between the double walls. In another example, the chamber divider 318 and/or the first part 310 and/or the second part 312 have a hollow construction.

The first part 310 comprises a first chamber fluid port 324, a second chamber fluid port 326, a third chamber fluid port 328, and a fourth chamber fluid port 330. The first chamber fluid port 324 and the second chamber fluid port 326 are arranged so as to be in fluid communication with the first chamber 314 and the third chamber fluid port 328 and the fourth chamber fluid port 330 are arranged to be in fluid communication with the second chamber 316. In examples, fluid can be passed through the first and second chamber fluid ports 324, 326 into the first chamber so as to flow into the fluid inlets of the coils, through the fluid channels of the coils, and out through the outlet ports of the coils into the second chamber. The fluid thus flows out from the manifold 308 through the third and fourth chamber fluid ports 328, 330. However, it will be appreciated that other fluid port configurations could be used.

Another example of a manifold according to the present disclosure will be described later below.

Rotor/Stator Segment

The rotor segment 116 and the stator segment 212 have been described separately above. However, the teaching may be applied generically to a segment for supporting electromagnetic coupling elements (e.g. magnet poles or stator coils) of a stator or rotor of an electrical machine.

In examples, such a segment comprises a plurality of elongate laminations which are stacked in a first direction to form a lamination stack with elongate edges of the laminations defining opposite first and second major faces of the lamination stack; and a plurality of elongate compression devices passing internally through the lamination stack in the first direction and arranged to compress together the laminations in the lamination stack.

Because the compression devices are (mainly) internal, the size of the segment is not (significantly) enlarged relative to the size of the stack itself.

In examples, the first direction is, in use, the axial direction of the stator or rotor of which the segment forms part.

In examples, the lamination stack may be considered to have the form of a slab-like body.

In examples, a body of the lamination stack may be curved, e.g. in the circumferential direction of the stator or rotor of which the segment forms part. In examples, the body has a uniform or constant radius of curvature. For example, the radius of curvature is constant between opposite first and second (circumferential) ends of the lamination stack corresponding to the longitudinal ends of the elongate laminations.

The compression devices in the examples shown in the Figures are each in the form of a binding rod assembly having a central binding rod portion (binding rod), anchor portions (anchors) at the ends of the binding rod portion, and collars (spacing collars) for fitting to the anchor portions.

In examples, the rod portion of the compression device is electrically non-conducting and non-magnetic. This helps reduce induced eddy currents.

In examples, the rod portion of the compression device has a substantially constant elastic spring constant (spring rate) over an elastic range, e.g. a range which includes the natural (unextended) length of the rod portion.

In examples, where each elongate compression device is in an elastically extended condition thereby generating a compressive force applied to the lamination stack, the elongate compression devices can continue to compress the lamination stack even when, during long-term use of the segment in a stator or rotor, vibrations cause wearing and a reduction in the size of the lamination stack.

In examples, the elastic extension of the rod portion of the compression device reduces as vibrational wear of the lamination stack occurs, but the amount of the initial elastic extension may be arranged to accommodate the in-use wearing of the lamination stack.

In examples, the lamination stack has slots extending longitudinally in the first direction, and at least some of the elongate compression devices are located in the slots.

In the examples shown in the Figures, these slots of the lamination stack are in the form of the binding rod slots.

In examples, the laminations comprise laminations of a first type and laminations of a second type; and the laminations of the first type each have a first portion generally corresponding to (and aligned with) the profile of the laminations of the second type and a second portion which projects beyond the profile of the laminations of the second type. In examples, in use of the segment, the first and second portions of the first type of lamination are radially spaced apart in the radial direction of the stator or rotor of which the segment forms part. Alignment of the first portion of the first type with the second type may cause the elongate edges of the laminations of the first and second types of lamination (at one of the two major faces of the lamination stack) to be substantially flush, so that the major face has a substantially uniform profile in the first direction of the lamination stack. This major face may, in use, be the major face of the lamination stack on which the electromagnetic coupling elements (e.g. magnets or coils) are mounted.

In examples, the lamination stack is sandwiched between elongate plates and each elongate compression device has first and second ends arranged to engage with the plates to compress the lamination stack between the plates. Thus, the elongate compression devices are acting indirectly on the lamination stack, via the plates. If the plates are omitted, the elongate compression devices may act directly on the stack.

In the examples shown in the Figures, the plates are in the form of the stator or rotor side plates.

In examples, the laminations are magnetically permeable (e.g. metallic) with electrical insulation between the laminations (e.g. insulating coating on the laminations or separate insulation layers included in the stack).

The teaching relating to the rotor segment 116 and the stator segment 212 is also generically applicable to a compression device. In examples, a compression device comprises a central rod portion having first and second ends; and first and second anchor portions at respective ones of the first and second ends of the central rod portion; wherein each anchor portion is of larger diameter than the adjacent part of the central rod portion.

Furthermore, the teaching relating to the rotor segment 116 and the stator segment 212 is also generically applicable to a method of installing a compression device, comprising the steps of: providing a lamination stack having laminations stacked in a first direction and a slot extending longitudinally in the first direction; providing a compression device comprising a central rod portion having first and second anchor portions at respective first and second ends of the central rod portion; inserting the compression device into the slot; applying tension to the compression device to lengthen the central rod portion; fitting first and second collars respectively to the first and second anchor portions; and releasing the applied tension to cause the collars to apply a compressive force to the lamination stack.

Rotor and Stator Axle/Hub

A rotor axle/hub and stator axle/hub according to examples of the disclosure will now be described with reference to FIGS. 33 to 37. The examples of the axle/hub arrangement described with respect to FIGS. 33 to 37 relate to an arrangement where the rotor 100 is arranged to rotate with respect to the stator 200 so that the axle 300 rotates with the rotor with respect to a housing of the generator. Further examples relating to an arrangement in which the axle is fixed so as to restrict rotation with respect to the housing, will be described in more detail later below.

FIG. 33 schematically illustrates a rotor axle 330. The rotor axle 330 comprises a first spoke mounting flange 332a and a second spoke mounting flange 332b spaced apart from the first spoke mounting flange 332a in the axial direction. A plurality of spoke attachment holes (e.g. holes 336) for attaching spokes (such as spokes 102a, 102b) are formed in each spoke mounting flange 332a, 332b and arranged circumferentially around each flange 332a, 332b. The attachment of the spokes to the spoke mounting flanges will be described in more detail later below.

The rotor axle 330 comprises a pair of rotor bearing mounting surfaces 338a, 338b for mounting rotor bearings, a pair of stator bearing mounting surfaces 340a, 340b for mounting stator bearings, a pair of rotor bearing retaining ring surfaces 342a, 342b for retaining rings for retaining the rotor bearings on the axle, a pair of stator bearing retaining ring surfaces 344a, 344b for retaining rings for retaining stator bearings on the axles, a pair of rotor bearing retaining ring shoulder portions 346a, 346b, a pair of stator bearing retaining ring shoulder portions 348a, 348b, a pair of rotor bearing shoulder portions 350a, 350b and a pair of stator bearing shoulder portions 352a, 352b. The rotor bearing mounting surfaces and the stator bearing mounting surfaces are respectively formed circumferentially around the outside of the rotor axle 330 so as to engage with bearings of respective rotor hubs and stator hubs as will be described in more detail below.

In the example shown in FIG. 33, the pair of rotor bearing mounting surfaces 338a, 338b are located towards the ends of the rotor axle 330 and the pair of stator bearing mounting surfaces 340 are located towards the flanges 332a, 332b between the respective flange and the respective rotor bearing mounting surface. For example, the stator bearing mounting surface 340a is located between the rotor bearing mounting surface 338a and the first spoke mounting flange 332a in the axial direction and the stator bearing mounting surface 340b is located between the rotor bearing mounting surface 338b and the first spoke mounting flange 332b in the axial direction.

In examples, the diameter of the stator bearing mounting surfaces 342a, 342b is greater than the diameter of the stator bearing retaining ring surfaces 344a, 344b. The diameter of the stator bearing retaining ring surfaces 344a, 344b is greater than the diameter of the rotor bearing mounting surfaces 338a, 338b. The diameter of the rotor bearing mounting surfaces 338a, 338b is greater than the diameter of the rotor bearing retaining ring surfaces 342a, 342b. In other words, in examples, each end of the rotor axle has a stepped formation comprising surfaces for mounting stator and rotor bearings and retaining rings.

FIG. 34 schematically illustrates an arrangement of the rotor axle 330 and rotor bearings. FIG. 34 illustrates a first rotor bearing 352a and a second rotor bearing 352b mounted on the rotor axle 330. The rotor bearings 352a, 352b are mounted on the respective rotor bearing mounting surfaces 338a, 338b and abut the rotor bearing shoulder portions 350a, 350b. The rotor bearings 352a, 352b are retained on the rotor axle 330 by respective rotor bearing retaining rings 354a, 354b which are mounted on rotor bearing retaining ring surfaces 342a, 342b and which abut the respective rotor bearing retaining ring shoulder portions 346a, 346b. The retaining rings are fixed to the axle to restrict axial movement (in the direction of the axis of rotation e.g. towards an end of the axle 330) of the rotor bearings.

In examples, the rotor bearing retaining ring surfaces 342a, 342b are threaded and the retaining rings 354a, 354b comprise a corresponding thread so that the retaining rings can be screwed onto the axle 330 to hold (retain) the rotor bearings 352a, 352b on the axle 330. In these examples, the retaining rings 354a, 354b are provided with notches (e.g. notches 356) in which a suitable tool may be located to rotate the retaining ring around the axle so as to tighten or loosen it against the respective shoulder portion.

In other examples, the rotor bearing retaining ring surfaces 342a, 342b are smooth and the retaining rings 354a, 354b clamp onto the rotor bearing retaining ring surfaces 342a, 342b using a suitable clamping arrangement such as a split ring and bolt(s). However, it will be appreciated that other suitable arrangements for fixing the retaining rings to the axle could be used.

The shoulder portions 346a,346b provide a surface against which the retaining rings 354a, 354b can be located in contact (e.g. abut) thus locating the retaining ring a set distance from the rotor flange. The rotor bearings 352a, 352b are thus held (retained) between the respective retaining rings 354a, 354b and the respective shoulder portions 350a, 350b so that axial motion (that is parallel to the axis of rotation) is restricted.

FIG. 35 schematically illustrates an arrangement of the rotor axle 330, rotor bearings and stator bearings.

The rotor bearings 352a, 352b are mounted on the axle as described above with reference to FIG. 35. Stator bearings 358a, 358b are mounted on the axle 330 in a similar manner to the rotor bearings 352a, 352b as described in more detail below.

The stator bearings 352a, 352b are mounted on the respective stator bearing mounting surfaces 340a, 340b and abut the stator bearing shoulder portions 352a, 352b. The stator bearings 358a, 358b are retained on the rotor axle 330 by respective stator bearing retaining rings 360a and 360b which are mounted on stator bearing retaining ring surfaces 344a and 344b, and which abut the respective stator bearing retaining ring shoulder portions 352a, 352b. The retaining rings are fixed to the axle to restrict axial movement (in the direction of the axis of rotation e.g. towards an end of the axle 330) of the rotor bearings.

In examples, the stator bearing retaining ring surfaces 344a, 344b are threaded and the retaining rings 360a, 360b comprise a corresponding thread so that the retaining rings can be screwed onto the axle 330 to hold (retain) the stator bearings 358a, 358b on the axle 330. In these examples, the retaining rings 360a, 360b are provided with notches (e.g. notches 362) in which a suitable tool may be located to rotate the retaining ring 360a, 360 around the axle so as to tighten or loosen it against the respective shoulder portion.

In other examples, the stator bearing retaining ring surfaces 344a, 344b are smooth and the retaining rings 360a, 360b clamp onto the stator bearing retaining ring surfaces 344a, 344b using a suitable clamping arrangement such as a split ring and bolt(s). However, it will be appreciated that other suitable arrangements for fixing the retaining rings to the axle could be used. The shoulder portions 352a, 352b provide a surface against which the retaining rings 360a, 360b can be located in contact (e.g. abut) thus locating the retaining ring a set distance from the rotor flange. The rotor bearings 358a, 358b are thus held (retained) between the respective retaining rings 360a, 360b and the respective shoulder portions 352a, 352b so that axial motion (that is parallel to the axis of rotation) is restricted.

In examples, the rotor and/or stator bearings are cylindrical roller bearings due to their high load bearing capacity, although it will be appreciated that other bearings such as ball bearings, tapered roller bearings, or other mechanical bearings may be used. It will be appreciated that for some applications, other types of bearings such as fluid bearings, or magnetic bearings may be used as appropriate.

A stator hub will now be described in more detail with reference to FIGS. 36 and 37.

FIG. 36 schematically illustrates a stator hub 364a and a stator hub 364b. Each stator hub 364a, 364b comprises a stator bearing (e.g. stator bearing 358a, 358b respectively). Each stator hub 364a, 364b comprises a respective spoke mounting flange 368a, 368b. A plurality of spoke attachment holes (e.g. holes 366) for attaching spokes (such as spokes 202a, 202b) are formed in each spoke mounting flange 368a, 368b and arranged circumferentially around each flange 368a, 368b. The attachment of the spokes to the spoke mounting flanges will be described in more detail later below.

In examples, the stator hubs 364a, 364b are insulated from the stator bearings 358a, 358b so as to electrically isolate the stator from the axle and the rotor. The stator hubs will be described in more detail below with reference to FIGS. 37a and 37b.

FIG. 37a schematically illustrates stator hub 364a. The stator hub 364a comprises an stator hub housing 370 which comprises the flange 368a and an insulating collar 372 located within the housing 370. The insulating collar 372 is shaped to fit over the stator bearing so as to insulate electrically the stator hub housing from the stator bearing. In examples, the insulating collar 372 comprises a compression resistant polymer or a ceramic insulation material, although it will be appreciated that other suitable insulating materials could be used. In examples, the electrical resistance of the insulating collar is greater than a threshold resistance such as 1 giga ohm, although it will be appreciated that the electrical resistance could be any other suitable value. In examples, the housing is divided into two parts along the flange 368a. This is described in more detail with respect to FIG. 37b.

FIG. 37b schematically illustrates an exploded view of the stator hub 364a. The stator hub housing 370 comprises a first part 374a, and a second part 374b. The first part 374a and the second part 374b are joined together at the flange 368a, for example using glue, welding or by bolts passed through the spoke attachment holes, although it will be appreciated that the first part 374a and the second part 374b could be joined together in any other suitable manner. In other words, the stator hub housing 370 can be thought of as having a split design. This split design can facilitate assembly of the stator bearing and stator hub onto the axle 330.

In examples, to assemble the stator bearing and stator hub onto the axle 330, the first part 374a and the second part 374b are located over the axle 330 to be located around the stator bearing mounting surfaces 340a. The insulating collar 372 is placed around the stator bearing 358a and the stator bearing 358a and insulating collar 372 are then moved with respect to the axle 330 so as to abut the shoulder portion 352a within the second part 374b of the stator hub housing 370. The first part 374a of the stator hub housing 370 is then placed over the stator bearing 358a and the insulating collar 372 around the axle 330 and joined to the second part 374b e.g. by gluing, welding, bolting or any other suitable arrangement. The retaining ring 360a is then moved over the axle 330 to abut the shoulder portion 348a and fixed to the axle 330 so as to restrict motion of the stator bearing 358a and stator hub 364a in the axial direction.

In examples, the rotor bearings 352a, 35b are mounted to the housing of the electrical machine using a similar arrangement to the stator hubs such as the stator hub 364a so that the axle 330 is electrically insulated from the housing of the electrical machine. However, as it is not always necessary for the rotor to be electrically insulated from the housing, in other examples, the axle is mounted to the housing of the electrical machine using known arrangements.

Spoke Attachment

Attachment of the spokes to the rotor and/or stator rings and rotor axle and stator hub respectively will now be described in more detail with reference to FIGS. 38 to 45.

FIG. 38 schematically shows a section of the rotor 100. In examples, the spokes are connected to the rotor rings using respective spoke ring connectors. For example, as shown in FIG. 38, the spokes 102a, 102b are connected to the rotor ring 120 using a spoke ring connector 376. In the example shown in FIG. 38, the rotor segment 116 is mounted on the rotor rings using a plurality of segment mounting attachments, such as segment mounting attachment 373. In other words, more generally in examples the spokes can be thought of as being arranged as a plurality of pairs of spokes. For example, the spokes 102a and 102b are examples of a pair of spokes.

FIG. 39 schematically shows a section of the stator 200. In examples, the spokes are connected to the stator rings using respective spoke ring connectors. For example, as shown in FIG. 39, the spokes 202a, 202b are connected to the stator ring 230 using a spoke ring connector 376. In the example shown in FIG. 39, the stator segment 212 is mounted on the stator rings using a plurality of segment mounting attachments, such as segment mounting attachment 373. More generally, in examples each spoke in a pair of spokes is coupled to the rim (for example at the stator rings) at substantially the same position of the rim and each spoke in the pair of spokes is coupled to the hub at a different position on the hub.

Referring back to FIG. 17, in examples, a major axis of each spoke corresponds with a secant line passing through two points of the rim. In other words, in examples, each pair of spokes is coupled to the rim at substantially the same position and coupled to the hub at different positions so that each spoke in the pair forms a secant line with the rim (e.g. stator or rotor rings)

The spoke ring connectors will be described in more detail with reference to FIG. 40.

FIG. 40 schematically illustrates attachment of spoke to a rotor ring using a spoke ring connector. In particular, FIG. 40 schematically illustrates a portion of the rotor ring 120, spoke connector 376 and spoked 102a, 102b. In the example shown in FIG. 40, the spoke connector 376 comprises two side plates 377a, 377b through which a plurality of attachment holes are formed (in this example 4 holes although any suitable number could be used).

The spoke ring connector comprises a spoke attachment element 378 located on the inner circumference of the rotor ring 120 which links the side plates 377a, 377b on the inner circumference of the rotor ring 120, and a spacer 379 which links the side plates 377a, 377b on the outer circumference of the rotor ring 120. The side plates 377a, 377b of the spoke ring connector 376 are attached to the rotor ring 120 by four bolts 378 which pass through the attachment holes and through corresponding holes in the rotor ring 120. However, it will be appreciated that any other suitable number of bolts could be used and that the spoke ring connector 376 could be mechanically coupled to the rotor ring 120 using other suitable techniques such as welding, gluing and the like. The spoke ring connector can be thought of as an example of a coupling means for coupling each spoke to the rim (e.g. stator or rotor rings(s)).

In examples, the rotor ring and the stator rings are formed from rotor (stator) ring segments which are arcuate elements that together form a circle when joined together. In examples, the spoke connector joins two rotor (stator) ring segments together between the side plates 377a, 377b using the bolts 378. Furthermore, in examples, the spoke connectors are used to join rotor (stator) segments at junctions between the rotor (stator) segments where spokes are not connected to the spoke connectors (for example as illustrated by spoke connectors 379 in FIG. 38).

In the examples, each spoke comprises a pair of spoke end attachments at the end of each spoke for attaching spokes to the spoke attachment elements and the flanges of the rotor axle or stator hub. In the example shown in FIG. 40, one end of the spokes 102a, 102b is illustrated with their respective spoke end attachments 380a, 380b. Securing pins 382a, 382b pass through holes formed in the spoke attachment element 378 and the respective spoke end attachment 380a, 380b to mechanically couple the spokes 102a, 102b to the rotor ring 120. However, it will be appreciated that other arrangements for coupling the spoke to the rotor rings could be used.

In examples, segment mounting attachment holes are formed in each rotor (stator) ring for coupling the segment mounting attachments to the rotor (stator) rings. For example, FIG. 40 illustrates segment mounting attachment holes 371.

FIG. 41 schematically illustrates coupling of spokes to a spoke mounting flange. In the example shown in FIG. 41 the spoke 102a is coupled to the spoke mounting flange 332a of the rotor axle 330 using spoke end attachment 380a. In this example, the spoke end attachment 380a is mechanically coupled to the flange 332a using a securing pin 382a which passes through holes formed in the spoke end attachment 380a and the spoke attachment holes 366 of the flange 332a. In examples, the spokes of the rotor or stator are mechanically coupled (secured) to the respective flanges in a similar manner. The spoke end attachments can be thought of as examples of a coupling means for coupling each spoke to at least one of the rim (e.g. stator or rotor ring) and the hub (such as at the flange 332a).

FIG. 42 schematically illustrates a cross-sectional view of a spoke end attachment and a spoke mounted on a flange. In the example shown in FIG. 42, the spoke 102a is illustrated coupled to the flange 332a of the rotor axle 330 using the spoke end attachment 380a. Each spoke comprises a threaded portion (e.g. threaded portion 384) at either end of the spoke.

The spoke end attachment 380a comprises a nut 386 and a spoke attachment body 388. The nut 386 is mounted on the spoke attachment body 388 so as to restrict motion of the nut 386 away from the spoke attachment body 388. In examples, the spoke attachment body 388 comprises a first arm 390a, a second arm 390b and an arm connecting portion 392 arranged so that the first arm 390a and the second arm 390b are spaced apart from each other so as to located over the flange 332a. In examples, the nut 386 comprises an elongate portion which passes through a hole in the arm connecting portion 392 and flares between the arms 390a, 390b away from the axis of rotation of the nut within the body 388 so as to restrict motion of the nut 386 away from the body 388. The threaded portion 384 engages with the nut 386 so that rotation of the nut 386 with respect to the spoke 102a causes an alteration in tension in the spoke 102a. Accordingly, the tension in the spokes can be adjusted by rotating the nuts of each spoke end attachment. More generally, the spoke end attachment can be thought of as an example of an adjusting means for adjusting tension in one or more of the spokes. In examples, the adjusting means comprises one or more spokes in threaded engagement (e.g. using the nut 386 and threaded portion 384) with at least one of the rim or the hub. This allows trueing of the rotor or stator rings to be carried out (e.g. lateral trueing in the axial direction and radial trueing). However, it will be appreciated that other arrangement for adjusting tension in the spokes could be used.

In examples, the spokes comprise a plurality of rods with a substantially circular cross section. In other words, in examples, each spoke has a substantially circular cross section, although it will be appreciated that the spokes could have other cross sections such as square, rectangular, elliptical, or other cross section. For example, in some examples (such as those described later below), the spoke comprise a plurality of longitudinal bars with a substantially rectangular cross section.

In examples, spokes that cross each other are offset from each other so as to reduce the likelihood of the spoke bending and so that tension forces are directed substantially radially along the spokes. In examples, to achieve this, the nut 386 is mounted to the body 388 so that a center line 394 along the major axis of the spoke is offset in the axial direction from a center line 396 of the body 388. In examples one of the arms (in this example arm 390b) is spaced away from the flange 332a with a washer 340 located between the flange 332a and the arm 390b so that the centerline 396 of the body 388 is offset in the axial direction from a centerline 398 of the flange 332a. In other words, for example, the coupling means (such as spoke end attachment 380a) is arranged to couple each spoke in a pair of spokes so that the spokes in the pair are offset from each other in a direction along the axis of rotation.

In examples each of the spokes of the rotor and/or stator are mechanically coupled to the rotor and/or stator rings using a spoke end attachment and spoke connector in a similar manner to that described above with reference to FIGS. 38 to 42.

Segment Mounting Attachment

The segment mounting attachments will now be described in more detail.

FIG. 43 schematically illustrates a cross sectional view of rotor segment 116 together with a plurality of segment mounting attachments 373a, 373b, 373c. A lamination mounting hole is formed towards an end of each segment mounting attachment and respective bolts 400a, 400b, 400c pass through the respective rotor mounting holes 150a, 150b, 150c of the rotor laminations of the rotor segment 116 so as to mechanically couple the segment mounting attachments 373a, 373b, 373c to the rotor laminations 130.

FIGS. 44a and 44b schematically show a segment mounting attachment.

FIG. 44a schematically illustrates an isometric view of the segment mounting attachment 373 and FIG. 44b schematically illustrates a cross sectional view of the segment mounting attachment. The segment mounting attachment 373 comprises a pair of side plates 402a, 402b joined by an end piece 404 located between the side plates 402a, 402b. In examples, the side plates 402a, 402b are substantially rectangular and the end piece 404 is located towards an end of the side plates 402a, 402b in the direction of the major axis of the side plates 402a, 402b. In examples, a pair of elongate slots 406a, 406b is formed in each side plate through which securing bolts may pass for securing the segment mounting attachment to the rotor of stator rings. The segment mounting attachment 373 comprises an adjustment bolt 408 which cooperates with a threaded hole in the end piece 404 so that the bolt 408 passes through the end piece 404 and engages with a surface of a rotor (or stator) ring as will be described in more detail below. The segment mounting attachment 373 comprises a lock nut 410 threaded onto the bolt 408, which, when tightened against the end piece 404 restricts (inhibits) rotation of the bolt 408 with respect to the segment mounting attachment 373.

Referring back to FIG. 38, the rotor segment 116 is illustrated mounted on the rotor rings 120, 122, 124, 126 using the segment mounting attachments 373. The side plates 402a, 402b are located either side of a rotor ring (e.g. rotor ring 120) and the adjustment bolt engages a side of the rotor ring opposite the side of the rotor ring 120 on which the rotor segment 116 is located. The adjustment bolt can be rotated with respect to the segment mounting attachment so as to adjust the distance between the rotor segment 116 and the rotor rings 120, 122, 124, 126 at positions where the adjustment bolt contacts the rotor rings. This helps assist adjustment of the gap between the rotor segments and the stator segments to try to achieve a uniform gap (typically, 6 mm although it will be appreciated that any other suitable gap could be used). The segment mounting attachments 373 are coupled (secured) to the rotor (stator) rings by bolts which pass through the slots 406a 406b and the segment mounting attachment holes 371. In other words, once tightened these bolts restrict motion of the rotor (stator) segments with respect to the rotor (stator) rings.

In examples, the stator segments are mounted on the stator rings in a similar manner to that described above for the rotor. For example, FIG. 45 schematically illustrates the stator segment 212 mounted on the stator rings.

Alternative Spoke Arrangement

Although the above examples use spokes with threaded portions it will be appreciated that other arrangements are possible. An alternative example is described with reference to FIGS. 46a and 46b.

FIG. 46a schematically shows an isometric view of a spoke structure and FIG. 46b schematically shows a side view of the spoke structure.

In the example of FIGS. 46a and 46b a spoke structure 500 is illustrated. The spoke structure 500 comprises a first side element 502a and a second side element 502b. Each side element 502a, 502 is substantially circular. The spoke structure comprises a plurality of spacing rods (e.g. spacing rods 504) located between the first side element 502a and the second side element 502b around the circumference of the side elements 502a, 502b which hold the side elements 502a, 502b in spaced relationship with each other.

FIG. 46b schematically illustrates a side view of the spoke structure 500. In particular, side element 502a is shown in FIG. 46b. The side element 502a comprises a rim 506, a plurality of spoke portions (such as spoke portions 508) and a central portion 510. A hole 512 is formed in the central portion 510 for engaging with a rotor or stator hub (for example as described above). In examples, the spoke portions are arranged tangentially with respect to the hole and extend radially between the central portion 510 and the rim 506. In the examples shown in FIGS. 46a and 46b, the spokes are arranged tangentially in a clockwise sense.

In the example shown in FIGS. 46a and 46b, clockwise torque causes a reduction in outward radial deflection of the rim caused by applied outward radial forces. Similarly, counter clockwise torque causes a reduction in inward radial deflection of the rim due to applied inward radial forces. The orientation of the spokes is chosen as appropriate depending on the forces involved. In examples, the orientation of the spokes of the stator is opposite from that of the rotor, as will be described in more detail later below.

In examples, the spoke structure is employed to support rotor or stator rings such as those described above. In examples, the spacing rods 504 are coupled to a plurality of rotor rings or stator rings in a similar manner to that described above, with the rest of the elements being the same as described above. In other words, in examples, the spoke structure 500 can be used instead of the spoke arrangement described above (for example with reference to spokes 102*a*, 102*b*, 202*a*, 202*b*).

Generator—External Rotor

In the examples described above, the rotor rotates with respect to the stator within the stator. In other words, in the examples described above, the rotor is on the inside of the stator. However, in other examples, the rotor is outside the stator so that the rotor rotates around the outside of the stator.

An example of a DD-PMSG according to examples of the disclosure is now described with reference to FIGS. 47 to 66. FIG. 47 is a schematic diagram of a direct drive permanent magnet synchronous generator 600 (DD-PMSG) according to examples of the disclosure. The generator 600 comprises a rotor 650, a stator 700, and an axle 750. The rotor 650 is arranged to rotate with respect to the stator 700 about the axle 750 on the outside of the stator. In examples, the rotor 650 comprises a plurality of permanent magnets and the stator 700 comprises a plurality of stator coils. Rotation of the rotor 650 with respect to the stator 700 causes a change in magnetic flux due to motion of the permanent magnets with respect to the stator 700 and so causes a current to be induced in the stator coils. More generally, for example, the generator comprises a stator comprising one or more electrical windings and a rotor comprising one or more permanent magnets, the rotor being arranged to be rotatable with respect to the stator about an axis of rotation. In examples, the rotor is located further from the axis of rotation than the stator. In other words, as mentioned above, in examples, the rotor is arranged to rotate around the outside of the stator.

FIG. 48*a* is a schematic elevation view of the generator 600 and FIG. 48*b* is a schematic side view of the generator 600. As illustrated in FIG. 48*a*, the rotor 650 comprises a plurality of rotor spokes such as rotor spokes 660. In examples, the rotor 650 has a spoke arrangement similar to that described above with reference to FIG. 45 with the tangentially arranged spokes being arranged so as to transmit tension forces along the spokes to the hub when the rotor 650 rotates. In this example, the spokes are welded to the central portion and the rim although it will be appreciated that the spokes may be coupled to the central portion and the rim in other suitable manner such as bolted couplings, glue, or may be integrally formed with the central portion and the rim.

A weld joint for coupling the spokes to the rim and central portion (e.g. hub) can be thought of as an example of a coupling means for coupling each spoke to at least one of the rim and the hub (e.g. the central portion). In other words, in examples, the coupling means comprises a welded joint. In some examples, the hub, spokes and rim are integrally formed with each other (for example by machining or stamping from a plate material such as metal). This can help simplify the construction of the rotor and/or stator.

Similarly, the stator 700 comprises a plurality of stator spokes such as stator spokes 710. The plurality of stator spokes couple the stator hub with the stator rim. In examples the spoke arrangement of the stator is similar to that of the rotor 650 except that the spokes extend tangentially in the opposite direction to those of the rotor 650 so as to resist induced forces on the stator 700 due to rotation of the rotor 650.

Referring to FIG. 48*b*, the rotor rim comprises a plurality of rotor rings 670 spaced apart from each other and having a similar configuration to that described above. In the example of FIG. 48*b*, the rotor comprises 5 rotor rings, although it will be appreciated that any other suitable number of rotor rings could be used. The stator rim comprises a plurality of stator rings arranged in a similar manner to the rotor rings.

FIG. 49 schematically illustrates the rotor 650. In this example, magnets 652 are mounted on laminations mounted on the middle three rotor rings 670*b*, 670*c*, 670*d* in a similar manner to that described above for the generator 1. The rotor 650 comprises a rotor hub 680 which has a similar construction to that of the stator hub described above for the generator 1.

FIG. 50 schematically illustrates the spoke arrangement of the generator 500. The spoke arrangement may be used for both the rotor 650 and the stator 700. In the examples shown in FIG. 50, the spokes are arranged tangentially in a counter clockwise direction so that for clockwise torque, the rim resists outward radial forces. In other words, more generally, in examples the spokes are arranged tangentially with respect to a circumference of the hub.

In the example of FIG. 50, the spoke arrangement of the rotor 650 is shown. The rotor comprises a rim 662, and a hub 664 which are coupled together by the spokes (e.g. spokes 660). In this example, the prime mover is arranged to rotate the rotor 650 in a clockwise direction when viewed into the page (as indicated by the arrow). The spokes (e.g. spokes 660) are arranged to transmit torque of the hub 664 to the rim 662. The magnets are mounted on the inside of the rotor 650 in a similar manner to that described above with reference to the generator 1, except in these examples, the magnets are inside the rotor rather than on the outside of the rotor.

In examples, electromagnetic forces acting between the rotor and other elements of the electrical generator located further from the axis of rotation in the radial direction than the rotor are substantially zero. To achieve this, in examples, the rotor comprises a plurality of magnets arranged as an Halbach array, although it will be appreciated that other techniques could be used.

FIG. 51 schematically illustrates the stator 700. The stator 700 comprises a plurality of stator coils (e.g. stator coils 712) such as the stator coils described above with reference to the generator 1. The stator 700 and rotor 650 are mounted on the axle 750, which is fixed to a generator housing. In this example, the axle 750 is hollow and the manifolds are mounted between the stator 700 and the rotor 650 so that fluid lines for the connecting the manifolds to the fluid cooling/heating system pass through a wall of the axle 750, within the inside of the axle 750 and through an end of the axle for connection to the fluid cooling/heating system. In other words, in examples, one or more pipe holes are formed in the axle and at least one of the inlet pipes and the outlet pipes pass through the one or more pipe holes.

In these examples, the stator coils are in fluid communication with the manifolds via suitable fluid communication lines. In examples, the wiring for the stator coils passes through the wall of the axle 750 between the stator 700 and the rotor 650, within the inside of the axle 750 and through an end of the axle for connection to external wiring of the generator. In other words, for example, one or more wiring holes are formed in the axle and electrical wiring for the one of more electrical windings passes through the one or more holes in the axle. Examples of the disclosure can help simplify the configuration of the generator as the wiring and/or fluid lines (e.g. inlet pipes and/or outlet pipes) can pass along the inside of the axle and offer a centralized connection position for electrical and/or fluid communication as appropriate to generator management systems, such as a fluid circulation system and/or power management system.

More generally, in examples, the generator comprises one or more fluid manifolds in fluid communication with the heat transfer channels and each manifold comprises an inlet port and an outlet port for fluid communication with a fluid circulation system. In examples, the generator comprises one or more fluid inlet pipes, each in fluid communication with a respective inlet port and the fluid circulation system and one or more fluid outlet pipes, each in fluid communication with a respective outlet port and the fluid circulation system. Therefore, the stator coils can be heated or cooled as desired, for example depending on operational conditions of the generator as will be described in more detail later below.

FIG. 52 schematically illustrates the spoke arrangement of the stator 700. The stator 700 comprises a rim 722, and a hub 724 which are coupled by the spokes (e.g. spokes 710). The stator 700 is mounted on the axle 750 so as to inhibit (restrict) motion of the stator with respect to the generator housing. The spokes (e.g. spokes 710) are arranged to transmit torque generated by back electro motive force of the rotation of the rotor 650 to the hub 724. In some examples, the stator coils are substantially the same as those described above with respect to the generator 1 but are formed to be able to be mounted on the outside of the rotor 700 in a similar manner to that described above with reference to the generator 1.

In examples, the generator comprises a housing within which the rotor and stator are located, and an axle on which the stator and the rotor are mounted coaxially. In some examples, the axle is mounted with respect to the housing so as to restrict rotation of the axle with respect to the housing and the rotor comprises rotor bearings arranged with respect to the axle so that the rotor can rotate about the axle. In other words, for example, the axle can be fixed to the housing and the rotor can rotate about the axle. For example, the rotor and stator can be mounted on an axle such as that described above, with the axle being mounted in the housing so as to restrict (i.e. inhibit) rotation of the axle. This can help with ensuring the rotor is concentrically aligned with the stator and so help improve electromagnetic coupling around the whole circumference of the rotor. Additionally, in examples, the rotor bearings electrically isolate the rotor from the stator, for example using an insulating collar and hub arrangement as described above. More generally, in examples, the rotor is electrically isolated from the stator, for example by the rotor bearings, so that the likelihood of electrical current flowing between the stator and rotor along unintended current paths is reduced.

A further manifold design and stator coil design according to examples of the disclosure will now be described with reference to FIGS. 53 to 60.

FIG. 53 schematically illustrates an arrangement of a stator segment of the stator and a manifold.

In particular, FIG. 53 schematically illustrates a stator segment 800, a manifold 820, a plurality of stator ring support tube assemblies (for example stator ring support tube assemblies indicated as 830), a stator ring 840, a plurality of spokes (such as spokes 850a, 850b, 854a, and 854b), a manifold inlet pipe 860, and a manifold outlet pipe 862.

The stator of the example of FIG. 53 comprises two stator rings located at either end of the stator ring support tube assemblies. However, for ease in understanding the drawing, only one stator ring (the stator ring 840) is illustrated for ease of understanding the drawing. Additionally it will be appreciated that although one stator segment is illustrated, the stator 700 would typically comprise a plurality of stator segments mounted circumferentially so as to be continuous about the circumference of the stator, although it will be appreciated that they need not be continuous.

The stator segment 800 is mounted on a plurality of the stator ring support tube assemblies as will be described in more detail later below. In the example shown in FIG. 53, the stator segment 800 is mounted on thirteen stator ring support tube assemblies, although it will be appreciated that if could be mounted on any other number of stator ring support tube assemblies.

A plurality of holes are formed in the hub 724 through which inlet and outlet pipes of respective manifolds pass to allow fluid from the fluid heat transfer system to be communicated to the stator coils through the hub 724. For example, the manifold inlet pipe 860, and the manifold outlet pipe 862 pass through a hole 864 in the hub 724. In examples, the spokes are arranged in pairs either side of the stator rings in the axial direction. For example, the spoke 850a is arranged on one side (for example, the inner side) of the stator ring 840 and the spoke 850b is arranged on the other side (for example, the outer side) of the stator ring 840 so that a profile of each of the spokes 850a and 850b in a plane perpendicular to the axis of rotation of the rotor substantially coincides. In examples, each spoke in a pair of spokes is coupled to the rim at substantially the same position of the rim and each spoke in the pair of spokes is coupled to the hub at substantially the same position on the hub.

In examples, the spokes are coupled to the hub 724 and the stator rings using through pins located either end of each spoke which pass through holes formed in the spokes and at respective positions in the hub 724 and stator rings. For example, referring to FIG. 53, the spokes 850a and 850b are coupled to the stator ring 840 using a through pin 851a and are coupled to the hub 724 using a through pin 851b. The through pin 851a and through pin 851b together with the holes through which they pass can be thought of as examples of coupling means for coupling the spokes to eh rim and/or hub.

In other examples, the spokes are coupled to the hub 724 and the stator rings by welding, although it will be appreciated that other arrangements could be used such as bolts, or adhesive could be used. In examples, the spokes of the rotor are coupled to the rotor rings and rotor hub in a similar manner to that of the stator, although it will be appreciated that different coupling arrangements could be used for each of the stator and the rotor.

FIG. 54 schematically illustrates the stator segment 800 according to examples of the disclosure. The stator segment 800 comprises a plurality of stator laminations, a plurality of stator binding rods (such as binding rods 870), a plurality of stator coils (such as stator coils 880), a pair of stator laminations side plates 890a, 890b located on either side of the stator laminations in the axial direction, and the manifold 820. The manifold 820 will be described in more detail later below. In examples, the stator segment 800 comprises 12 stator coils, although it will be appreciated that the stator segment could comprise any suitable number of stator coils. In examples, the stator binding rods are the same as those described above.

Referring to FIG. 54, the stator laminations comprise first stator laminations 884 and second stator laminations 886. One or more mounting holes (such as mounting holes 888) are formed in the first stator laminations 884 and the side plates 890a and 890b for mounting the stator laminations on the stator rings. In examples, the second stator laminations 886 are the same as the second stator laminations 244 described above with respect to FIGS. 20*a* and 20*b*. In examples, the first stator laminations 884 are substantially the same the first stator laminations 242, described above with respect to FIGS. 21*a* and 21*b*. However, in the examples described with respect to FIGS. 47 to 66, the mounting holes (e.g. mounting holes 888) are formed so as to correspond with a cross section of the stator ring support tube assemblies (such as the stator ring support tube assemblies 830) so that the support tubes of the support tube assemblies can pass through the mounting holes. In examples, the profile of the side plates 890*a* and 890*b* substantially corresponds with, or is the same as, that of the first stator laminations 884.

FIG. 55 schematically shows a stator coil 880. In examples, the stator coil 880 is substantially the same as that described above with respect to FIGS. 24 to 27. However, in the examples of FIGS. 54 to 66, the length of the fluid channel between the coil windings and the inlet and outlet connectors 284 and 286 is greater than that of the example described above with respect to FIGS. 24 to 27. Additionally, the fluid channel between the coil windings and the inlet connector 284 and the outlet connector 286 is arranged so that the connectors 284 and 286 are located closer to the axis of rotation than the coil winding when the coil winding is mounted on the stator laminations.

FIG. 56 schematically illustrates coupling of the stator coil 880 to the manifold 820. The stator coil 880 in the example shown in FIG. 56 is substantially the same as that described above with respect to FIG. 55. However, in the example of FIG. 56, inlet and outlet connectors are different from the inlet connector 284 and the outlet connector 286. In particular, the stator coil 880 comprises an inlet connector 892 and an outlet connector 894.

In examples, the inlet connector 892 is the same as the outlet connector 894. Therefore, the inlet connector 892 will be described below for conciseness although it will be appreciated that the description of the inlet connector 892 also applies to the outlet connector 894.

The inlet connector 892 according to these examples is in fluid communication with a fluid channel 898 which conveys fluid between the inlet connector 892 and the coil windings of the stator coil 880. In examples, the inlet connector is welded to the fluid channel 898, although it will be appreciated that any other suitable arrangement for bonding the inlet connector 892 to the fluid channel 898 in a fluid tight manner may be used.

In examples, the inlet connector 892 is a substantially rectangular plate in which four holes 899 are formed towards the respective corners of the inlet connector 892 for coupling the inlet connector 892 to the manifold 820. In examples, the inlet connector 892 is mounted on the manifold and held by bolts passing through the holes 899 and engaging with corresponding threaded holes in the manifold. However, it will be appreciated that other arrangements for coupling the inlet connector 892 to the manifold 820 could be used.

To help preserve a fluid tight connection between the inlet connector 892 and the manifold 820, the inlet connector 892 comprises a pair of concentric O-rings mounted in corresponding O-ring grooves formed in the face of the inlet connector 892 which faces the manifold. In examples, the O-rings and O-ring grooves are arranged concentrically with respect to the fluid channel in substantially the same manner as that described above with respect to FIG. 30, although it will be appreciated that other O-ring arrangements could be used. In some examples, only one O-ring is used for each connector, although the use of a pair of concentric O-rings is preferred because reduces the likelihood of any leaks. Alternatively, or as well as the O-rings, the inlet connector 892 can be adhesively bonded to the manifold using a suitable adhesive to help reduce the likelihood of leaks. In examples, the orientation of the inlet connector 892 is rotated 180 degrees with respect to the outlet connector 894 in the plane of the plate of the inlet connector 892 so that the fluid channel of the inlet connector 892 is offset from the fluid channel of the outlet connector 894 in the circumferential direction so as to align substantially with the respective ends of the coil winding. In examples, the stator coils have the same configuration and construction as each other, although it will be appreciated that they could have different configurations and constructions from each other (for example combinations of the examples of the stator coils described above).

Manifold with Fluid Insulating Channel

As mentioned above, the stator coils may be cooled or heated as appropriate by passing a suitable fluid through the fluid channels in the stator coils. Additionally, to electrically isolate the stator coils from each other and from the main body of the generator, in examples insulating inlet and outlet connectors are used to electrically isolate the stator coils from the manifolds. In examples, a non-conductive fluid (that is a fluid with a resistivity greater than a fluid resistivity threshold, typically greater than Grade 1 ISO 3696 (resistivity of 10 mega ohms cm (MΩcm)) is used. However it will be appreciated that other fluid resistivity thresholds could be used such as Grade 2 ISO 3696 (resistivity of 1 mega ohms cm (MΩcm)) or Grade 3 ISO 3696 (resistivity of 0.2 mega ohms cm (MΩcm)). However, over time, the fluid may become contaminated so that the resistivity decreases. For example, if the fluid is a liquid, the liquid may become contaminated by repeated circulation by a fluid circulation system so that conductive salts become dissolved in the liquid. Contamination of the fluid may therefore increase the likelihood that undesirable current may flow between the stator coil and the manifold through the fluid. In other words, the fluid may form a conduction path between the stator coil and the manifold, especially if the fluid becomes contaminated. Therefore, to reduce the likelihood that undesirable current may flow between the stator coil and the manifold, in examples, the length of the insulating channel between the manifold and the respective inlet and outlet of the stator coil is arranged so that the electrical resistance of the fluid over the insulating channel for a given contamination level is greater than a fluid path resistance threshold. This will now be described in more detail below.

FIG. 57 schematically illustrates a side view of the manifold according to examples of the disclosure. In particular, the manifold 820 comprises a main body 1000 and an electrically insulating element 1010. The main body 1000 comprises an inner dividing wall 1002 (indicated by the dashed lines) and will be described in more detail later below.

The electrically insulating element 1010 comprises a first insulating plate 1010*a* and a second insulating plate 1010*b*. In examples, the first insulating plate 1010*a* and the second insulating plate 1010*b* are adhesively bonded together, although it will be appreciated that other techniques for coupling them together could be used. The insulating element 1010 electrically isolates the inlet and outlet connectors from the manifold 820 and will be described in more detail later below.

FIG. 58 schematically illustrates the manifold without the inlet and outlet connectors. In examples, a plurality of threaded holes (such as threaded holes 1020) for coupling the inlet and outlet connectors to the manifold are formed in the insulating element 1010. In examples, the threaded holes are arranged in groups of four holes which correspond with location of the holes formed in the respective inlet and outlet connectors. For example, the position of the threaded holes 1020 corresponds with that of the holes 899 formed in the inlet connector 892. However, it will be appreciated that any other arrangement of threaded holes could be used.

In examples, a plurality of a fluid inlet holes (such as fluid inlet hole 1022) and a plurality of fluid outlet holes (such as fluid outlet hole 1024) are formed in the first insulating plate 1010a. The fluid inlet and outlet holes are located so as to correspond with the fluid channels of the respective inlet and outlet connectors so that the fluid channels can be in fluid communication with the manifold. For example, the fluid inlet hole 1022 is located to correspond with the fluid channel 898 of the inlet connector 892. In other words, more generally, in examples the manifold comprises a main body (e.g. main body 1000) comprising a fluid chamber and an electrically insulating element (e.g. insulating element 1010) coupled to the main body, the insulating element comprising a plurality of fluid ports for fluidic communication with the fluid channels of the electrical windings (e.g. the stator windings) and a plurality of electrically insulating fluid channels in fluid communication with the fluid chamber and the fluid connectors.

FIG. 59 schematically illustrates the main body 1000 of the manifold together with the second insulating plate 1010b. In examples, the second insulating plate 1010b comprises a plurality of insulating channels (such as insulating channels 1030) formed in the surface of the second insulating plate which act as flow paths for the fluid. In examples, the insulating channels are substantially u-shaped, although it will be appreciated that other configurations could be used such as s-shaped channels could be used. More generally, in examples, the insulating channels have a sinuousity index greater than one. In other words, the ratio of the actual path length to the shortest possible part length of the insulating channel is greater than 1 (sinuosity index=actual path length/shortest path length). In examples, the length of each of the insulating channels is 100 mm, although it will be appreciated that any other appropriate length could be used.

More generally, as mentioned above, in examples a length of the electrically insulating fluid channels arranged between the fluid ports and the fluid chamber is such that electrical resistance of a fluid passing through the electrically insulating channels between the fluid ports and the main body is greater than a threshold resistance (fluid path resistance threshold). The first insulating plate 1010a can be thought of as an example of a first element and the second insulating plate 1010b can be thought of as an example of a second element, with the electrically insulating element (such as electrically insulating element 1010) comprising the first element and the second element, and with the second element being coupled to the first element. In examples, the insulating channels are formed between the first element and the second element, for example between the first insulating plate 1010a and the second insulating plate 1010b. In examples, the fluid ports correspond to respective holes of a plurality of through holes (such as the fluid inlet holes and/or the fluid outlet holes) formed in the first element.

Referring back to FIG. 59, an insulating channel 1032 comprises a first end 1034a and a second end 1034b. The position of the first end 1034a is arranged to correspond with the position of the fluid inlet hole 1022 so that fluid channel 898 can be in fluid communication with the insulating channel 1032.

A through hole is formed in the second insulating plate 1010b at a position corresponding to the second end 1034b so that the insulating channel 1032 can be in fluid communication with the main body 1000 of the manifold 820. In other words, in examples, each insulating channel comprises a first end and a second end, with a position of the first end being arranged to correspond with a position of a fluid inlet hole of the first insulating plate. In examples, a through hole is formed in the second insulating plate at the second end. In examples, each first end is located to correspond with the position of a respective fluid port.

In examples, the first insulating plates 1010a is adhesively bonded to the second insulating plate 1010b so that fluid can flow between the first insulating plate 1010a and the second insulating plate 1010b along the insulating channels. In other words, for example, the insulating channels can be thought of as fluid insulating channels whose length can be arranged so as to achieve the desired fluid electrical resistance. In examples, the first and second insulating plates are adhesively bonded together, although it will be appreciated that may be joined together in any other suitable manner. In examples, the first and second insulating plates are formed from electrically insulating plastics materials such as polyetherimide (PEI) or phenolic plastics, although it will be appreciated that composites materials, ceramic materials, or other suitable materials could be used.

FIG. 60 schematically shows the main body 1000 of the manifold 820. A plurality of main body fluid holes (such as fluid holes 1038a and 1038b) are formed in a face of the main body (front wall) which is coupled to the second insulating plate 1010b. The main body fluid holes are located so as to correspond with the position of the respective through holes formed in the second insulating plate such that the main body can be in fluid communication with the insulating channels (fluid insulating channels).

For example, a main body fluid hole 1040 is arranged at a position in the main body so as to correspond with a position of the through hole formed at the second end 1034b of the insulating channel 1032 when the second insulating plate 1010b is mounted on the main body 1000. In other words, more generally, in examples, a plurality of fluid chamber holes (such as the main body fluid holes) are formed in the main body for fluid communication between the fluid chamber and the insulating channels, and a plurality of holes (such as the through hole formed at the second end 1034b) are formed in the second element at the second ends of the fluid channels at positions corresponding to respective fluid chamber holes.

In examples, the main body 1000 is formed from a first part and a second part in a similar manner to that described above with reference to FIGS. 32a and 32b, although it will be appreciated other techniques for forming the main body could be used. In examples, the main body comprises stainless steel, although it will be appreciated that other metals, composites, plastics material and the like could be used.

In examples, the second insulating plate 1010b is adhesively bonded to the main body so that the through holes correspond (i.e. match up) with the main body fluid holes so as to create a fluid tight seal between the second insulating plate 1010b, and the front wall of the main body 1000, although it will be appreciated that other techniques could be used for joining the second insulating plate 1010b to the main body 1000 so as to create a fluid tight join. In examples, the insulating channels are formed in the surface of at least one of the first element and second element between the first element and the second element (for example between the first and second insulating plates 1010*a* and 1010*b*). For example, the insulating channels could be machined out of the second insulating plate 1010*b*, and then the second insulating plate 1010*b* adhesively bonded to the first insulating plate 1010*a*. However, it will be appreciated that other techniques, such as molding, etching or other appropriate techniques could be used to form the insulating channels.

FIG. 61 schematically shows a cross section through the main body. In particular, FIG. 61 schematically shows the main body 1000 and the inner dividing wall 1002. The main body 1000 comprises a first fluid chamber 1040 and a second fluid chamber 1042. The inner dividing wall 1002 separates the first fluid chamber 1040 from the second fluid chamber 1042 so that the fluid chambers are in fluid isolation from each other within the main body 1000. In other words, in examples, the inner dividing wall 1002 acts as a chamber divider. In examples, the inner dividing wall and/or the walls of the main body comprise thermally insulating material in a similar manner to the manifold described above with respect to FIGS. 32*a* and 32*b*.

It will be appreciated that the manifold could comprise one fluid chamber, or more than one fluid chamber. As mentioned above, in examples, the main body comprises a fluid chamber. More generally, the fluid chamber comprises a first fluid chamber (such as first fluid chamber 314 or first fluid chamber 1040) and a second fluid chamber (such as second fluid chamber 316 or second fluid chamber 1042) in fluid isolation from the first fluid chamber and in which a first set of fluid ports (for example the fluid inlet holes) are in fluid communication with the first fluid chamber and a second set of fluid ports (for example the fluid outlet holes) are in fluid communication with the second chamber.

As mentioned above, in examples, the main body 1000 comprises an inner dividing wall 1002. The chamber divider 318 and the inner dividing wall 1002 can be thought of as examples of a chamber divider arranged to isolate fluid in the first fluid chamber from the second fluid chamber. In examples, the inner divider (such as the inner dividing wall) comprises thermally insulating material. This can help improve the thermal efficiency of the manifold because heat flow between the first fluid chamber and the second fluid chamber can be reduced and thus a temperature differential between the fluid in the two chambers is more likely to be maintained until heat can be transferred to a desired location (e.g. into sea water) at the appropriate part of the fluid circulation system.

In examples, the cross section of the manifold main body 1000 in the plane of rotation of the generator is a truncated circular sector. In other words, an outer and inner edge of the manifold main body 1000 in the radial direction corresponds to arcs of concentric circles. However, it will be appreciated that the manifold main body 1000 could have any other appropriate shape. Additionally, it will be appreciate that any of the features of the manifold described with respect to examples of FIGS. 57 to 61 could be combined with any of the features of the manifold described above with respect to FIGS. 32*a* and 32*b*. In examples, the fluid ports of the first set of fluid ports are arranged alternately with the fluid ports of the second set of fluid ports along a line within the fluid chamber, and the chamber divider is arranged between the fluid ports of the first set of fluid ports and the fluid ports of the second set of fluid ports, for example, the wave-like configuration of the chamber divider 318 described above with respect to FIGS. 32*a* and 32*b*.

The first fluid chamber 1040 is in fluid communication with the manifold inlet pipe 860 via a hole 1044 formed in a back wall of the main body (i.e. in a face of the main body located away from the second insulating plate 1010*b*). The second fluid chamber 1042 is in fluid communication with the manifold outlet pipe 862 via a hole 1046 formed in the back wall of the main body 1000.

For example, to pass fluid through the stator coils so as to heat or cool them, fluid is passed into the first fluid chamber 1040 from the manifold inlet pipe 860 and through the respective insulating channels between the first and second insulating plates. The fluid then passes out of the first insulating plate 1010*a* into respective inlet connectors of the stators coils. The fluid passes through the stator coils and out of the outlet connectors back into the first insulating plate 1010*a*, where it then flows through the insulating channels between the first and second insulating plates (1010*a* and 1010*b*). The fluid passes into the second fluid chamber and out of the manifold 820 via the manifold outlet pipe 862 to the fluid circulation systems. Therefore, the stator coils can be heated or cooled as desired, whilst helping to reduce electrical current flowing between the inlet and outlet connectors and the manifold via the fluid.

In some examples, the fluid channel between the coil winding and the inlet and outlet connectors are formed from electrically insulating material such as plastic tubing. In these examples, the length of the fluid channel between the coil winding and the inlet and outlet connectors is chosen to give the desired electrical resistance based on the resistivity of the fluid. Techniques for forming fluid tight joints between metal and plastic tubing are known in the art (for example from heating of hot water for buildings) and so will not be described in detail herein.

Support Tube Assemblies

Support tube assemblies according to examples of the disclosure will now be described with reference to FIGS. 62 and 63.

FIG. 62 is a schematic diagram of a support tube assembly comprising clamping collars according to examples of the disclosure. In particular, FIG. 62 schematically illustrates a support tube assembly 1100. The support tube assembly 1100 comprises a support tube 1105, a first pair of clamping collars 1108*a* and 1108*b*, a second pair of clamping collars 1110*a* and 1110*b*, a third pair of clamping collars 1112*a* and 1112*b*, and a fourth pair of clamping collars 1114*a* and 1114*b*. Each clamping collar comprises a ring with a split formed in it across which a bolt is located so that tightening of the bolt causes the end of the ring at the split to be drawn together. For example, a split 1116 is formed in the clamping collar 1112*b* and a bolt 1118 is located across the split so that the clamping collar can be tightened around the support tube 1105.

However, it will be appreciated that other arrangements for tightening the clamping collars around the support tube may be used. As mentioned above, in examples, each clamping collars in a pair of clamping collars are located either side of the respective rotor rings or stator rings. In examples, the clamping collars are positioned around the support tubes so as to provide the desired spacing between the rotor or stator rings. In examples, the support tube and the clamping collars are formed from metal, although it will be appreciated that other suitable materials could be used such as composites materials (e.g. glass fiber, carbon fiber), plastics materials or other materials could be used.

FIG. 63 is a schematic diagram of a support tube assembly comprising spacing tubes according to examples of the disclosure. In particular, FIG. 63 shows an example of a support tube assembly 830 (such as those described above with respect to FIG. 53). The support tube assembly 830 comprises a support tube 1121, a first spacing tube 1122 and a second spacing tube 1124, a first mounting collar 1126 and a second mounting collar 1128. Referring to FIG. 53, for example, the length of the spacing tubes 1122 and 1124 is chosen so that the stator segment (such as stator segment 800) are held in the axial direction between the stator rings (such as a between stator ring 840 and the other stator ring not shown in FIG. 53). The mounting rings restrict motion of the support tube assemblies in the axial direction. For example, the spacing tube 1124 and the mounting collar 1128 are located either side of the stator ring 840. In examples, the support tube, spacing tubes and the mounting collars are formed from metal and the mounting collars and/or spacing tubes are welded to the support tubes (for example using spot welding). However, it will be appreciated that the support tubes, mounting collars and spacing tubes could comprises other suitable materials such as composites materials (e.g. glass fiber, carbon fiber), plastics materials or other materials could be used.

In examples, the mounting collars are substantially the same as the clamping collars described above. This facilitates assembly of the stator or rotor as the support tubes can be passed through the appropriate holes in the stator (or rotor) rings (e.g. stator ring 840), through a spacing tube (e.g. spacing tube 1124), through the stator (or rotor) laminations, through a spacing tube (e.g. spacing tube 1122), through the other stator (or rotor) ring and then secured in place with the mounting collars (e.g. mounting collars 1128 and 1126), either by tightening the bolts on the collar (in the example where the mounting collars are the same as the clamping collars) or by welding. However, it will be appreciated that other methods of assembling the stator segments on the rotor rings could be used. In other words, in some examples, the support tube passes through holes formed in the laminations so as to mount the laminations on the support tubes and mechanically couple the laminations to the rotor rings or stator rings.

Binding Rod and Laminations

Further examples of the binding rods, rotor laminations, stator laminations and binding rods will now be described.

FIG. 64 schematically illustrates an enlarged view of part of the rotor laminations and side plate. In particular, FIG. 64 schematically shows a portion of an example of rotor laminations comprising first rotor laminations 1130 and second rotor laminations 1132, a rotor segment side plate 1134 and binding rods 1136a, and 1136b. In examples, the binding rods 1136a and 1136b are the same as any of those described above. In examples, the second rotor laminations 1132 are the same as the second rotor laminations 146 described above, and the first rotor laminations 1130 have the same configuration as the first rotor laminations 144 for mounting the magnets. However, in the examples described with respect to FIG. 47 onwards, a plurality of support tube holes, also referred to as mounting holes (such as support tube hole 1138) are formed in the first rotor laminations and the rotor side plate (e.g. rotor side plate 1134) in a portion located away from the magnet mounting side, so that one or more support tubes can be used to mount the laminations on the rotor.

In examples, the binding rods are assembled to hold the laminations together as described above. However, in some examples, the rotor side plates comprise one or more recessed portions into which the spacing collar (such as spacing collar 176) can be located when the binding rods are mounted to hold the laminations. For example, referring to FIG. 64, the side plate 1134 comprises a first recessed portion 1140a and a second recessed portion 1140b shaped to correspond with the spacing collars of the binding rods.

FIG. 65 schematically illustrates an enlarged view of part of the stator laminations and side plate. In particular, FIG. 65 schematically shows a portion of an example of stator laminations comprising the first stator laminations 884 and the second rotor laminations 886, the stator segment side plate 890a and binding rods 870a, and 870b. In examples, the binding rods 870a and 870b are the same as any of those described above.

In examples, the second rotor laminations 886 are the same as the second stator laminations 248 described above, and the first rotor laminations 884 have the same configuration as the first stator laminations 260 for mounting the coils. However, in the examples described with respect to FIG. 47 onwards, a plurality of mounting holes, also referred to as support tube holes (such as mounting holes 888) are formed in the first stator laminations 884 and the stator side plate (e.g. stator side plate 890a) in a portion located away from the stator coil mounting side, so that one or more support tubes can be used to mount the laminations on the stator.

In examples, the binding rods are assembled to hold the laminations together as described above. However, in some examples, the stator side plates comprise one or more recessed portions into which the spacing collar (such as spacing collar 176) can be located when the binding rods are mounted to hold the laminations. For example, referring to FIG. 65, the side plate 890a comprises a first recessed portion 1142a and a second recessed portion 1142b shaped to correspond with the spacing collars of the binding rods.

FIG. 66 schematically illustrates positioning of a binding rod with respect to a recess formed in a stator side plate according to examples of the disclosure. In particular, in the example of FIG. 66, the binding rod 138 is mounted with respect to the side plate 890a so that an end of the first half 176a of the spacing collar 176 which contacts the side plate is located in the recess 1142b formed in the side plate 890a.

Examples of Magnet Securing Clips

FIGS. 67a-67d illustrate another example of magnet securing units (magnet securing clips), from different views. FIG. 67d shows a cross-sectional view of the magnet securing clip 910 in use with a magnet 901 and a magnet mount 902. FIG. 67a shows a perspective view of the magnet securing unit 910 of FIG. 67d and FIG. 67b-67c show cross sectional views along lines A-A and B-B, respectively, of FIG. 67a.

The magnet securing unit 910 comprise two arms 912a and 912b for securing the magnet 901 onto the mounting surface 903 of the magnet mount 902. In particular, the two arms 912a and 912b contact the magnet 901 on a magnet holding surface of the magnet securing clip so as to restrict radial movement of the magnet. In this example, each arm has a substantially square or rectangular cross section and has substantially the same cross-section along the arm. In other examples, the cross section may have a different shape and the shape may vary along the length.

Also, in the illustration of FIG. 67d, the magnet securing clip 910 is higher, in the radial direction, than the magnet 901. and the arms 912a-912b overlap with the magnet 901. However, in other examples, the magnet 901 may include a recess and/or a notch to receive the arms 912a and 912b. This recess and/or notch may be provided on a corner of the magnet 901 or may be provided along the magnet's side in the radial direction. Such recess and/or notch arrangements could be beneficial to increase turbulence and hence a cooling effect provided by the gap between the two arms 912*a* and 912*b* and/or by the relative arrangement of the magnet 901 and magnet securing unit 910.

In the example illustrated in FIG. 67*d*, the magnet 901 is secured in a circumferential direction at least in part by the side portion 914 of the magnet securing clip 910 when the securing lip 916 is engaged with the corresponding lip of the magnet mount 902. Thus, in this example, the magnet mount's recess in which the magnet can be received may be omitted (as illustrated in FIG. 67*d*). Alternatively it may be used in combination with the side portion 914 for reducing circumferential movement of the magnet 901. In this example, the side portion 914 comprises a plate, but in other examples the side portion 914 may have a different shape and may also be arranged closer to the arms 912*a*-912*b* and further away from the securing lip 916. For example, in use, the side portion 914 may not contact the magnet mount 902.

FIGS. 68*a*-68*c* illustrate another example of magnet securing units from different views. FIG. 68*a* shows a perspective view of the magnet securing unit 920 of FIG. 67*d* and FIG. 68*b*-68*c* show cross sectional views along lines A-A and B-B, respectively, of FIG. 68*a*. In this example, the magnet securing clip 920 includes a magnet holding portion 922 comprising a plate. The plate includes one or more perforations 922*a* and a recess 922*b*. The perforation and recess can serve as turbulence causing elements and help create flow disruption to a fluid (e.g. air) flowing relative to the magnet securing clip and flowing past the recess so as to cause turbulence.

In other examples, the magnet holding portion 922 comprises one or more perforations but no recess and in other examples, the magnet holding portion 922 comprises one or more recesses but no recess. Additionally, the perforations and recesses may be of any suitable shape. For example, the perforations may be of circular shape, of ellipsoidal shape, of rectangular shape, or square shape, etc. Also, the recess illustrated in FIGS. 68*a* and 68*b* forms a triangular prism-shaped hollow portion but in other example, it may form a hollow portion in the shape of a parallelepiped, a portion of a cylinder, a portion of a sphere or ellipsoid, etc.

Examples of turbulence causing elements include one or more gaps (e.g. the gap between arms 912*a*-912*b* or arms 193*a*-193*b*, or a closed gap), one or more recesses, one or more perforations, and one or more protrusions. For example, the magnet holding portion 922 might have a T-shape, and/or may be arranged such that, if two or more magnet securing units are placed in a row, there will be a gap between neighboring magnet holding portion, thereby causing turbulence. In other words, the magnet holding portion 922 may include any suitable combination of one or more turbulence causing elements so as to improving the cooling of the magnets when a fluid moves relative to the magnet securing units.

The magnet securing unit 920 also include a side portion 924 to restrict circumferential movement of one or more magnets on a magnet mount. In this example, the side portion 924 is T-shaped but in other examples, the side portion might have a different shape.

In the example of FIGS. 68*a*-68*c*, the securing lip 926 comprises three portions: two portions having a rectangular cross-section connected by a portion having a trapezoidal cross section. In other examples, the securing lip 926 may have a different shape. For example, a shape with a protrusion in the circumferential direction can help restrict radial movement of the magnet when co-operating or engaging with a corresponding portion of the magnet mount. The magnet mount may then comprise another protrusion in the circumferential direction, in which this other protrusion forms a hollow portion for receiving the securing lip 926. For example, the securing lip may have the shape of a plate, a plate having a bump in a radial direction, a portion of a cylinder, etc. In examples, the securing lip 926 may be shaped so as to facilitate sliding of the lip in a corresponding portion of the magnet mount 902.

Fluid Circulation System

FIG. 69 illustrates schematically a fluid circulation system or fluid heat transfer system 1200 that includes a generator 1202 according to examples of the disclosure, for example, examples of the generator described above. The generator 1202 includes a coil or winding 1204 of electrically conducting material (e.g. copper) to illustrate a winding of the generator, for example the stator coils as described above. It will be appreciated that the generator may include multiple windings and multiple fluid channels, which may be connected in series or parallel. Furthermore, if multiple fluid channels are used, it may be possible to control the temperature of each fluid channel independently using one or more controllable valves. The winding 1204 also includes a fluid channel manufactured from stainless steel, for example. It is noted that the electrical winding and the fluid channel of coil 1202 are shown as the same element in the figure. In examples, the winding 1204 is the same as the stator winding described above, although it will be appreciated that other configurations could be used. In other words, more generally for example, the fluid circulation system 1200 (fluid heat transfer system) can be thought of as an example of a system comprising an electrical machine comprising an electrical winding, the electrical winding including a fluid channel, the system further comprising a temperature controlled fluid source in fluid communication with the fluid channel, the temperature controlled fluid source being operable to provide a fluid to the winding to increase the temperature of the winding above the ambient temperature.

In examples, the fluid circulation system comprises a deionizer and degasification system for deionizing the fluid and removing gas from the fluid (not shown in FIG. 69). For example, if copper is used for the fluid channel, it is important to remove oxygen from the fluid as this reacts with copper and could cause the fluid channel to corrode or block over time.

The fluid channel of the coil is coupled to a temperature controlled fluid source 1206. A fluid output of the winding 1204 is coupled to a fluid input of the fluid source 1206 at point 1208 and a fluid input of the winding 1204 is coupled to a fluid output of the fluid source 1206 at point 1210. The system 1200 is a closed system and includes a heat transfer fluid of non-conductive fluid, for example, deionized water.

The temperature controlled fluid source 1206 comprises one or more electrical pumps 1212 to move the fluid around the circulation system 1200. The source 1206 also includes one more valves 1214, 1216 to control the flow of the fluid. The fluid source further includes a heat source 1218 and a heat sink 1220. The heat source 1218 shown is an electrical heater comprising an electrical coil 1222 and a temperature controller 1224. The electrical coil 1222 is wrapped around a heating chamber 1226 so that heat produced in the coil 1222 when current is passed through the coil 1222 from the controller 1224 is transferred to fluid contained within the chamber 1226. The electrical coil 1222 and controller 1224 are shown using dashed lines to illustrate that these elements are electrical and do not form part of the fluid system, which is illustrated using solid lines. The electrical heater 1218 is coupled to the valve 1214 to control the fluid flowing through the heat source 1218. The heat sink 1220 in this example is in the form of a heat exchanger or radiator having a large surface area, for example, 1, 2, 3, 4, 5, 6, 7, 8, 9, or 10 m$^2$ although it will be appreciated that any other surface area could be used as appropriate.

The heat sink 1220 in this example includes air passages (not shown) and an electrical cooling fan 1228. The fan 1228 may also include a temperature sensor (not shown) to control when the fan 1228 is operated. Alternatively, the fan may always be operational. The valve 1216 controls the flow of fluid through the heat sink 1220.

In the example shown the heat sink is assumed to be in air, but may also be cooled using an alternative environmental heat sink, for example, the heat sink 1220 may be placed in a body of sea water.

The system 1200 is controlled by a controller 1230, which may be provided by a general purpose computer. Signal connections between the controller 1230 and the various other elements are shown using dashed lines to illustrate that these are electrical connections. The controller 1230 is electrically connected to each of the valves 1214, 1216, the pump 1212, the heater controller 1224 and the cooling fan 1228. The controller may also include one or more temperature sensors 1232 to detect the temperature of the fluid in the system and to determine how to control the other elements of the system. The temperature sensor 1232 may be placed on the winding 1204 or somewhere in the fluidic circuit of the system 1200. A further sensor 1234 is included to detect the rotational speed of the generator 1202.

In operation, fluid is pumped around the system 1200 by pump 1212. The temperature of the fluid in the system (or of the winding 1204) is detected by the sensor 1232. If the temperature is detected by sensor 1232 to be above a first predetermined threshold (e.g. 20, 25, 30, 35, 40, 45 or 50 degrees C., although it will be appreciated that other thresholds could be used), valve 1214 is closed and valve 1216 is opened, so that fluid is pumped through the winding 1204 and the heat sink 1220. The fan 1228 may also be operated if the temperature of the fluid is detected to be above a second higher predetermined threshold (e.g. 5, 10, 15, 20, 25, 30, 35, 40, 45 or 50 degrees above the first predetermined temperature, although it will be appreciated that other thresholds could be used). If the generator is detected to be stationary or non-operational by sensor 1234, and/or the temperature detected by the sensor 1232 is equal to or below a third predetermined threshold (e.g. 0, 1, 2, 3, 4, 5, 6, 7, 8, 9 or 10 degrees C., although it will be appreciated that other thresholds could be used), valve 1214 is opened and valve 1216 is closed, so that fluid is pumped through the winding 1204 and the heat source 1218. When valve 1214 is opened the heat source will also be operated. The heat source 1218 is typically operated to heat the fluid to a temperature in a range between 5 and 15 degrees C., e.g. 5, 6, 7, 8, 9, 10, 11, 12, 13, 14 or 15 degrees C. It will be appreciated that there may be a temperature range (e.g. between 5 and 25 degrees C.) where it may not be necessary to cool or heat the winding 1204. Furthermore, the temperatures discussed are only examples and other temperatures ranges are contemplated depending on the environment.

In the figure a heat exchanger is used as a heat sink, but a thermoelectric cooling apparatus or Peltier cooler may also be used. The example shown in the figure may also be referred to as a direct fluid circulation system or fluid heat transfer system, since fluid flowing through the fluid channel of the winding 1204 is directly heated or cooled by the heat source 1218 and heat sink 1220.

FIG. 70 illustrates schematically a fluid circulation system or fluid heat transfer system 1250 that includes a generator 1202 according to examples of the disclosure. The same reference signs are used in FIG. 70 as in FIG. 69 for the same elements.

The fluid heat transfer system 1250 includes three separate fluidic circuits. The first fluidic circuit includes the winding 1202, a pump 1252 and a heat exchanger 1258. The heat exchanger is illustrated as two exchangers, one for the heat source and one for the heat sink circuits, but could be provided by a single heat exchanger. The second fluidic circuit includes pump 1254, the heat exchanger 1258*a* and a heat source 1260. In examples the heat source 1260 is provide by a gas fired water heater. The third fluidic circuit includes a pump 1256 and a heat sink in the form of a fluid outlet 1262 and fluid outlet 1264. Each of the first, second and third fluidic circuits are independent from one another. That is to say that the fluid flowing through each of the first, second, and third fluidic circuits is independent. The second and third fluidic circuits are each coupled thermally to the first fluidic circuit via the heat exchanger 1258. The example shown in the figure may be referred to as an indirect fluid heat transfer system.

In operation, fluid is pumped around the first fluidic circuit by pump 1252. The temperature of the fluid in the system (or of the winding 1204) is detected by the sensor 1232. If the temperature is detected by sensor 1232 to be above a first predetermined threshold (e.g. 20, 25, 30, 35, 40, 45 or 50 degrees C., although it will be appreciated that other thresholds could be used), pump 1256 is operated and pump 1254 is not operated. The fluid in the first fluidic circuit flows though the heat exchanger 1258*b* and heat is transferred to the fluid in the third fluidic circuit via the heat exchanger 1258*b*, since the fluid in the third fluidic circuit is at a lower temperature. Pump 1256 of the third fluidic circuit pumps sea water in to inlet 1264 through the heat exchanger 1258*b* and out of fluid outlet 1262. If the generator 1202 is detected to be stationary or non-operational by sensor 1234, and/or the temperature detected by the sensor 1232 is equal to or below a second predetermined threshold (e.g. 0, 1, 2, 3, 4, 5, 6, 7, 8, 9 or 10 degrees C., although it will be appreciated that other thresholds could be used), pump 1256 is not operated and pump 1254 is operated. The fluid in the first fluidic circuit flows though the heat exchanger 1258*a* and heat is transferred from the fluid in the second fluidic circuit via the heat exchanger 1258*a*, since the fluid in the second fluidic circuit is at a higher temperate.

Pump 1254 of the second fluidic circuit pumps fluid through the heater 1260 and the heat exchanged 1258*a*. The fluid in the first and second fluidic circuit may be the same, e.g. a non-conductive fluid, for example, deionized water. As described above, in this example the fluid used in the third fluidic circuit is sea water, but may include other environment fluid sources, for example, lakes and rivers. It will be appreciated that the control elements in system 1250 are all controlled by a central controller as for system 1200, but the controller and control lines have been omitted in the figure. It will be appreciated that the techniques and teachings of the present disclosure may be applied more generally to electrical machines such as electric motors (e.g. the spoke arrangement and magnet mounting arrangement could be deployed in an electrical motor, although any part of the present teachings could be employed as appropriate). For example, electric current could be supplied to the stator coils in an appropriate configuration to cause the rotor to rotate with respect to the stator.

Additionally, although the above teachings have been described as examples of a generator which may be used in a wind turbine, it will be appreciated that the techniques and teachings of the disclosure could be applied to any suitably sized generator or electrical machine for other applications. For example, the teachings could be applied where low weight is important such as portable generators, portable wind turbines, portable devices including electric motors and the like.

It will be appreciated that the features of one or more of any of the different examples described above may be combined together as appropriate with changes as appropriate which will be apparent to the skilled person from the present disclosure.

The invention claimed is:

1. A rotor for an electrical machine, the rotor comprising:
   a hub arranged so that the rotor can rotate with respect to a stator of the electrical machine about an axis of rotation;
   a rim, the rim comprising a plurality of rotor rings spaced apart from each other;
   the rim further comprising a plurality of rotor ring support tube assemblies, each rotor ring support tube assembly comprising a support tube and one or more spacing elements, the spacing elements being arranged between the rotor rings so that the rotor rings are spaced apart from each other in the axial direction;
   the plurality of rotor rings comprising a plurality of electromagnetic coupling elements for electromagnetic coupling with a stator of the electrical machine, said electromagnetic coupling elements being mounted on laminations mounted on one or more middle rotor rings; and
   a plurality of spokes arranged between the hub and the rims so as to mechanically couple the hub with the rim, the plurality of spokes being arranged in pairs either side of the rotor rings in the axial direction; and
   each spoke being coupled to at least one of the rim and the hub;
   each spoke in a pair of spokes is coupled to the rim at substantially the same position of the rim;
   each spoke in the pair of spokes is coupled to the hub at substantially the same position on the hub;
   the plurality of spokes are arranged tangentially with respect to a circumference of the hub; and
   each spoke in a pair of spokes is coupled so that the spokes in the pair are offset from each other in the direction along the axis of rotation.

2. A rotor according to claim 1, in which a major axis of each spoke corresponds with a secant line passing through two points of the rim.

3. A rotor according to claim 1, comprising an adjuster for adjusting tension in one or more of the spokes.

4. A rotor according to claim 1, in which each spoke is coupled to at least one of the rim and the hub by a welded joint.

5. A rotor according to claim 1, in which hub, spokes and rim are integrally formed with each other.

6. A rotor according to claim 1, in which the electromagnetic coupling elements comprise permanent magnets.

7. A stator for an electrical machine, the stator comprising:
   a hub arranged so that a rotor of the electrical machine can rotate with respect to the stator about an axis of rotation;
   a rim, the rim comprising a plurality of stator rings spaced apart from each other; the rim further comprising a plurality of stator ring support tube assemblies, each stator ring support tube assembly comprising a support tube and one or more spacing elements, the spacing elements being arranged between the stator rings so that the stator rings are spaced apart from each other in the axial direction;
   the plurality of stator rings comprising a plurality of electromagnetic coupling elements for electromagnetic coupling with a rotor of the electrical machine, said electromagnetic coupling elements being mounted on laminations mounted on one or more middle stator rings;
   a plurality of spokes arranged between the hub and the rim so as to mechanically couple the hub with the rim, the plurality of spokes being arranged in pairs either side of the stator rings in the axial direction; and
   each spoke being coupled to at least one of the rim and the hub;
   each spoke in a pair of spokes is coupled to the rim at substantially the same position of the rim;
   each spoke in the pair of spokes is coupled to the hub at substantially the same position on the hub;
   the plurality of spokes are arranged tangentially with respect to a circumference of the hub; and
   each spoke in a pair of spokes is coupled so that the spokes in the pair are offset from each other in the direction along the axis of rotation.

8. A stator according to claim 7, in which a major axis of each spoke corresponds with a secant line passing through two points of the rim.

9. A stator according to claim 7, comprising an adjuster for adjusting tension in one or more of the spokes.

10. A stator according to claim 7, in which each spoke is coupled to at least one of the rim and the hub by a welded joint.

11. A stator according to claim 7, in which hub, spokes and rim are integrally formed with each other.

12. A stator according to claim 7, in which the electromagnetic coupling elements comprise permanent magnets.

* * * * *